US012753336B2

(12) United States Patent
Kagawa et al.

(10) Patent No.: US 12,753,336 B2
(45) **Date of Patent: *Oct. 6, 2026**

(54) HEAT EXCHANGER

(71) Applicant: DAIKIN INDUSTRIES, LTD., Osaka (JP)

(72) Inventors: Michiru Kagawa, Osaka (JP); Masamichi Morita, Osaka (JP); Ryo Inoue, Osaka (JP); Hiroki Yamaguchi, Osaka (JP); Tomohiro Nagano, Osaka (JP); Masatoshi Nose, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 371 days.

This patent is subject to a terminal disclaimer.

(21) Appl. No.: 18/514,626

(22) Filed: Nov. 20, 2023

(65) Prior Publication Data

US 2024/0110087 A1 Apr. 4, 2024

Related U.S. Application Data

(63) Continuation of application No. PCT/JP2022/020986, filed on May 20, 2022.

(30) Foreign Application Priority Data

May 21, 2021 (JP) ................................ 2021-085814

(51) Int. Cl.
*C09K 5/14* (2006.01)
*C09D 5/16* (2006.01)
(Continued)

(52) U.S. Cl.
CPC .............. *C09K 5/14* (2013.01); *C09D 5/1662* (2013.01); *C09D 171/02* (2013.01); *C25D 11/10* (2013.01);
(Continued)

(58) Field of Classification Search
None
See application file for complete search history.

(56) References Cited

U.S. PATENT DOCUMENTS 12,038,239 B2 * 7/2024 Mondaru .............. F28F 13/182
2013/0210957 A1 8/2013 Takihara et al.
(Continued)

FOREIGN PATENT DOCUMENTS

EP 3 858 496 A1 8/2021
EP 4 145 064 A1 3/2023
(Continued)

OTHER PUBLICATIONS

International Search Report of PCT/JP2022/020986 dated Jun. 28, 2022 [PCT/ISA/210].
(Continued)

*Primary Examiner* — Ramsey Zacharia
(74) *Attorney, Agent, or Firm* — Sughrue Mion, PLLC

(57) ABSTRACT

A heat exchanger including an aluminum substrate, and a water-repellent coating provided on a surface of the aluminum substrate, wherein the aluminum substrate has an anodized film on the surface, and the water-repellent coating is a film formed of a fluoropolyether group-containing compound.

18 Claims, 14 Drawing Sheets

(51) Int. Cl.
*C09D 171/02* (2006.01)
*C25D 11/10* (2006.01)
*C25D 11/24* (2006.01)
*F28F 19/00* (2006.01)

(52) U.S. Cl.
CPC ............ *C25D 11/24* (2013.01); *F28F 19/006* (2013.01); *F28F 2245/04* (2013.01)

(56) References Cited

U.S. PATENT DOCUMENTS

| | | | | |
|---|---|---|---|---|
| 2013/0220177 | A1 | 8/2013 | Iyer et al. | |
| 2014/0182790 | A1* | 7/2014 | Hwang ................... | F28F 19/00 205/109 |
| 2021/0332248 | A1 | 10/2021 | Yamane et al. | |

FOREIGN PATENT DOCUMENTS

| | | | |
|---|---|---|---|
| JP | 1999-300270 | A | 11/1999 |
| JP | 2000-239895 | A | 9/2000 |
| JP | 2014-501804 | A | 1/2014 |
| JP | 2017-210506 | A | 11/2017 |
| JP | 2021-055047 | A | 4/2021 |
| WO | 2011/125970 | A1 | 10/2011 |
| WO | 2018/147125 | A1 | 8/2018 |
| WO | 2020/039795 | A1 | 2/2020 |
| WO | 2020/066533 | A1 | 4/2020 |
| WO | 2021/235557 | A1 | 11/2021 |

OTHER PUBLICATIONS

Extended European Search Report dated Nov. 18, 2024, issued in European Application No. 22804781.7.

International Preliminary Report on Patentability issued Nov. 21, 2023 with a translation of the Written Opinion in corresponding Application No. PCT/JP2022/020986.

* cited by examiner

HEAT EXCHANGER

CROSS REFERENCE TO RELATED APPLICATIONS

This application is a Rule 53(b) Continuation of PCT Application No. PCT/JP2022/020986 filed on May 20, 2022, claiming priority based on Japanese Patent Application No. 2021-085814 filed on May 21, 2021. The respective disclosures of the above noted applications are incorporated herein by reference in their entirety.

TECHNICAL FIELD

The present disclosure relates to a heat exchanger.

BACKGROUND ART

Heat exchangers are used in air-conditioning devices, cold storage machines, refrigerating machines, electric vehicles, and the like. For example, in refrigerant cycle devices such as air-conditioning devices, the heat exchanger is used as an evaporator of a refrigerant. During the operation of equipment provided with a heat exchanger, dew condensation is generated on the surface of the heat exchanger under specific conditions, water droplets generated by dew condensation are frozen, and frost is attached to the heat exchanger. The growth of this frost may reduce the function of the heat exchanger.

As the method for suppressing frost formation, there is known a method for forming a water-repellent layer on the surface of a heat exchanger, thereby facilitating the removal of water droplets generated by dew condensation (Patent Literature 1).

PRIOR ART LITERATURE

Patent Literature

Patent Literature 1: WO 2018/147125 A

SUMMARY OF INVENTION

The present disclosure provides the following embodiments.

[1] A heat exchanger comprising an aluminum substrate, and a water-repellent coating provided on a surface of the aluminum substrate, wherein
  the aluminum substrate has an anodized film on the surface, and
  the water-repellent coating is a film formed of a fluoropolyether group-containing compound.

Advantageous Effect

According to the present disclosure, a heat exchanger in which water-repellency persists even under ultraviolet ray exposure is provided.

DESCRIPTION OF EMBODIMENTS

The heat exchanger of the present disclosure is a heat exchanger comprising an aluminum substrate, and a water-repellent coating provided on a surface of the aluminum substrate, wherein the aluminum substrate has an anodized film on the surface, and the water-repellent coating is a film formed of a fluoropolyether group-containing compound.

Hereinafter, one embodiment of the heat exchanger of the present disclosure will be described in detail. However, each section and the arrangement thereof and the like in the following embodiments are not limited to the following embodiments.

(1) Refrigerant Cycle Device 100

Figure 1:
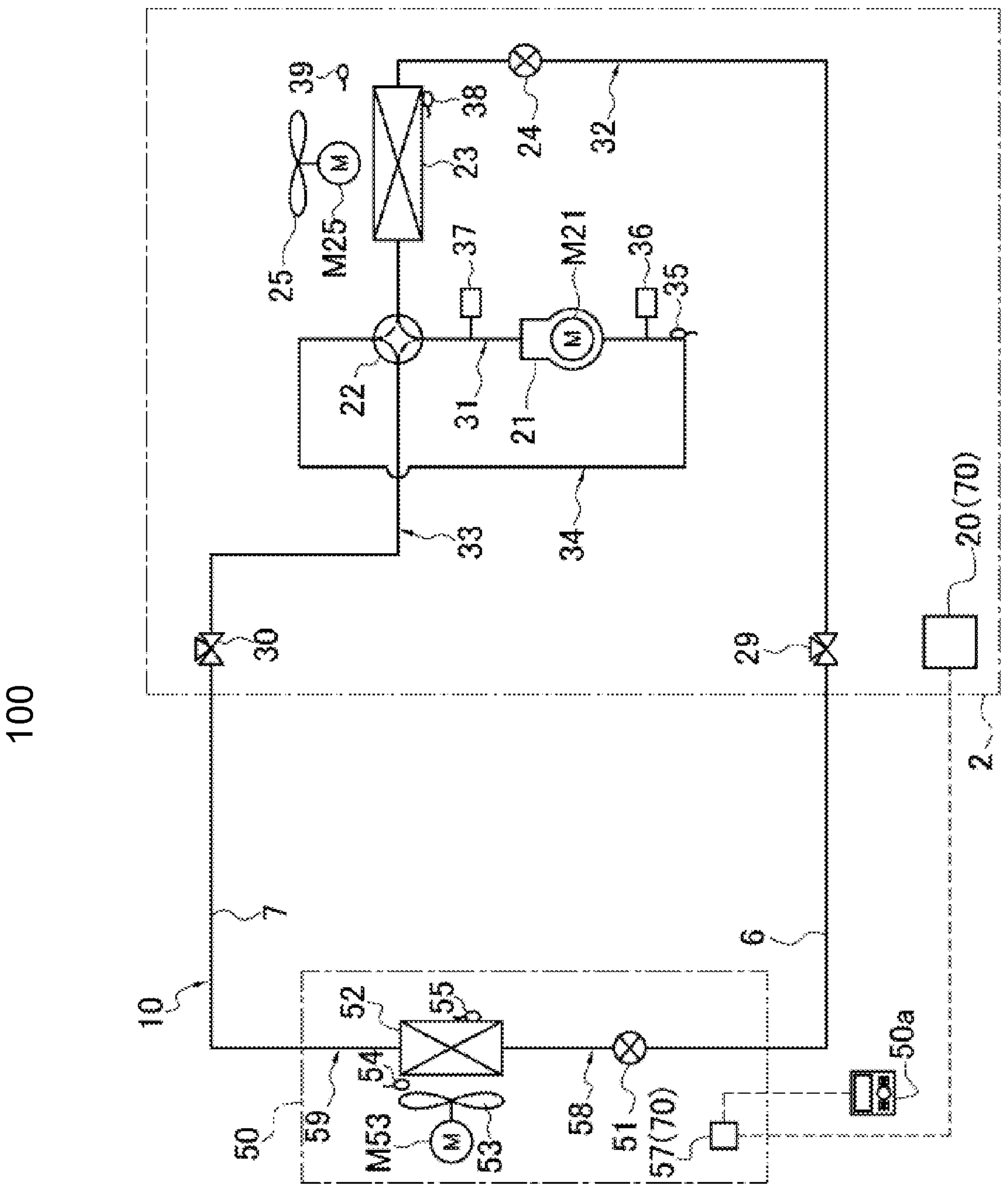
FIG. 1 is a schematic configuration diagram including a refrigerant circuit of a refrigerant cycle device.

FIG. 1 is a schematic configuration diagram of a refrigerant cycle device 100 according to one embodiment. The refrigerant cycle device 100 is a device that conditions the air in the target space by carrying out a vapor compression type refrigerant cycle (refrigeration cycle).

The refrigerant cycle device 100 mainly has an outdoor unit 2, an indoor unit 50, a liquid refrigerant communication pipe 6 and a gas refrigerant communication pipe 7 that connect the outdoor unit 2 and the indoor unit 50, a plurality of remote controllers 50*a* serving as an input device and an output device, and a controller 70 that controls the motion of the refrigerant cycle device 100.

In the refrigerant cycle device 100, a refrigerant cycle is carried out in which a refrigerant enclosed in the refrigerant circuit 10 is compressed, cooled or condensed, decompressed, heated or evaporated, and then compressed again. In the present embodiment, the refrigerant circuit 10 is filled with R32 serving as a refrigerant for carrying out a vapor compression type refrigerant cycle.

(1-1) Outdoor Unit 2

The outdoor unit 2 is connected to the indoor unit 50 via the liquid refrigerant communication pipe 6 and the gas refrigerant communication pipe 7, and constitutes a part of the refrigerant circuit 10. The outdoor unit 2 mainly has a compressor 21, a four-way switching valve 22, an outdoor heat exchanger 23, an outdoor expansion valve 24, an outdoor fan 25, a liquid-side shut-off valve 29, a gas-side shut-off valve 30, and an outdoor casing 2*a*.

The outdoor unit 2 has a discharge pipe 31 that is piping constituting the refrigerant circuit 10, an inlet pipe 34, an outdoor gas-side piping 33, and an outdoor liquid-side piping 32. The discharge pipe 31 connects the discharge side of the compressor 21 to a first connection port of the four-way switching valve 22. The inlet pipe 34 connects the inlet side of the compressor 21 to a second connection port of the four-way switching valve 22. The outdoor gas-side piping 33 connects a third port of the four-way switching valve 22 to the gas-side shut-off valve 30. The outdoor liquid-side piping 32 is elongated from a fourth port of the four-way switching valve 22 via the outdoor heat exchanger 23 and the outdoor expansion valve 24 to the liquid-side shut-off valve 29.

The compressor 21 is equipment that compresses a low-pressure refrigerant in the refrigerant cycle until it reaches a high pressure. Here, as the compressor 21, a compressor with a sealed structure in which a positive displacement compression element (omitted in the figure) such as a rotary type or scroll type is rotationally driven by a compressor motor M21 is used. The compressor motor M21 is for changing the volume, and the operation frequency can be controlled by an inverter.

The four-way switching valve 22 can switch the state of connection between a cooling operation connection state (and a defrosting operation state) in which the inlet side of the compressor 21 and the gas-side shut-off valve 30 are connected while connecting the discharge side of the compressor 21 and the outdoor heat exchanger 23, and a heating operation connection state in which the inlet side of the compressor 21 and the outdoor heat exchanger 23 are connected while connecting the discharge side of the compressor 21 and the gas-side shut-off valve 30.

The outdoor heat exchanger 23 is a heat exchanger that functions as a heat dissipator for a high pressure refrigerant in the refrigerant cycle during cooling operation and as an evaporator for a low pressure refrigerant in the refrigerant cycle during heating operation.

The outdoor fan 25 is a blower fan that generates an airflow for inhaling outdoor air into the outdoor unit 2, causing heat exchange between it and the refrigerant in the outdoor heat exchanger 23, and then discharging it to the outside. The outdoor fan 25 is rotationally driven by an outdoor fan motor M25.

The outdoor expansion valve 24 is an electric expansion valve whose valve opening degree can be controlled, and is provided between the outdoor heat exchanger 23 and the liquid-side shut-off valve 29 in the middle of the outdoor liquid-side piping 32.

The liquid-side shut-off valve 29 is a manual valve arranged at the connection part between the outdoor liquid-side piping 32 and the liquid refrigerant communication pipe 6.

The gas-side shut-off valve 30 is a manual valve arranged at the connection part between the outdoor gas-side piping 33 and the gas refrigerant communication pipe 7.

In the outdoor unit 2, various sensors are arranged.

Specifically, an inlet temperature sensor 35 that detects the inlet temperature serving as the temperature of the refrigerant at the inlet side of the compressor 21, an inlet pressure sensor 36 that detects the inlet pressure serving as the pressure of the refrigerant at the inlet side of the compressor 21, and a discharge pressure sensor 37 that detects the discharge pressure serving as the pressure of the refrigerant at the discharge side of the compressor 21, are arranged in the periphery of the compressor 21 of the outdoor unit 2.

In the outdoor heat exchanger 23, an outdoor heat exchange temperature sensor 38 that detects the temperature of the refrigerant flowing through the outdoor heat exchanger 23 is provided.

Further, an outside air temperature sensor 39 that detects the temperature of the outdoor air inhaled in the outdoor unit 2 is arranged in the periphery of the outdoor heat exchanger 23 or the outdoor fan 25.

The outdoor unit 2 has an outdoor unit control section 20 that controls the motion of each section that constitutes the outdoor unit 2. The outdoor unit control section 20 has a microcomputer that includes a CPU, a memory, and other elements. The outdoor unit control section 20 is connected to an indoor unit control section 57 of each indoor unit 50 via a communication line, and sends and receives control signals and the like. The outdoor unit control section 20 is electrically connected to each of the inlet temperature sensor 35, the inlet pressure sensor 36, the discharge pressure sensor 37, the outdoor heat exchange temperature sensor 38, and the outside air temperature sensor 39, and receives signals from each sensor.

Figure 3:
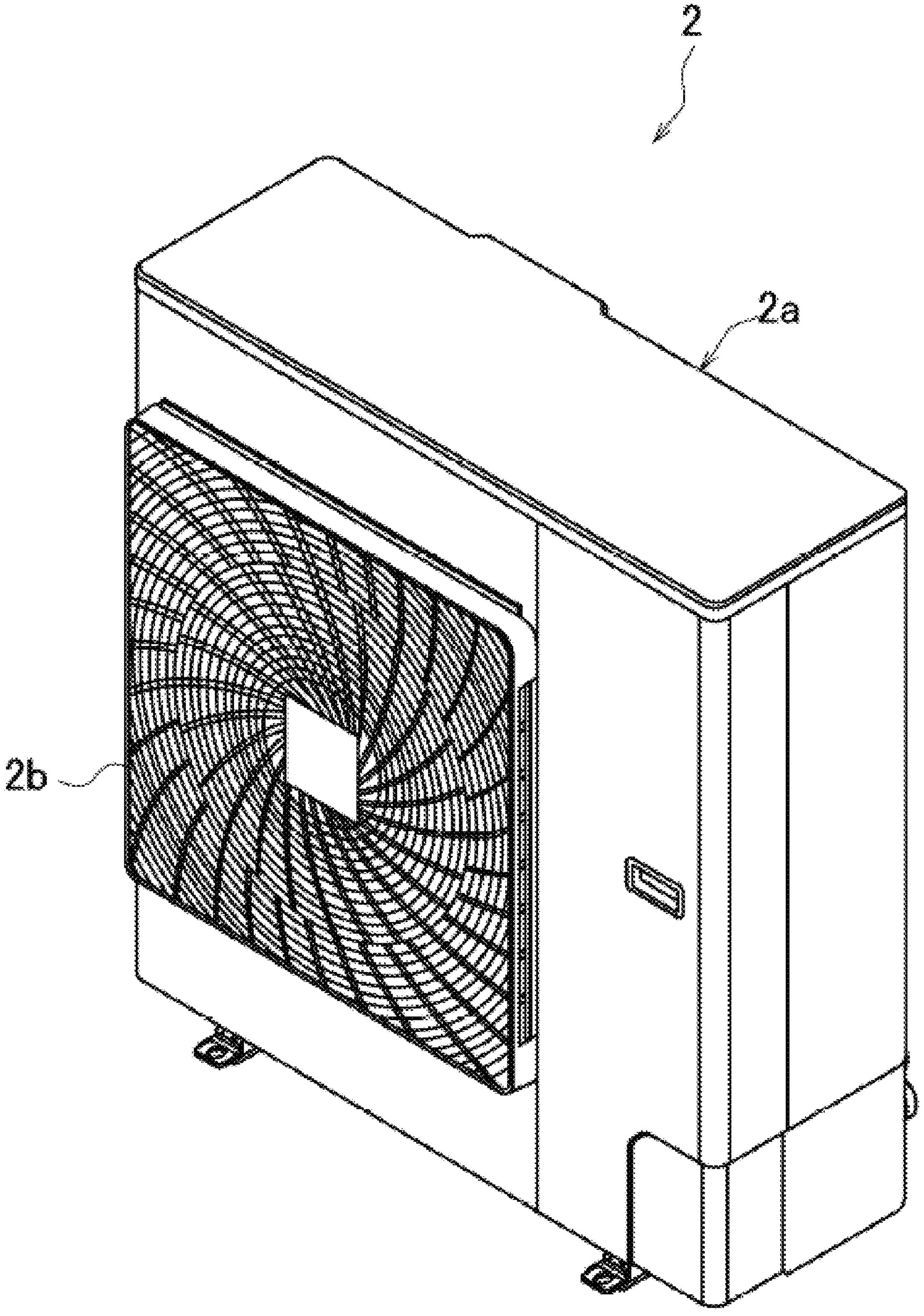
FIG. 3 is an external perspective view of an outdoor unit.
Figure 4:
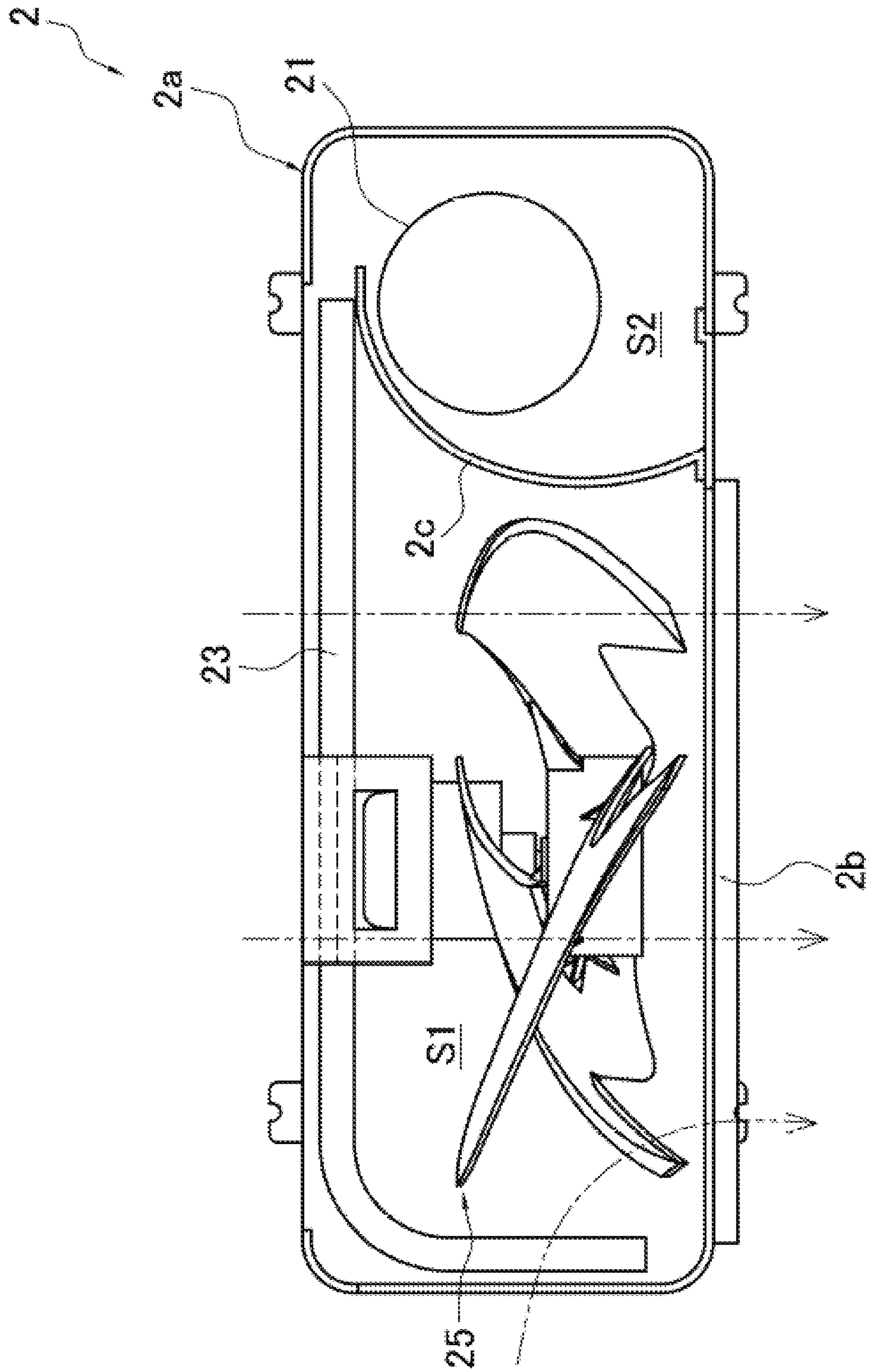
FIG. 4 is an arrangement configuration view of the outdoor unit seen from the upper surface.

Each element constituting the outdoor unit 2 described above is, as shown in the external perspective view in FIG. 3 and the arrangement configuration view seen from an upper surface in FIG. 4, accommodated in the outdoor casing 2*a*. The outdoor casing 2*a* is partitioned into a blower room S1 and a machine room S2 by a partition plate 2*c*. The outdoor heat exchanger 23 is provided in a posture where the main surface thereof stands in the vertical direction so as to extend, in the blower room S1, to the rear surface of the outdoor casing 2*a* and to the side surface opposite to the machine room S2. The outdoor fan 25 is a propeller fan using the rotational shaft direction as the front-to-back direction, and forms an airflow in which air is taken in the substantially horizontal direction from the rear surface of the outdoor casing 2*a* and the side surface opposite to the machine room S2 in the blower room S1 to the inside, and blown out to the front surface in the substantially horizontal direction via a fan grille 2*b* provided on the front surface of the outdoor casing 2*a* in the blower room S1 (see arrows with long dashed double-short dashed lines in FIG. 4). With the above constitution, the airflow formed by the outdoor fan 25 passes orthogonally to the main surface of the outdoor heat exchanger 23.

(1-2) Indoor Unit 50

The indoor unit 50 is installed on the wall, ceiling, or the like of a room, which is the target space. The indoor unit 50 is connected to the outdoor unit 2 via the liquid refrigerant communication pipe 6 and the gas refrigerant communication pipe 7, and constitutes a part of the refrigerant circuit 10.

The indoor unit 50 has an indoor expansion valve 51, an indoor heat exchanger 52, and an indoor fan 53.

The indoor unit 50 has an indoor liquid refrigerant pipe 58 that connects the liquid-side end of the indoor heat exchanger 52 and the liquid refrigerant communication pipe 6, and an indoor gas refrigerant pipe 59 that connects the gas-side end of the indoor heat exchanger 52 and the gas refrigerant communication pipe 7.

The indoor expansion valve 51 is an electric expansion valve whose valve opening degree can be controlled, and is provided in the middle of the indoor liquid refrigerant pipe 58.

The indoor heat exchanger 52 is a heat exchanger that functions as an evaporator for a low-pressure refrigerant in the refrigerant cycle during cooling operation and as a heat dissipator for a high-pressure refrigerant in the refrigerant cycle during heating operation.

The indoor fan 53 generates an airflow for inhaling indoor air into the indoor unit 50, causing heat exchange between the air and the refrigerant in the indoor heat exchanger 52, and then discharging the air to the outside. The indoor fan 53 is rotationally driven by an indoor fan motor M53.

In the indoor unit 50, various sensors are arranged.

Specifically, an indoor air temperature sensor 54 that detects the air temperature in the space in which the indoor unit 50 is installed, and an indoor heat exchange temperature sensor 55 that detects the temperature of the refrigerant flowing through the indoor heat exchanger 52 are arranged in the inside of the indoor unit 50.

The indoor unit 50 has an indoor unit control section 57 that controls the motion of each section that constitutes the indoor unit 50. The indoor unit control section 57 has a microcomputer that includes a CPU, a memory, and other elements. The indoor unit control section 57 is connected to the outdoor unit control section 20 via a communication line, and sends and receives control signals and the like.

The indoor unit control section 57 is electrically connected to each of the indoor air temperature sensor 54 and the indoor heat exchange temperature sensor 55, and receives signals from each sensor.

(1-3) Remote Controller 50*a*

The remote controller 50*a* is an input device for allowing the user of the indoor unit 50 to input various instructions for switching the operation state of the refrigerant cycle device 100. The remote controller 50*a* also functions as an output device for performing a notification of the operation state of the refrigerant cycle device 100 or a predetermined notification. The remote controller 50*a* is connected to the indoor unit control section 57 via a communication line, and they mutually send and receive control signals.

(2) Details of Controller 70

In the refrigerant cycle device 100, the outdoor unit control section 20 and the indoor unit control section 57 are connected via a communication line to constitute the controller 70 which controls the motion of the refrigerant cycle device 100.

Figure 2:
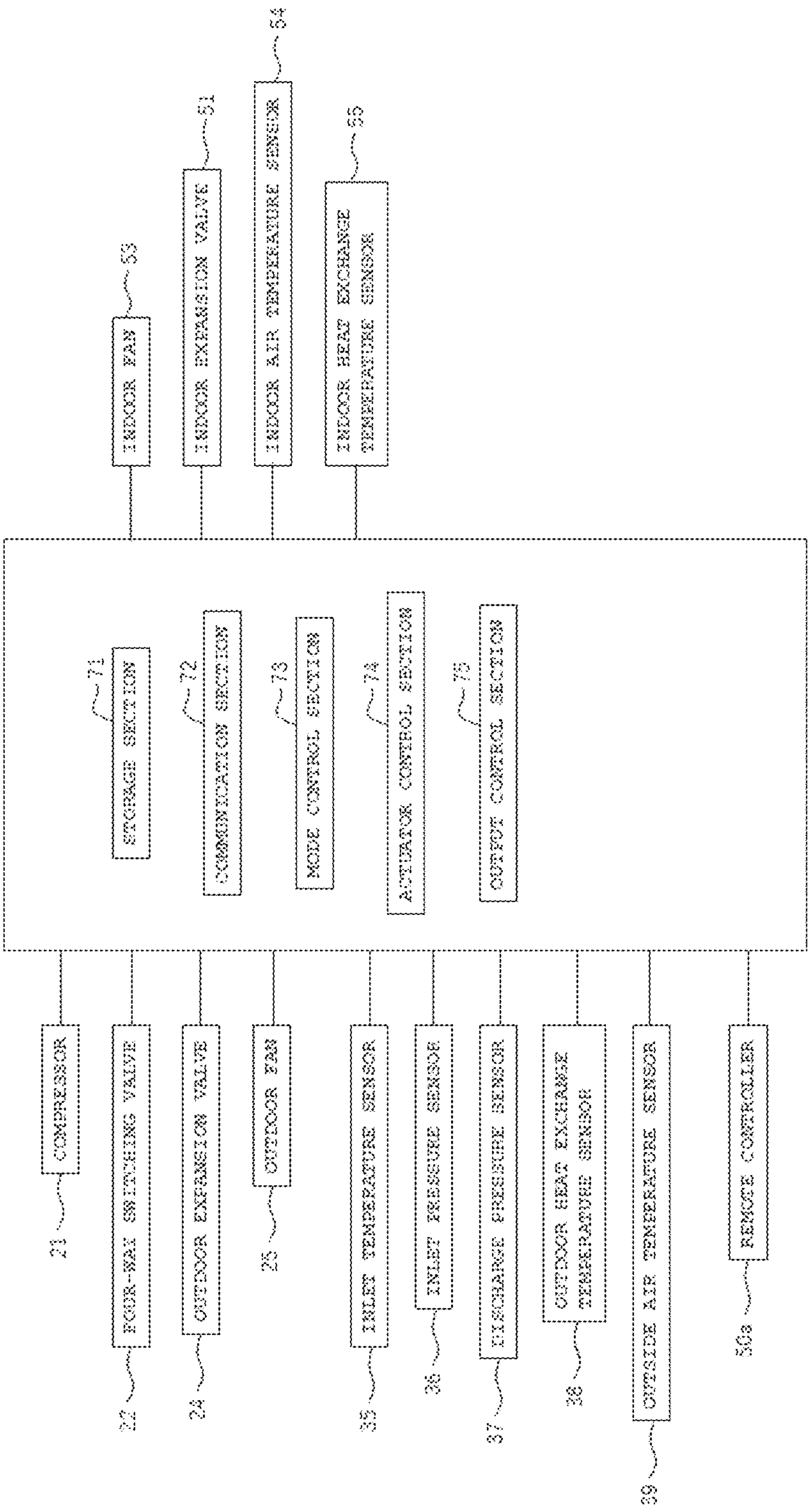
FIG. 2 is a schematic block configuration diagram of the refrigerant cycle device.

FIG. 2 is a block diagram schematically illustrating a schematic constitution of the controller 70 and each section connected to the controller 70.

The controller 70 has a plurality of control modes, and the operation of the refrigerant cycle device 100 is controlled according to the control mode. For example, the controller 70 has a cooling operation mode, a heating operation mode, and a defrosting operation mode, as the control modes.

The controller 70 is electrically connected to each actuator included in the outdoor unit 2 (specifically, the compressor 21 (compressor motor M21), the outdoor expansion valve 24, and the outdoor fan 25 (outdoor fan motor M25)) and each sensor (the inlet temperature sensor 35, the inlet pressure sensor 36, the discharge pressure sensor 37, the outdoor heat exchange temperature sensor 38, the outside air temperature sensor 39, and the like). The controller 70 is electrically connected to the actuators included in the indoor unit 50 (specifically, the indoor fan 53 (indoor fan motor M53) and the indoor expansion valve 51). The controller 70 is electrically connected to the indoor air temperature sensor 54, the indoor heat exchange temperature sensor 55, and the remote controller 50*a*.

The controller 70 mainly has a storage section 71, a communication section 72, a mode control section 73, an actuator control section 74, and an output control section 75. Each section in the controller 70 is realized by integrated functioning of each section included in the outdoor unit control section 20 and/or the indoor unit control section 57.

(2-1) Storage Section 71

The storage section 71 is constituted by, for example, ROM, RAM, and flash memory, and includes a volatile storage region and a non-volatile storage region. In the storage section 71, a control program that defines the processing in each section of the controller 70 is stored. In the storage section 71, predetermined information (e.g., detected values of each sensor, and the command inputted to the remote controller 50*a*) is suitably stored in a predetermined storage region by each section of the controller 70.

(2-2) Communication Section 72

The communication section 72 is a function section that plays a role as a communication interface for sending and receiving signals with each piece of equipment connected to the controller 70. The communication section 72 receives a request from the actuator control section 74 and sends a predetermined signal to a specified actuator. The communication section 72 receives signals outputted from the sensors 35 to 39, 54 and 55 and the remote controller 50*a*, and stores them in a predetermined storage region of the storage section 71.

(2-3) Mode Control Section 73

The mode control section 73 is a function section that switches the control mode and the like. In the mode control section 73, the cooling operation mode, the heating operation mode, and the defrosting operation mode are carried out by switching them according to the input from the remote controller 50*a* and the operation situation.

(2-4) Actuator Control Section 74

The actuator control section 74 controls the motion of each actuator (e.g., the compressor 21) included in the refrigerant cycle device 100 according to the control program and the situation.

For example, the actuator control section 74 controls the number of rotations of the compressor 21, the state of connection of the four-way switching valve 22, the number of rotations of the outdoor fan 25 and the indoor fan 53, the valve opening degree of the outdoor expansion valve 24, the valve opening degree of the indoor expansion valve 51, and the like in real time according to the set temperature, detected values of each sensor, the control mode, and the like.

(2-5) Output Control Section 75

The output control section 75 is a function section that controls the motion of the remote controller 50*a* serving as a display device.

The output control section 75 allows the remote controller 50*a* to output predetermined information to display the information according to the operation state or situation to the user.

(3) Various Operation Modes

Hereinafter, the refrigerant flow during the cooling operation mode, the heating operation mode, and the defrosting operation mode will be described.

(3-1) Cooling Operation Mode

In a refrigeration cycle device 100, the mode control section 73 switches the control mode to the cooling operation mode, so that the actuator control section 74 sets the state of connection of the four-way switching valve 22 to the cooling operation connection state in which the inlet side of the compressor 21 and the gas-side shut-off valve 30 are connected while connecting the discharge side of the compressor 21 and the outdoor heat exchanger 23. Consequently, the refrigerant filled in the refrigerant circuit 10 mainly circulates through the compressor 21, the outdoor heat exchanger 23, the outdoor expansion valve 24, the indoor expansion valve 51, and the indoor heat exchanger 52, in the order presented.

More specifically, when the mode is switched to the cooling operation mode, in the refrigerant circuit 10, the refrigerant is inhaled into the compressor 21, compressed, and then discharged.

The gas refrigerant that has been discharged from the compressor 21 passes through the discharge pipe 31 and the four-way switching valve 22, and flows into the gas-side end of the outdoor heat exchanger 23.

The gas refrigerant that has flowed into the gas-side end of the outdoor heat exchanger 23 undergoes heat exchange with the outdoor-side air supplied by the outdoor fan 25 and is dissipated and condensed in the outdoor heat exchanger 23 to become a liquid refrigerant, which flows out of the liquid-side end of the outdoor heat exchanger 23.

The liquid refrigerant that has flowed out of the liquid-side end of the outdoor heat exchanger 23 passes through the outdoor liquid-side piping 32, the outdoor expansion valve 24, the liquid-side shut-off valve 29, and the liquid refrigerant communication pipe 6, and flows into the indoor unit 50. In the cooling operation mode, the outdoor expansion valve 24 is controlled so as to be in a fully open state.

The refrigerant that has flowed into the indoor unit 50 passes through a part of the indoor liquid refrigerant pipe 58 and flows into the indoor expansion valve 51. The refrigerant that has flowed into the indoor expansion valve 51 is decompressed to a low pressure in the refrigerant cycle by the indoor expansion valve 51, and then flows into the liquid-side end of the indoor heat exchanger 52. The valve opening degree of the indoor expansion valve 51 is controlled in the cooling operation mode so that the degree of superheating of the inlet refrigerant of the compressor 21 can be a predetermined degree of superheating. Here, the degree of superheating of the inlet refrigerant of the compressor 21 is calculated by the controller 70 by using the detection temperature by the inlet temperature sensor 35 and the detection pressure by the inlet pressure sensor 36. The refrigerant that has flowed into the liquid-side end of the indoor heat exchanger 52 undergoes heat exchange in the indoor heat exchanger 52 with the indoor air supplied by the indoor fan 53 and is evaporated to become a gas refrigerant, which flows out of the gas-side end of the indoor heat exchanger 52. The gas refrigerant that has flowed out of the gas-side end of the indoor heat exchanger 52 flows into the gas refrigerant communication pipe 7 via the indoor gas refrigerant pipe 59.

Thus, the refrigerant flowing through the gas refrigerant communication pipe 7 passes through the gas-side shut-off valve 30, the outdoor gas-side piping 33, the four-way switching valve 22, and the inlet pipe 34, and is again inhaled into the compressor 21.

(3-2) Heating Operation Mode

In a refrigeration cycle device 100, the mode control section 73 switches the control mode to the heating operation mode, so that the actuator control section 74 sets the state of connection of the four-way switching valve 22 to the heating operation connection state in which the inlet side of the compressor 21 and the outdoor heat exchanger 23 are connected while connecting the discharge side of the compressor 21 and the gas-side shut-off valve 30. Consequently, the refrigerant filled in the refrigerant circuit 10 mainly circulates through the compressor 21, the indoor heat exchanger 52, the indoor expansion valve 51, the outdoor expansion valve 24, and the outdoor heat exchanger 23, in the order presented.

More specifically, when the mode is switched to the heating operation mode, in the refrigerant circuit 10, the refrigerant is inhaled into the compressor 21, compressed, and then discharged.

The gas refrigerant that has been discharged from the compressor 21 flows through the discharge pipe 31, the four-way switching valve 22, the outdoor gas-side piping 33, and the gas refrigerant communication pipe 7, and then flows into the indoor unit 50 via the indoor gas refrigerant pipe 59.

The refrigerant that has flowed into the indoor unit 50 passes through the indoor gas refrigerant pipe 59 and flows into the gas-side end of the indoor heat exchanger 52. The refrigerant that has flowed into the gas-side end of the indoor heat exchanger 52 undergoes heat exchange in the indoor heat exchanger 52 with the indoor air supplied by the indoor fan 53 and is dissipated and condensed to become a liquid refrigerant, which flows out of the liquid-side end of the indoor heat exchanger 52. The refrigerant that has flowed out of the liquid-side end of the indoor heat exchanger 52 flows into the liquid refrigerant communication pipe 6 via the indoor liquid refrigerant pipe 58 and the indoor expansion valve 51. The valve opening degree of the indoor expansion valve 51 is controlled so as to be in a fully open state in the heating operation mode.

Thus, the refrigerant flowing through the liquid refrigerant communication pipe 6 flows into the outdoor expansion valve 24 via the liquid-side shut-off valve 29 and the outdoor liquid-side piping 32.

The refrigerant that has flowed into the outdoor expansion valve 24 is decompressed to a low pressure in the refrigerant cycle, and then flows into the liquid-side end of the outdoor heat exchanger 23. The valve opening degree of the outdoor expansion valve 24 is controlled in the heating operation mode so that the degree of superheating of the inlet refrigerant of the compressor 21 can be a predetermined degree of superheating.

The refrigerant that has flowed into the outdoor heat exchanger 23 from its liquid-side end undergoes heat exchange with the outdoor air supplied by the outdoor fan 25 and is evaporated in the outdoor heat exchanger 23 to become a gas refrigerant, which flows out of the gas-side end of the outdoor heat exchanger 23.

The refrigerant that has flowed out of the gas-side end of the outdoor heat exchanger 23 passes through the four-way switching valve 22 and the inlet pipe 34, and is again inhaled into the compressor 21.

(3-3) Defrosting Operation Mode

When predetermined frost formation conditions are satisfied while the heating operation mode is carried out as described above, the mode control section 73 temporarily interrupts the heating operation mode, and switches the control mode to the defrosting operation mode for melting the frost attached to the outdoor heat exchanger 23.

The predetermined frost formation conditions are not limited, but for example, can be set such that the state where the detection temperature in the outside air temperature sensor 39 and the detection temperature in the outdoor heat exchange temperature sensor satisfy predetermined temperature conditions continues for a predetermined time or longer.

In the defrosting operation mode, the actuator control section 74 makes the state of connection of the four-way switching valve 22 the same as the state of connection during cooling operation, and drives the compressor 21 in a state where the drive of the indoor fan 53 is stopped. When predetermined defrosting termination conditions are satisfied after the start of the defrosting operation mode (e.g., when a predetermined time is passed after the start of the defrosting operation mode), the actuator control section 74 returns the state of connection of the four-way switching valve 22 again to the state of connection during the heating operation, and restarts the heating operation mode.

(4) Structure of Outdoor Heat Exchanger 23

Figure 5:
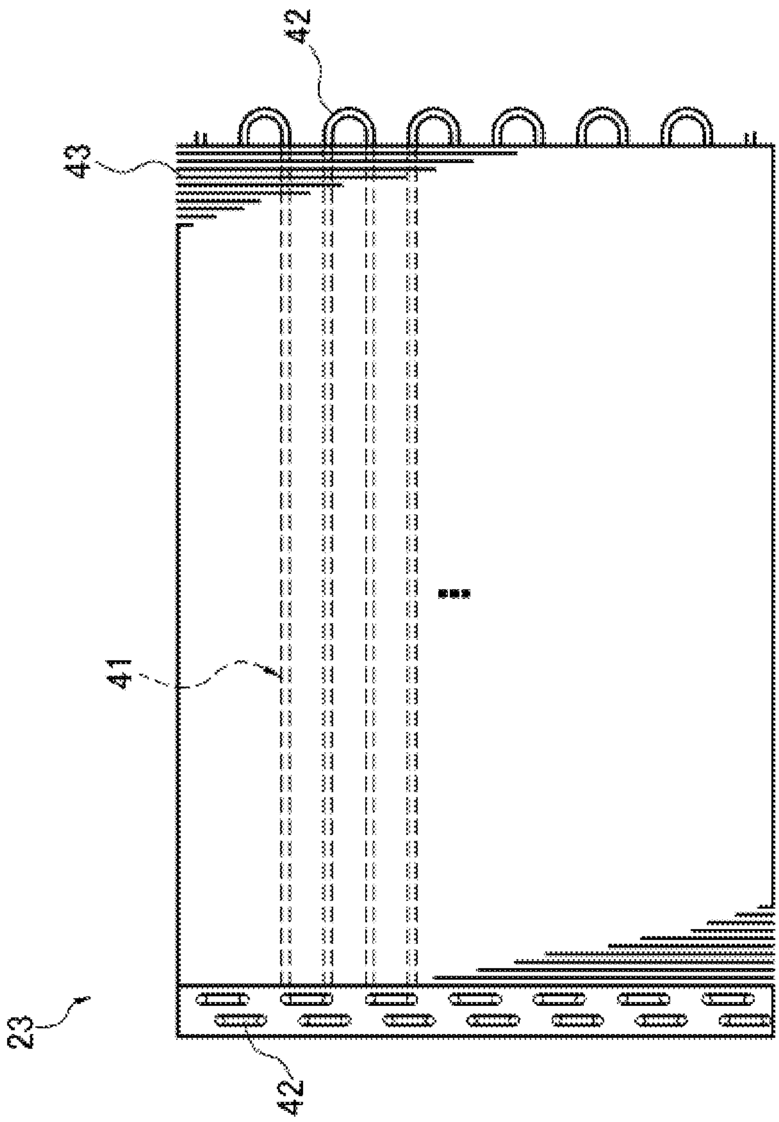
FIG. 5 is a schematic front view of an outdoor heat exchanger.

The outdoor heat exchanger 23 has, as shown in the schematic front view of the outdoor heat exchanger 23 in FIG. 5, a plurality of heat transfer pipes 41 elongated in the horizontal direction, a plurality of U-shaped pipes 42 that connect end parts of heat transfer pipes 41, and a plurality of fins 43 (heat transfer fins) extended in the vertical and airflow direction.

Figure 6:
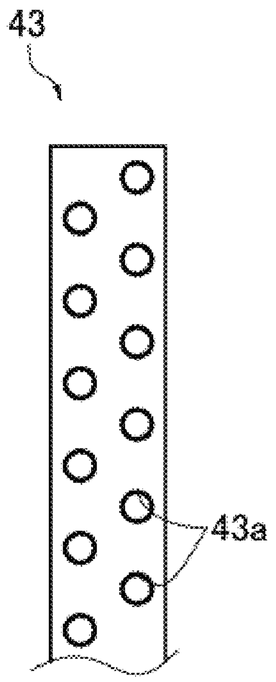
FIG. 6 is a schematic external view of the main surface of a fin seen from the normal direction.

The heat transfer pipe 41 is constituted of copper, copper alloy, aluminum, aluminum alloy, or the like, and is used by being fixed to the fin 43 so as to penetrate through an insertion opening 43*a* provided on the fin 43, as shown in the schematic external view of the main surface of the fin 43 seen from the normal direction in FIG. 6. A U-shaped pipe 42 is connected to the end part of the heat transfer pipe 41 to allow the refrigerant flowing inside to turn back and flow.

(5) Structure of Fin 43

The fin 43 has a substrate 62, and a water-repellent coating formed on the surface of the substrate 62. The substrate 62 has a plurality of protruding portions 61 provided on the surface thereof, as shown in the schematic cross-sectional view in the vicinity of the surface of the fin 43 in FIG. 7 in the case where the protruding portions 61 are in a truncated cone shape and the schematic view seen from the plate thickness direction of the fin 43 in FIG. 8. The protruding portion 61 is not an essential constitution.

The fins 43 are arranged in parallel so that the main surfaces of the fins face to each other at a predetermined distance. The distance of the space between the main surfaces of the fins facing each other is preferably 0.5 mm or more, and more preferably 1.0 mm or more. By increasing the distance more, clogging between the fins can be more suppressed. The distance between the main surfaces of the fins facing each other is preferably 3.0 mm or less, more preferably 2.0 mm or less, and still more preferably 1.5 mm or less. By reducing the distance more, the heat exchanger can be more downsized, the number of fins can be more easily increased, and the heat exchange function is improved.

(5-1) Substrate 62

The substrate 62 is a plate-shaped member having protruding portions 61, and is 70 μm or more and 200 μm or less (excluding protruding portions 61), and preferably 90 μm or more and 110 μm or less. The substrate 62 is an aluminum substrate. The aluminum substrate refers to a member in which at least the surface part is constituted by an aluminum layer. The aluminum substrate has an anodized film on the surface.

The aluminum substrate is made of aluminum preferably having a purity of 99.99% or more, and more preferably 99.999% or more.

(5-2) Protruding Portion 61

The protruding portion 61 is formed on both surfaces of the substrate 62. The protruding portion 61 is covered with a water-repellent coating.

Figure 9:
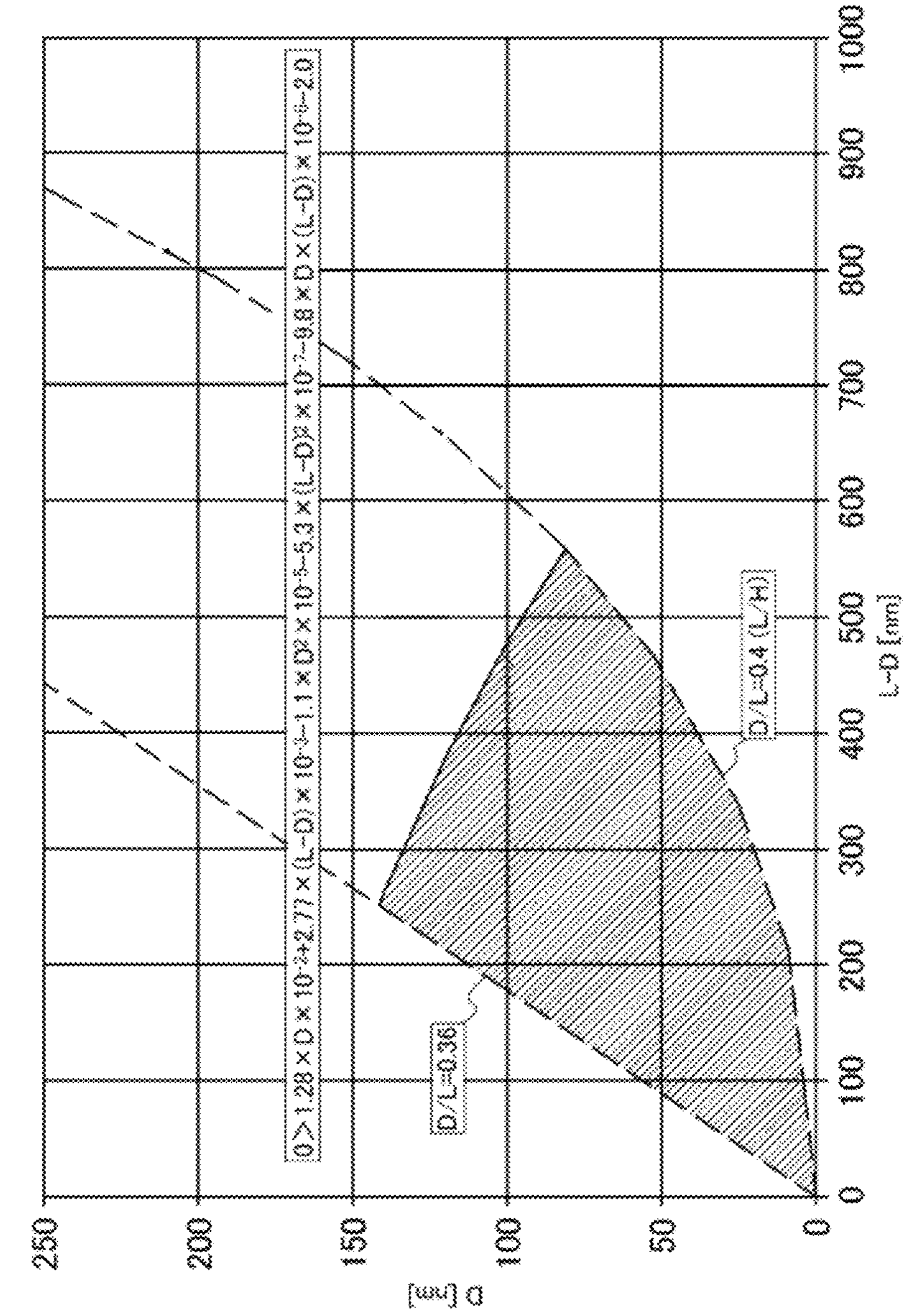
FIG. 9 is a graph illustrating the relationship of Expression 1.

A plurality of protruding portions 61 is formed such that the relationship of Expression 1 is satisfied, when L is taken as an average pitch of the plurality of protruding portions 61, D is taken as an average diameter of the plurality of protruding portions 61, H is taken as an average height of the plurality of protruding portions 61, and θ is taken as a contact angle of water on a smooth plane of the water-repellent coating. FIG. 9 is a graph illustrating a region satisfying the relationship of Expression 1 by hatching, in which the vertical axis represents the average diameter D of the protruding portions 61 and the horizontal axis represents a gap (L-D) between protruding portions 61.

(Expression 1)

$$D/L < 0.36 \quad (1\text{-}1)$$

$$D/L > 0.4 \times (L/H) \quad (1\text{-}2)$$

$$H > 700 \text{ nm} \quad (1\text{-}3)$$

$$0 > 1.28 \times D \times 10^{-2} + 2.77 \times (L-D) \times 10^{-3} - 1.1 \times D^2 \times 10^{-5} - 5.3 \times (L-D)^2 \times 10^{-7} - 9.8 \times D \times (L-D) \times 10^{-6} - 2.0 \quad (1\text{-}4)$$

$$90° < \theta < 120° \quad (1\text{-}5)$$

Figure 10:
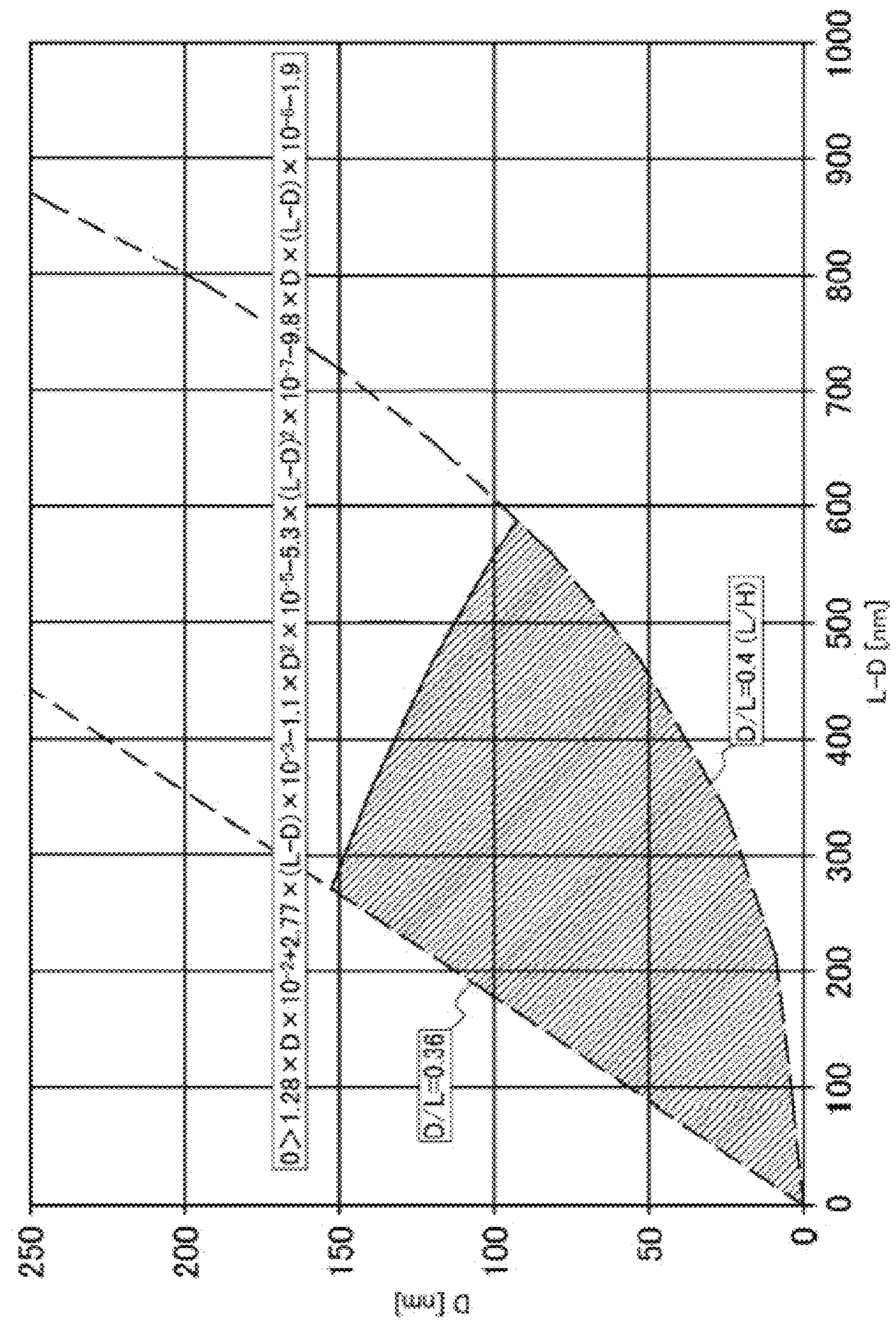
FIG. 10 is a graph illustrating the relationship of Expression 2.

The plurality of protruding portions 61 is preferably formed such that the following relationship of Expression 2 is further satisfied. FIG. 10 is a graph illustrating a region satisfying the relationship of Expression 2 by hatching, in which the vertical axis represents the average diameter D of the protruding portions 61 and the horizontal axis represents a gap (L-D) between protruding portions 61.

(Expression 2)

$$0 > 1.28 \times D \times 10^{-2} + 2.77 \times (L-D) \times 10^{-3} - 1.1 \times D^2 \times 10^{-5} - 5.3 \times (L-D)^2 \times 10^{-7} - 9.8 \times D \times (L-D) \times 10^{-6} - 1.9 \quad (2\text{-}1)$$

The plurality of protruding portions 61 is preferably formed such that the following relationship of Expression 3 is further satisfied.

(Expression 3)

$$H > 2{,}700 \text{ nm} \quad (3\text{-}1)$$

Figure 7:
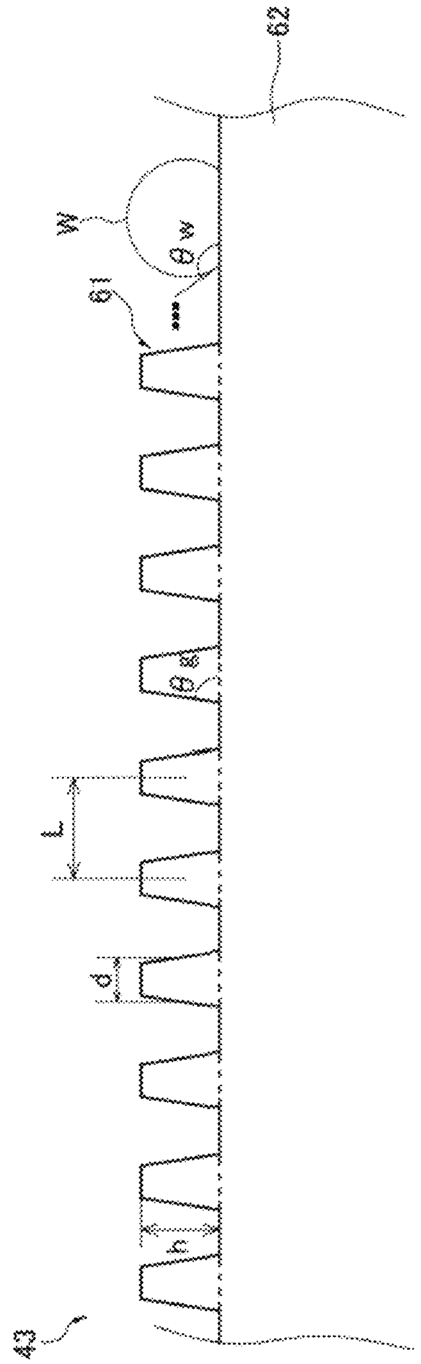
FIG. 7 is a schematic cross-sectional view of the fin in the vicinity of the surface when protruding portions have a truncated cone shape.
Figure 8:
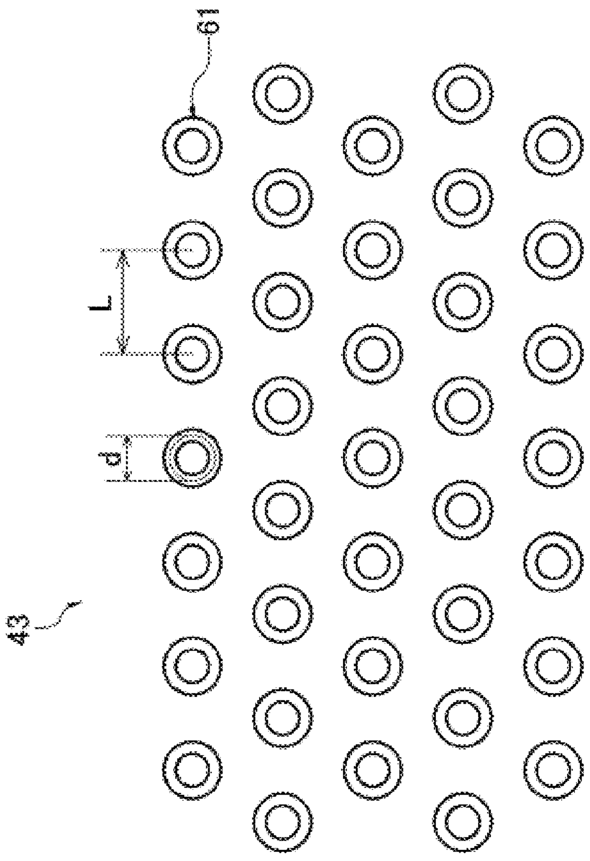
FIG. 8 is a schematic view of the fin seen from the plate thickness direction.

The shape of the protruding portions 61 is not limited, and examples thereof include frustums such as a truncated cone as shown in FIG. 7 (a shape obtained by cutting a circular cone by a plane parallel to the bottom surface and removing the small circular cone part) and a truncated pyramid; conic solids such as a cone, a pyramid, and a quadrangular pyramid; prisms (cylindrical bodies having two congruent planes as the bottom surface and the top surface) such as a cylinder, a prism, and a quadrangular prism; and necked shapes (e.g., a shape in which the area of a cutting plane vertical to the protruding direction of the protruding portions 61 has the minimum value in the protruding direction, such as a shape obtained by removing a part of the side surface of a cylinder, a shape obtained by removing a part of the side surface of a prism, and a shape obtained by removing a part of the side surface of a truncated cone).

Figure 11:
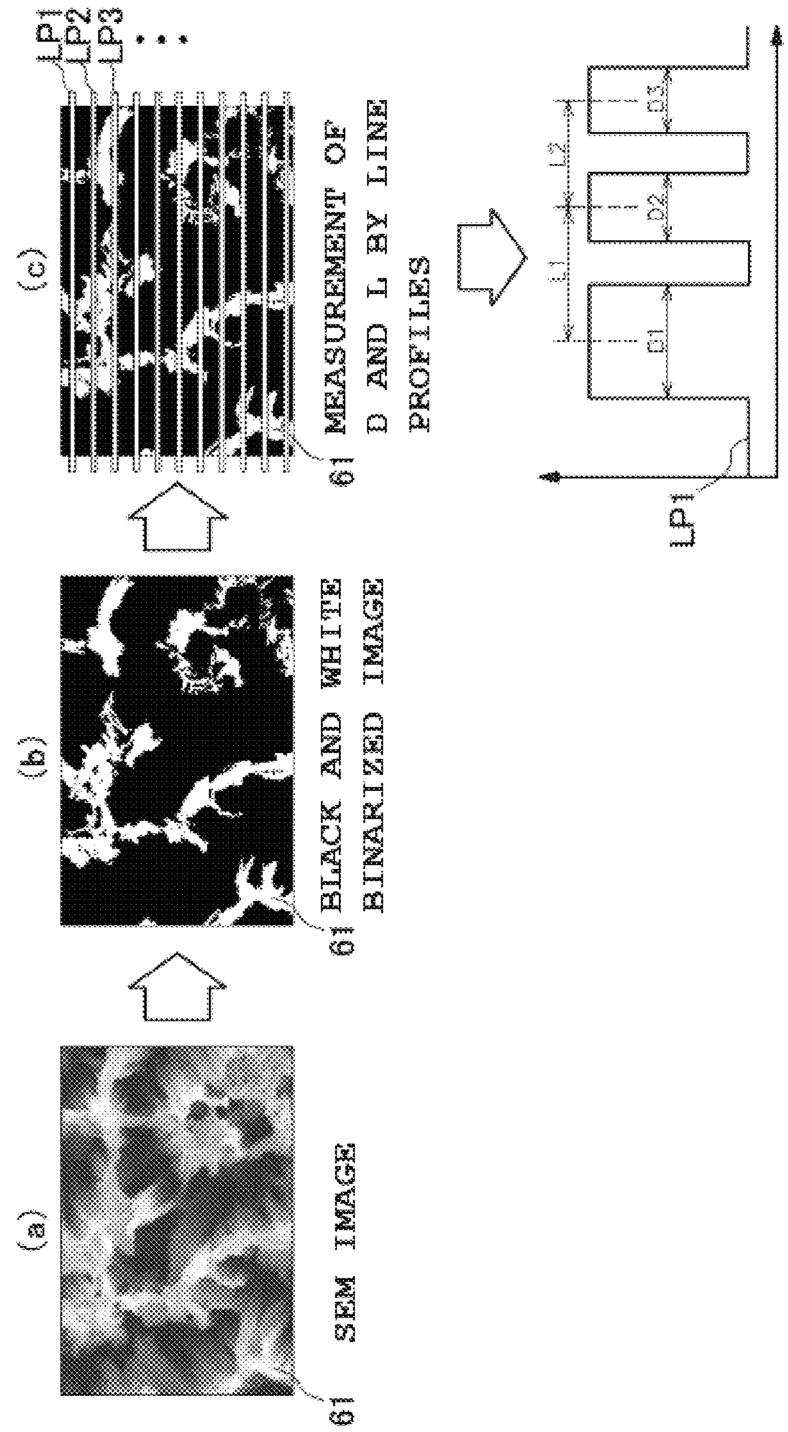
FIG. 11 is a diagram illustrating the measurement method of an average pitch L and an average diameter D of a plurality of protruding portions.

The average pitch L of the plurality of protruding portions 61 and the average diameter D of the plurality of protruding portions 61 can be measured by the following method using a scanning electron microscope (hereinafter, abbreviated as SEM). In the present disclosure, S-4800 FE-SEM (Type II) manufactured by Hitachi High-Tech Corporation is used in the measurement. FIG. 11 is a diagram illustrating the measurement method of the average pitch L of the plurality of protruding portions 61 and the average diameter D of the plurality of protruding portions 61.

First, a gray scale image of the surface of the fin 43 having a plurality of protruding portions 61 observed from the direction orthogonal to the substrate 62 is obtained by SEM. Observation conditions are such that the accelerating voltage is 5.0 kV, the emission current is 10 μA, the working distance (the distance from the lower surface of the objective lens to the focus plane) is 8.0 nm, and the inclination angle of the stage is 0°, and the secondary electron detector is an upper detector.

When halation such that the tone of a bright area is lost and whitened or black crushing such that the tone of a dark area is lost and blackened is generated in the observed SEM image, the luminance and the contrast may be suitably adjusted. The resolution of the photographed image is not limited, and is preferably 350×500 pixels or more. FIG. 11(*a*) is an example of an observed SEM image.

Next, the obtained SEM image is subjected to binarization processing to obtain a binarized image. In the binarization processing, a binarized image is produced by using 30% of the upper limit of the RGB values of pixels constituting the SEM image as a threshold, and determining pixels brighter than the threshold as white and other pixels as black. FIG. 11(*b*) is a binarized image obtained from the SEM image of FIG. 11(*a*).

By subjecting the SEM image to the binarization processing, the periphery of the tops of the protruding portions 61, which are brightly displayed on the SEM image due to being close to the objective lens, is displayed in white, and regions other than the tops of the protruding portions 61 apart from the objective lens are displayed in black, so that the boundary between the tops of the protruding portions 61 and other regions becomes clear.

The aforementioned threshold is an example, and the threshold can be suitably set according to the shape of the plurality of protruding portions 61.

Next, by reading line profiles of the obtained binarized image, the average pitch L of the plurality of protruding portions 61 and the average diameter D of the plurality of protruding portions 61 are measured. Specifically, a plurality of line profiles LP1, LP2, LP3 . . . LPn elongated in the same direction is depicted at equal intervals on the obtained binarized image, pitches L1, L2, L3 . . . Ln and diameters D1, D2, D3 . . . Dn of the protruding portions 61 are determined from the line profiles LP, and based on these, the average pitch L of the plurality of protruding portions 61 and the average diameter D of the plurality of protruding portions 61 are calculated. The number of line profiles LP is not limited, but is preferably 350 or more in the case of the image of the aforementioned resolution. FIG. 11(*c*) is a schematic diagram illustrating the measurement of the average pitch L of the plurality of protruding portions 61 and the average diameter D of the plurality of protruding portions 61 using the binarized image of FIG. 11(*b*).

Since the boundary between the tops of the protruding portions 61 and other regions in the binarized image is clear by the binarization processing, reading using the line profiles of the pitches L1, L2, L3 . . . Ln and the diameters D1, D2, D3 . . . Dn of the protruding portions 61 is easier than reading from the SEM image.

Figure 12:
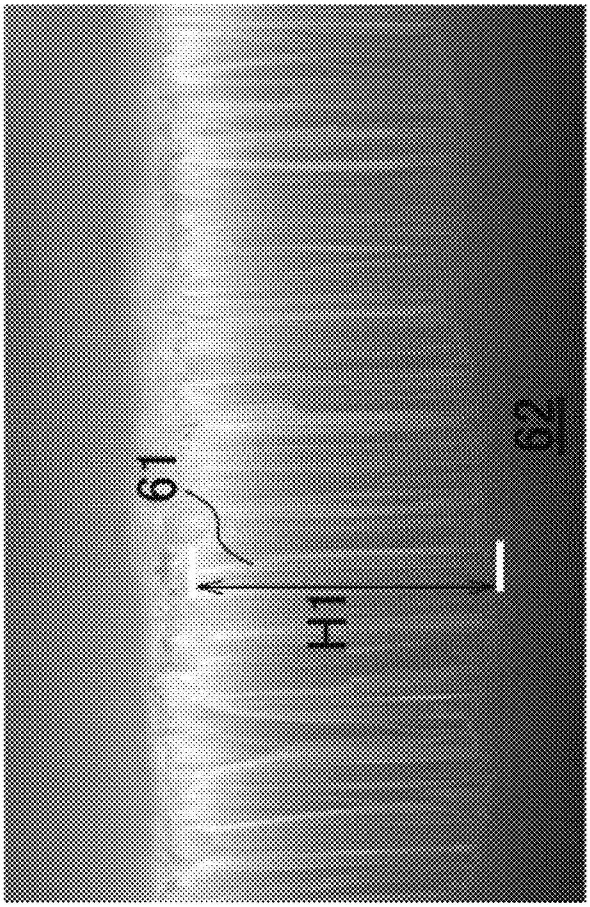
FIG. 12 is an image illustrating the measurement method of an average height H of the plurality of protruding portions.

The average height H of the plurality of protruding portions 61 is measured by using an image obtained by observing the cross section of the fin 43 by SEM. FIG. 12 is an image illustrating the method for measuring the average height H of the protruding portions 61 by using the image obtained by observing the cross section of the fin 43 by SEM.

As shown in FIG. 12, the average height H of the plurality of protruding portions 61 is calculated based on the distances H1, H2, H3 . . . Hn between the top of each protruding portion 61 and the bottom of each protruding portion 61 along the extending direction of the protruding portions 61, which can be read from the image obtained by observing the cross section of the fin 43.

The average height H of the plurality of protruding portions 61 can also be observed under the same conditions as those of the average pitch L of the plurality of protruding portions 61 and the average diameter D of the plurality of protruding portions 61.

(5-3) Production Method of Protruding Portions 61

Figure 14:
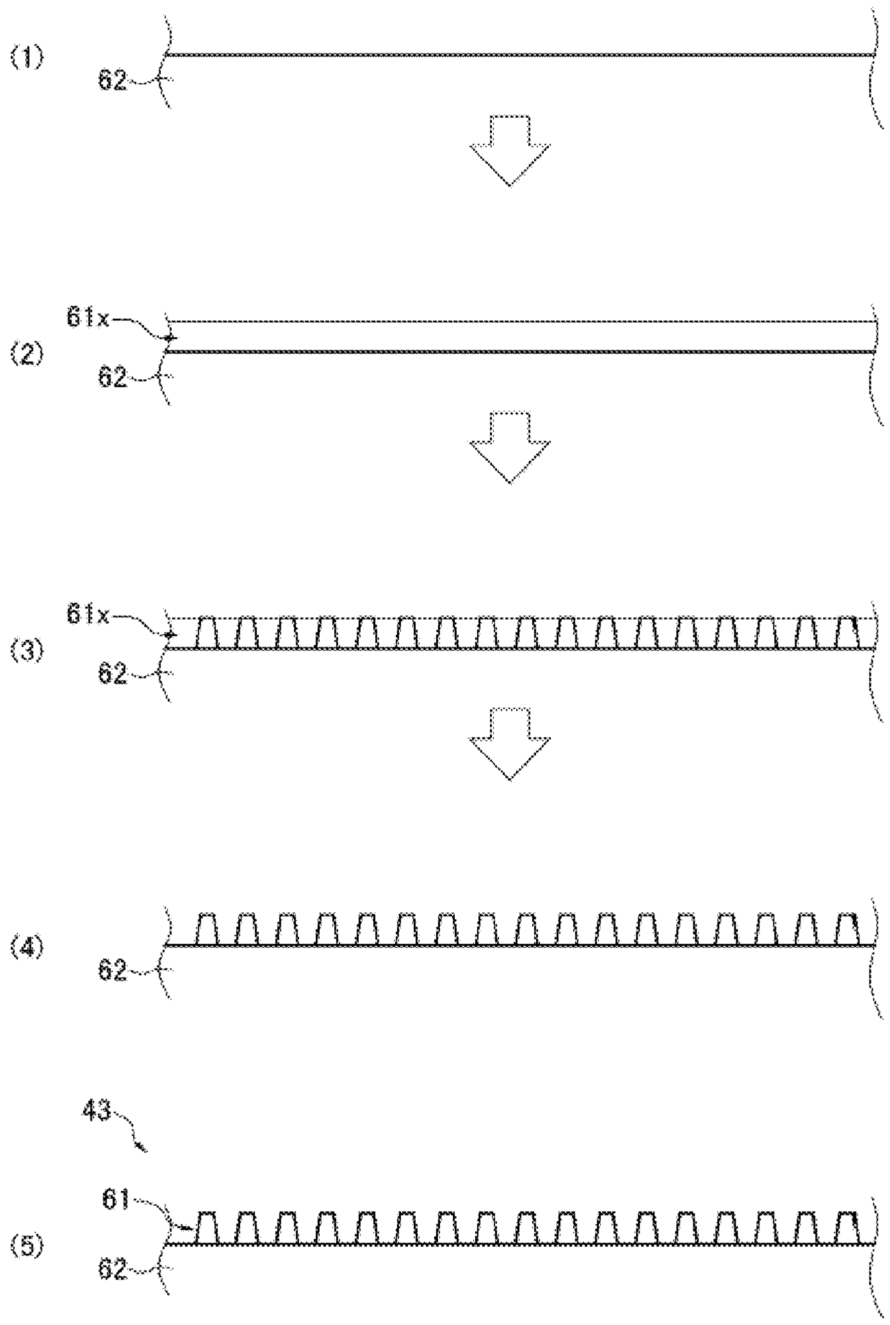
FIG. 14 is a diagram illustrating the production example of the fin.

The method for producing the protruding portions 61 is not limited, but examples thereof include the method shown in FIG. 14.

First, as shown in (1), a substrate 62 whose surface is a smooth plate-shaped member is prepared. The substrate 62 is constituted by a metal such as an aluminum alloy or silicone.

Next, as shown in (2), a layer having a specific film thickness is formed on the surface of the substrate 62. The layer is constituted by aluminum.

Then, as shown in (3), the layer formed in (2) is subjected to masking at a specific distance and irradiated with plasma. The average pitch L and the shape of the protruding portion including the average diameter d of the protruding portions 61 are respectively controlled by the distance of masking and the shape of masking. Above all, when the shape of the protruding portions 61 is a shape in which the area of a cutting plane vertical to the protruding direction of the protruding portions 61 includes at least one minimum value in the protruding direction, the shape of the prisms forming the protruding portions 61 can be controlled by adjusting each of the irradiation amount and irradiation time of plasma.

Next, as shown in (4), etching is carried out to form a protruding shape having a specific shape and a specific pattern. Here, the height of the protruding portion is controlled by the etching time.

The formation of projections and recesses is not limited to the plasma etching treatment, and for example, a publicly known method such as an anodization treatment, a boehmite treatment, or an alumite treatment can be used.

Finally, as shown in (5), a water-repellent coating is formed on the protruding portions 61 and the surface of the substrate 62 on which the protruding portions 61 are not formed. As the fluoropolyether group-containing compound for forming the water-repellent coating, one having a larger binding force between the molecules of the fluoropolyether group-containing compound and each of the protruding portions 61 and the substrate 62 than the binding force between the molecules of the fluoropolyether group-containing compound is selected, the fluoropolyether group-containing compound is coated, and then excess coating materials other than those on the surface layer are washed out, thus projections and recesses before coating can be substantially maintained.

(5-4) Anodized Film

An anodized film is formed on the surface of the substrate 62.

The anodized film can be formed by anodization of the surface of the aluminum substrate using an anodizing liquid containing one or two or more compounds selected from the group consisting of phosphoric acid, pyrophosphoric acid, oxalic acid, malonic acid, and etidronic acid, without limitation.

The concentration of the anodizing liquid is preferably 0.01 to 1.0 mol/L, and more preferably 0.05 to 0.5 mol/L.

The temperature of the anodizing liquid is preferably room temperature, for example, 15 to 30° C., and more preferably 20 to 30° C.

The voltage applied in the anodization is preferably 40 to 300 V, and more preferably 150 to 300 V.

The treatment time of the anodization is preferably 10 to 120 min, and more preferably 10 to 60 min.

(5-5) Etching Treatment

After the formation of the anodized film, an etching treatment is carried out to form protruding portions.

The etching treatment is carried out by using an etching liquid containing one or two or more compounds selected from the group consisting of phosphoric acid, pyrophosphoric acid, oxalic acid, malonic acid, and etidronic acid, without limitation.

The concentration of the etching liquid is preferably 10 to 60% by mass, and more preferably 30 to 55% by mass.

The temperature of the etching liquid is preferably 20 to 60° C., and more preferably 40 to 55° C.

The treatment time of the etching treatment is preferably 5 to 30 min, and more preferably 10 to 25 min.

(5-6) Water-Repellent Coating

The water-repellent coating is formed on the surface of the substrate 62, and since having a very thin film thickness, the water-repellent coating does not affect the surface structure of the fin 43 with the protruding portions 61.

The water-repellent coating is a layer formed of a fluoropolyether group-containing compound. That is, the material constituting the water-repellent coating has a fluoropolyether group. While the present disclosure is not limited by any theory, the surface of the aluminum substrate has the water-repellent coating having a fluoropolyether group, so that water droplets are hardly attached thereto by the water-repellent effect, and even when water droplets are attached, a supercooled state can be held to further low temperatures, and consequently, the growth of frost is considered to be suppressed.

Specifically, the film thickness of the water-repellent coating constituting the surface layer of the protruding portions 61 and the substrate 62 is, for example, 0.3 nm or more and 20 nm or less, and preferably 1 nm or more and 17 nm or less.

As shown in FIG. 7, the contact angle θ of water W on the smooth plane of the water-repellent coating is 90°<θ<120°. Consequently, the contact area between droplets (water droplets) and the fin 43 can be minimized. From the viewpoint of sufficiently minimizing the contact area between droplets and the fin 43, the contact angle θ is more preferably 114°<θw<120°.

Examples of the method for forming the water-repellent coating include a method for treating an aluminum substrate with a surface-treating agent containing a fluoropolyether group-containing compound.

(5-7) Fluoropolyether Group-Containing Compound

The fluoropolyether group-containing compound is not limited as long as it can form a layer thereof on the aluminum substrate surface.

In a preferred embodiment, the fluoropolyether group-containing compound is a compound represented by the following formula (1) or (2):

$$R^{F1}_{\alpha}—X^{A}—R^{Si}_{\beta} \quad (1)$$

$$R^{SF}_{\gamma}—X^{A}—R^{F2}—X^{A}—R^{SF}_{\gamma} \quad (2)$$

wherein $R^{F1}$ is each independently at each occurrence $Rf^1$—$R^F$—$O_q$—;

$R^{F2}$ is —$Rf^2_p$—$R^F$—$O_q$—;

$Rf^1$ is each independently at each occurrence a $C_{1-16}$ alkyl group optionally substituted with one or more fluorine atoms;

$Rf^2$ is a $C_{1-6}$ alkylene group optionally substituted with one or more fluorine atoms;

$R^F$ is each independently at each occurrence a divalent fluoropolyether group;

p is 0 or 1;

q is each independently at each occurrence 0 or 1;

$R^{Si}$ is each independently at each occurrence a monovalent group containing a Si atom to which a hydroxyl group, a hydrolyzable group, a hydrogen atom, or a monovalent organic group is bonded;

at least one $R^{Si}$ is a monovalent group containing a Si atom to which a hydroxyl group or a hydrolyzable group is bonded;

$R^{SF}$ is each independently at each occurrence $R^{Si}$ or $Rf^1—R^F—O_q$ at least one $R^{SF}$ is $R^{Si}$;

$X^A$ is each independently a single bond or a di- to decavalent organic group;

α is an integer of 1 to 9;

β is an integer of 1 to 9; and

γ is each independently an integer of 1 to 9.

The term "monovalent organic group", as used herein, refers to a monovalent group containing carbon. The monovalent organic group is not limited, and may be a hydrocarbon group or a derivative thereof. The derivative of the hydrocarbon group refers to a group that has one or more of N, O, S, Si, amide, sulfonyl, siloxane, carbonyl, carbonyloxy, and the like at the terminal or in the molecular chain of the hydrocarbon group. The term simply referred to as an "organic group" means a monovalent organic group. The term "di- to decavalent organic group" means a di- to decavalent group containing a carbon. The di- to decavalent organic group may be, but is not limited to, a di- to decavalent group obtained by further removing 1 to 9 hydrogen atoms from an organic group. The divalent organic group is not limited, and examples thereof include divalent groups obtained by further removing one hydrogen atom from an organic group.

The term "hydrocarbon group", as used herein, refers to a group that contains carbon and hydrogen and that is obtained by removing one hydrogen atom from a hydrocarbon. The hydrocarbon group is not limited, and examples include a $C_{1-20}$ hydrocarbon group optionally substituted with one or more substituents, such as an aliphatic hydrocarbon group and an aromatic hydrocarbon group. The "aliphatic hydrocarbon group" may be either linear, branched, or cyclic, and may be either saturated or unsaturated. The hydrocarbon group may contain one or more ring structures.

The substituent of the "hydrocarbon group", as used herein, is not limited, and examples include one or more groups selected from a halogen atom, and a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5 to 10-membered heterocyclyl group, a 5 to 10-membered unsaturated heterocyclyl group, a $C_{6-10}$ aryl group, and a 5 to 10-membered heteroaryl group each optionally substituted with one or more halogen atoms.

The "hydrolyzable group", as used herein, refers to a group capable of undergoing a hydrolysis reaction, i.e., refers to a group that can be eliminated from the main backbone of a compound by a hydrolysis reaction. Examples of the hydrolyzable group include $—OR^j$, $—OCOR^j$, $—O—N{=}CR^j_2$, $—NR^j_2$, $—NHR^j$, and halogen (in these formulae, $R^j$ represents a substituted or unsubstituted $C_{1-4}$ alkyl group).

In formula (1), $R^{F1}$ is each independently at each occurrence $Rf^1—R^F—O_q$.

In the formula (2), $R^{F2}$ is $—Rf^2_p—R^F—O_q—$.

In the formula, $Rf^1$ is each independently at each occurrence a $C_{1-16}$ alkyl group optionally substituted with one or more fluorine atoms.

In the $C_{1-16}$ alkyl group optionally substituted with one or more fluorine atoms, the "$C_{1-16}$ alkyl group" may be linear or branched, and is preferably a linear or branched $C_{1-6}$ alkyl group, in particular $C_{1-3}$ alkyl group, and more preferably a linear $C_{1-6}$ alkyl group, in particular $C_{1-3}$ alkyl group.

The $Rf^1$ is preferably a $C_{1-16}$ alkyl group substituted with one or more fluorine atoms, more preferably a $CF_2H—C_{1-15}$ perfluoroalkylene group, and even more preferably a $C_{1-16}$ perfluoroalkyl group.

The $C_{1-16}$ perfluoroalkyl group may be linear or branched, and is preferably a linear or branched $C_{1-6}$ perfluoroalkyl group, in particular $C_{1-3}$ perfluoroalkyl group, more preferably a linear $C_{1-6}$ perfluoroalkyl group, in particular $C_{1-3}$ perfluoroalkyl group, and specifically $—CF_3$, $—CF_2CF_3$, or $—CF_2CF_2CF_3$.

In the formula, $Rf^2$ is a $C_{1-6}$ alkylene group optionally substituted with one or more fluorine atoms.

In the $C_{1-6}$ alkylene group optionally substituted with one or more fluorine atoms, the "$C_{1-6}$ alkylene group" may be linear or branched, and is preferably a linear or branched $C_{1-3}$ alkylene group, and more preferably a linear $C_{1-3}$ alkylene group.

The $Rf^2$ is preferably a $C_{1-6}$ alkylene group substituted with one or more fluorine atoms, more preferably a $C_{1-6}$ perfluoroalkylene group, and even more preferably a $C_{1-3}$ perfluoroalkylene group.

The $C_{1-6}$ perfluoroalkylene group may be linear or branched, and is preferably a linear or branched $C_{1-3}$ perfluoroalkylene group, more preferably a linear $C_{1-3}$ perfluoroalkyl group, and specifically $—CF_2—$, $—CF_2CF_2—$, or $—CF_2CF_2CF_2—$.

In the formulae, p is 0 or 1. In one embodiment, p is 0. In another embodiment, p is 1.

In the formulae, q is each independently at each occurrence 0 or 1. In one embodiment, q is 0. In another embodiment, q is 1.

In the formulae (1) and (2), $R^F$ is each independently at each occurrence a divalent fluoropolyether group.

$R^F$ is preferably a group represented by the following formula:

$$—(OC_6F_{12})_a—(OC_5F_{10})_b—(OC_4F_8)_c—(OC_3R^{Fa}_6)_d—(OC_2F_4)_e—(OCF_2)_f—$$

wherein $R^{Fa}$ is each independently at each occurrence a hydrogen atom, a fluorine atom, or a chlorine atom;

a, b, c, d, e, and f are each independently an integer of 0 to 200; the sum of a, b, c, d, e, and f is 1 or more; and the occurrence order of the respective repeating units enclosed in parentheses provided with a, b, c, d, e, or f is not limited in the formula; provided that when all $R^{Fa}$ groups are hydrogen atoms or chlorine atoms, at least one of a, b, c, e, and f is 1 or more.

$R^{Fa}$ is preferably a hydrogen atom or a fluorine atom, and more preferably a fluorine atom. However, when all $R^{Fa}$ groups are hydrogen atoms or chlorine atoms, at least one of a, b, c, e, and f is 1 or more.

Preferably, a, b, c, d, e, and f may be each independently an integer of 0 to 100.

The sum of a, b, c, d, e, and f is preferably 5 or more, and more preferably 10 or more, and may be, for example, 15 or more or 20 or more. The sum of a, b, c, d, e, and f is preferably 200 or less, more preferably 100 or less, and even more preferably 60 or less, and may be, for example, 50 or less or 30 or less.

These repeating units may be linear or branched, or may contain a ring structure. For example, $-(OC_6F_{12})-$ may be $-(OCF_2CF_2CF_2CF_2CF_2CF_2)-$, $-(OCF(CF_3)CF_2CF_2CF_2CF_2)-$, $-(OCF_2CF(CF_3)CF_2CF_2CF_2)-$, $-(OCF_2CF_2CF(CF_3)CF_2CF_2)-$, $-(OCF_2CF_2CF_2CF(CF_3)CF_2)-$, $-(OCF_2CF_2CF_2CF_2CF(CF_3))-$, or the like. $(OC_5F_{10})-$ may be $-(OCF_2CF_2CF_2CF_2CF_2)-$, $-(OCF(CF_3)CF_2CF_2CF_2)-$, $(OCF_2CF(CF_3)CF_2CF_2)-$, $-(OCF_2CF_2CF(CF_3)CF_2)-$, $-(OCF_2CF_2CF_2CF(CF_3))-$, or the like. $-(OC_4F_8)-$ may be any of $-(OCF_2CF_2CF_2CF_2)-$, $-(OCF(CF_3)CF_2CF_2)-$, $-(OCF_2CF(CF_3)CF_2)-$, $-(OCF_2CF_2CF(CF_3))-$, $-(OC(CF_3)_2CF_2)-$, $-(OCF_2C(CF_3)_2)-$, $-(OCF(CF_3)CF(CF_3))-$, $-(OCF(C_2F_5)CF_2)-$, and $-(OCF_2CF(C_2F_5))-$. $-(OC_3F_6)-$ (i.e., in the formula, $R^{Fa}$ is a fluorine atom) may be any of $-(OCF_2CF_2CF_2)-$, $-(OCF(CF_3)CF_2)-$, and $-(OCF_2CF(CF_3))-$. $(OC_2F_4)-$ may be any of $-(OCF_2CF_2)-$ and $-(OCF(CF_3))-$.

The ring structure may be a 3-membered ring, a 4-membered ring, a 5-membered ring, or a 6-membered ring below:

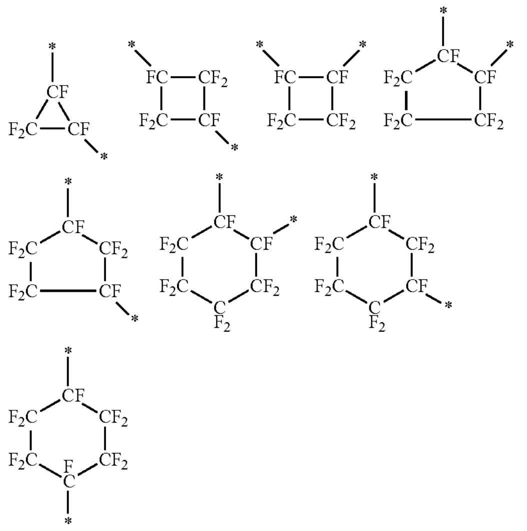

wherein * represents a binding position.

The above ring structure may preferably be a 4-membered ring, a 5-membered ring, or a 6-membered ring, and more preferably a 4-membered ring or a 6-membered ring.

The repeating unit having the ring structure may preferably be a unit below:

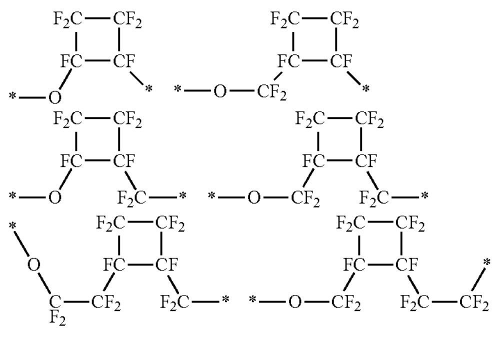

-continued

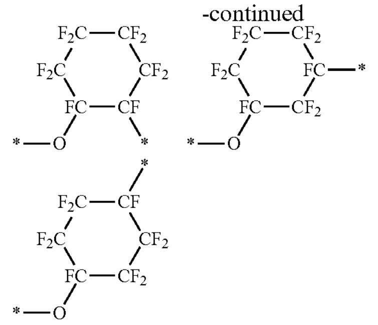

wherein * represents a binding position.

In one embodiment, the repeating unit is linear. When the repeating unit is linear, the durability of the water-repellent coating and the like can be improved.

In one embodiment, $R^F$ is each independently at each occurrence a group represented by any of the following formulae (f1) to (f6):

$$-(OC_3F_6)_d-(OC_2F_4)_e- \quad (f1)$$

wherein d is an integer of 1 to 200, and θ is 0 or 1;

$$-(OC_4F_8)_c-(OC_3F_6)_d-(OC_2F_4)_e-(OCF_2)_f- \quad (f2)$$

wherein c and d are each independently an integer of 0 or more and 30 or less, e and f are each independently an integer of 1 or more and 200 or less;

the sum of c, d, e, and f is 2 or more; and the occurrence order of the respective repeating units enclosed in parentheses provided with a subscript c, d, e, or f is not limited in the formula;

$$-(R^6-R^7)_g- \quad (f3)$$

wherein $R^6$ is $OCF_2$ or $OC_2F_4$;

$R^7$ is a group selected from $OC_2F_4$, $OC_3F_6$, $OC_4F_8$, $OC_5F_{10}$, and $OC_6F_{12}$, or a combination of two or three groups independently selected from these groups; and g is an integer of 2 to 100;

$$-(OC_6F_{12})_a-(OC_5F_{10})_b-(OC_4F_8)_c-(OC_3F_6)_d-(OC_2F_4)_e-(OCF_2)_f- \quad (f4)$$

wherein e is an integer of 1 or more and 200 or less, a, b, c, d, and f are each independently an integer of 0 or more and 200 or less, and the occurrence order of the respective repeating units enclosed in parentheses provided with a, b, c, d, e, or f is not limited in the formula;

$$-(OC_6F_{12})_a-(OC_5F_{10})_b-(OC_4F_8)_c-(OC_3F_6)_d-(OC_2F_4)_e-(OCF_2)_f- \quad (f5)$$

wherein f is an integer of 1 or more and 200 or less, a, b, c, d, and e are each independently an integer of 0 or more and 200 or less, and the occurrence order of the respective repeating units enclosed in parentheses provided with a, b, c, d, e, or f is not limited in the formula; and $$-(R^6-R^7)_g-R^r-(R^{7'}-R^{6'})_{g'}- \quad (f6)$$

wherein $R^6$ is $OCF_2$ or $OC_2F_4$;

$R^7$ is a group selected from $OC_2F_4$, $OC_3F_6$, $OC_4F_8$, $OC_5F_{10}$, and $OC_6F_{12}$, or a combination of two or three groups independently selected from these groups;

$R^{6'}$ is $OCF_2$ or $OC_2F_4$;

$R^{7'}$ is a group selected from $OC_2F_4$, $OC_3F_6$, $OC_4F_8$, $OC_5F_{10}$, and $OC_6F_{12}$, or a combination of two or three groups independently selected from these groups;

g is an integer of 2 to 100;

g' is an integer of 2 to 100; and $R^r$ is

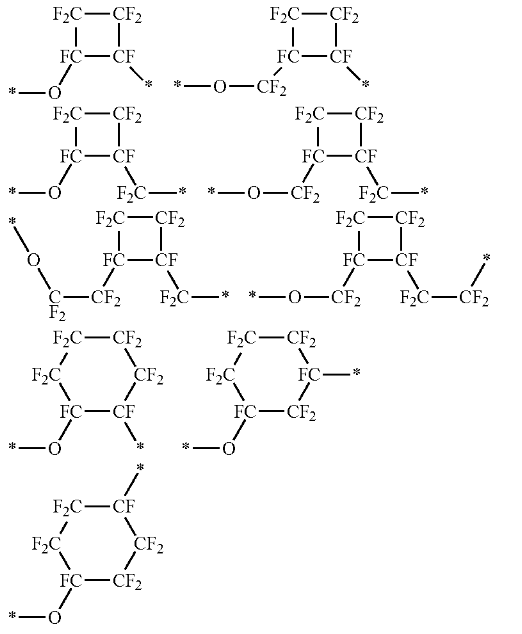

wherein * represents a binding position.

In the formula (f1), d is preferably 5 to 200, more preferably 10 to 100, and even more preferably 15 to 50, and is, for example, an integer of 25 to 35. In one embodiment, e is 1. In another embodiment, e is 0. In the formula (f1), $-(OC_3F_6)_d-$ is preferably a group represented by $-(OCF_2CF_2CF_2)_d-$ or $-(OCF(CF_3)CF_2)_d-$, and is more preferably a group represented by $-(OCF_2CF_2CF_2)_d-$. In the formula (f1), $(OC_2F_4)$ is preferably a group represented by $(OCF_2CF_2)$ or $(OCF(CF_3))$, and is more preferably a group represented by $(OCF_2CF_2)$.

In the formula (f2), e and f are each independently an integer of preferably 5 to 200, and more preferably 10 to 200. The sum of c, d, e, and f is preferably 5 or more, and more preferably 10 or more, and may be, for example, 15 or more or 20 or more. In one embodiment, the formula (f2) is preferably a group represented by $-(OCF_2CF_2CF_2CF_2)_c-(OCF_2CF_2CF_2)_d-(OCF_2CF_2)_e-(OCF_2)_f-$. In another embodiment, the formula (f2) may be a group represented by $-(OC_2F_4)_e-(OCF_2)_f-$.

In the formula (f3), $R^6$ is preferably $OC_2F_4$. In the formula (f3), $R^7$ is preferably a group selected from $OC_2F_4$, $OC_3F_6$, and $OC_4F_8$, or a combination of two or three groups independently selected from these groups, and is more preferably a group selected from $OC_3F_6$ and $OC_4F_8$. Examples of the combination of two or three groups independently selected from $OC_2F_4$, $OC_3F_6$, and $OC_4F_8$ include, but are not limited to, $-OC_2F_4OC_3F_6-$, $-OC_2F_4OC_4F_8-$, $-OC_3F_6OC_2F_4-$, $-OC_3F_6OC_3F_6-$, $-OC_3F_6OC_4F_8-$, $-OC_4F_8OC_4F_8-$, $-OC_4F_8OC_3F_6-$, $-OC_4F_8OC_2F_4-$, $-OC_2F_4OC_2F_4OC_3F_6-$, $-OC_2F_4OC_2F_4OC_4F_8-$, $-OC_2F_4OC_3F_6OC_2F_4-$, $-OC_2F_4OC_3F_6OC_3F_6-$, $-OC_2F_4OC_4F_8OC_2F_4-$, $-OC_3F_6OC_2F_4OC_2F_4-$, $-OC_3F_6OC_2F_4OC_3F_6-$, $-OC_3F_6OC_3F_6OC_2F_4-$, and $-OC_4F_8OC_2F_4OC_2F_4-$. In the formula (f3), g is an integer of preferably 3 or more, and more preferably 5 or more. g is preferably an integer of 50 or less. In the formula (f3), $OC_2F_4$, $OC_3F_6$, $OC_4F_8$, $OC_5F_{10}$, and $OC_6F_{12}$ may be either linear or branched, and are preferably linear. In this embodiment, the formula (f3) is preferably $-(OC_2F_4-OC_3F_6)_g-$ or $-(OC_2F_4-OC_4F_8)_g-$.

In the formula (f4), e is an integer of preferably 1 or more and 100 or less, and more preferably 5 or more and 100 or less. The sum of a, b, c, d, e, and f is preferably 5 or more, and more preferably 10 or more, and is, for example, 10 or more and 100 or less.

In the formula (f5), f is an integer of preferably 1 or more and 100 or less, and more preferably 5 or more and 100 or less. The sum of a, b, c, d, e, and f is preferably 5 or more, and more preferably 10 or more, and is, for example, 10 or more and 100 or less.

In the formula (f6), $R^6$, $R^7$, and g have the same definition and the same embodiments as described for the formula (f3). $R^{6'}$, $R^{7'}$, and g' have the same definition and the same embodiments as those of $R^6$, $R^7$, and g described for the formula (f3). $R^r$ is preferably

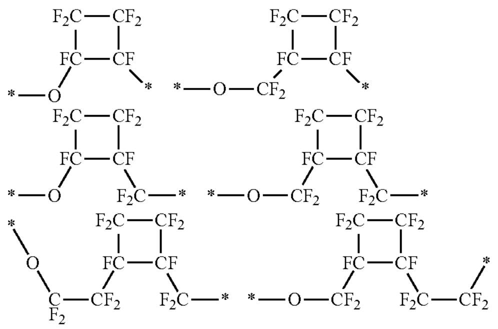

wherein * represents a binding position, and more preferably

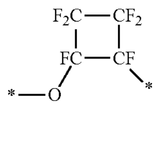

wherein * represents a binding position.

In one embodiment, $R^F$ is a group represented by the formula (f1).

In one embodiment, $R^F$ is a group represented by the formula (f2).

In one embodiment, $R^F$ is a group represented by the formula (f3).

In one embodiment, $R^F$ is a group represented by the formula (f4).

In one embodiment, $R^F$ is a group represented by the formula (f5).

In one embodiment, $R^F$ is a group represented by the formula (f6).

In $R^F$, the ratio of e to f (hereinafter, referred to as an "e/f ratio") is 0.1 to 10, preferably 0.2 to 5, more preferably 0.2 to 2, even more preferably 0.2 to 1.5, and yet more preferably 0.2 to 0.85. With an e/f ratio of 10 or less, the chemical resistance of the water-repellent coating obtained from this compound may be further improved. The lower the e/f ratio is, the more improved the durability of the water-repellent coating is. On the other hand, with an e/f ratio of 0.1 or more, the stability of the compound can be further increased. The larger the e/f ratio is, the more improved the stability of the compound is.

In the above fluoropolyether group-containing compound, the number average molecular weight of the $R^{F1}$ and $R^{F2}$ moieties is not limited, and is, for example, 500 to 30,000, preferably 1,500 to 30,000, and more preferably 2,000 to 10,000. Herein, the number average molecular weight of $R^{F1}$ and $R^{F2}$ is a value obtained by $^{19}$F-NMR measurement.

In the formulae (1) and (2), $R^{Si}$ is each independently at each occurrence a monovalent group containing a Si atom to which a hydroxyl group, a hydrolyzable group, a hydrogen atom, or a monovalent organic group is bonded, and at least one $R^{Si}$ is a monovalent group containing a Si atom to which a hydroxyl group or a hydrolyzable group is bonded.

In a preferred embodiment, $R^{Si}$ is a monovalent group containing a Si atom to which a hydroxyl group or a hydrolyzable group is bonded.

In a preferred embodiment, $R^{Si}$ is a group represented by the following formula (S1), (S2), (S3), or (S4):

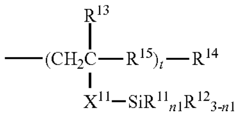

(S1)

$$—SiR^{11}_{n1}R^{12}_{3-n1} \quad (S2)$$

$$—SiR^{a1}_{k1}R^{b1}_{l1}R^{c1}_{m1} \quad (S3)$$

$$—CR^{d1}_{k2}R^{e1}_{l2}R^{f1}_{m2} \quad (S4)$$

$$—NR^{g1}R^{h1} \quad (S5)$$

In the formulae, $R^{11}$ is each independently at each occurrence a hydroxyl group or a hydrolyzable group.

Preferably, $R^{11}$ is each independently at each occurrence a hydrolyzable group.

Preferably, $R^{11}$ is each independently at each occurrence $—OR^j$, $—OCOR^j$, $—O—N{=}CR^j_2$, $—NR^j_2$, $—NHR^j$, or halogen (in these formulae, $R^j$ represents a substituted or unsubstituted $C_{1-4}$ alkyl group), and more preferably $—OR^j$ (i.e., an alkoxy group). Examples of $R^j$ include unsubstituted alkyl groups such as a methyl group, an ethyl group, a propyl group, an isopropyl group, an n-butyl group, and an isobutyl group; and substituted alkyl groups such as a chloromethyl group. Among such groups, an alkyl group, in particular an unsubstituted alkyl group, is preferable, and a methyl group or an ethyl group is more preferable. In one embodiment, $R^j$ is a methyl group, and in another embodiment, $R^j$ is an ethyl group.

In the formulae, $R^{12}$ is each independently at each occurrence a hydrogen atom or a monovalent organic group. The monovalent organic group is a monovalent organic group excluding the hydrolyzable group.

In $R^{12}$, the monovalent organic group is preferably a $C_{1-20}$ alkyl group, more preferably a $C_{1-6}$ alkyl group, and even more preferably a methyl group.

In the formulae, n1 is each independently an integer of 0 to 3 for each $(SiR^{11}_{n1}R^{12}_{3-n1})$ unit. However, when $R^{Si}$ is a group represented by the formula (S1) or (S2), the $R^{Si}$ moiety at the terminal of the formulae (1) and (2) (hereinafter, also referred to simply as a "terminal moiety" of the formulae (1) and (2)) has at least one $(SiR^{11}_{n1}R^{12}_{3-n1})$ unit wherein n1 is 1 to 3. That is, in such terminal moieties, not all n1 are 0 at the same time. In other words, in the terminal moieties of the formula (1) and the formula (2), at least one Si atom to which a hydroxyl group or a hydrolyzable group is bonded is present.

n1 is each independently an integer of preferably 1 to 3, more preferably 2 to 3, and even more preferably 3 for each $(SiR^{11}_{n1}R^{12}_{3-n1})$ unit.

In the formula, $X^{11}$ is each independently at each occurrence a single bond or a divalent organic group. The divalent organic group is preferably $—R^{28}—O_x—R^{29}—$, wherein $R^{28}$ and $R^{29}$ are each independently at each occurrence a single bond or a $C_{1-20}$ alkylene group, and x is 0 or 1. The $C_{1-20}$ alkylene group may be linear or branched, and is preferably linear. The $C_{1-20}$ alkylene group is preferably a $C_{1-10}$ alkylene group, more preferably a $C_{1-6}$ alkylene group, and even more preferably a $C_{1-3}$ alkylene group.

In one embodiment, $X^{11}$ is each independently at each occurrence $—C_{1-6}$ alkylene-O—$C_{1-6}$ alkylene- or —O—$C_{1-6}$ alkylene-.

In a preferred embodiment, $X^{11}$ is each independently at each occurrence a single bond or a linear $C_{1-6}$ alkylene group, preferably a single bond or a linear $C_{1-3}$ alkylene group, more preferably a single bond or a linear $C_{1-2}$ alkylene group, and even more preferably a linear $C_{1-2}$ alkylene group.

In the formula, $R^{13}$ is each independently at each occurrence a hydrogen atom or a monovalent organic group. Such a monovalent organic group is preferably a $C_{1-20}$ alkyl group. Such a $C_{1-20}$ alkyl group may be linear or branched, and is preferably linear.

In a preferred embodiment, $R^{13}$ is each independently at each occurrence a hydrogen atom or a linear $C_{1-6}$ alkyl group, preferably a hydrogen atom or a linear $C_{1-3}$ alkyl group, and preferably a hydrogen atom or a methyl group.

In the formula, t is each independently at each occurrence an integer of 2 or more.

In a preferred embodiment, t is each independently at each occurrence an integer of 2 to 10, and preferably an integer of 2 to 6.

In the formula, $R^{14}$ is each independently at each occurrence a hydrogen atom, a halogen atom, or $—X^{11}—SiR^{11}_{n1}R^{12}_{3-n1}$. The halogen atom is preferably an iodine atom, a chlorine atom, or a fluorine atom, and more preferably a fluorine atom. In a preferred embodiment, $R^{14}$ is a hydrogen atom.

In the formula, $R^{15}$ is each independently at each occurrence a single bond, an oxygen atom, an alkylene group having 1 to 6 carbon atoms, or an alkyleneoxy group having 1 to 6 carbon atoms.

In one embodiment, $R^{15}$ is each independently at each occurrence an oxygen atom, an alkylene group having 1 to 6 carbon atoms, or an alkyleneoxy group having 1 to 6 carbon atoms.

In a preferred embodiment, $R^{15}$ is a single bond.

In one embodiment, the formula (S1) is the following formula (S1-a):

(S1-a)

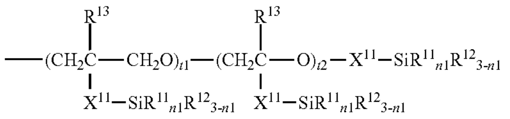

wherein

- $R^{11}$, $R^{12}$, $R^{13}$, $X^{11}$, and n1 have the same definition as described for the formula (S1);
- t1 and t2 are each independently at each occurrence an integer of 1 or more, preferably an integer of 1 to 10, and more preferably an integer of 2 to 10, such as an integer of 1 to 5 or an integer of 2 to 5; and
- the occurrence order of the respective repeating units enclosed in parentheses provided with t1 and t2 is not limited in the formula.

In a preferred embodiment, the formula (S1) is the following formula (S1-b):

(S1-b)

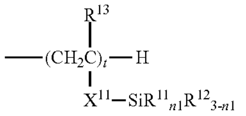

wherein $R^{11}$, $R^{12}$, $R^{13}$, $X^{11}$, n1, and t have the same definition as described for the formula (S1).

In the formula, Rai is each independently at each occurrence $—Z^1—SiR^{21}_{p1}R^{22}_{q1}R^{23}_{r1}$.

$Z^1$ is each independently at each occurrence an oxygen atom or a divalent organic group. The right side of the structure denoted as $Z^1$ below binds to $(SiR^{21}_{p1}R^{22}_{q1}R^{23}_{r1})$.

In a preferred embodiment, $Z^1$ is a divalent organic group.

In a preferred embodiment, $Z^1$ is not a group that forms a siloxane bond with the Si atom to which $Z^1$ binds. Preferably, in the formula (S3), $(Si—Z^1—Si)$ does not contain a siloxane bond.

$Z^1$ is preferably a $C_{1-6}$ alkylene group, $—(CH_2)_{z1}—O—(CH_2)_{z2}—$ (wherein z1 is an integer of 0 to 6 such as an integer of 1 to 6, and z2 is an integer of 0 to 6 such as an integer of 1 to 6), or $—(CH_2)_{z3}$-phenylene-$(CH_2)_{z4}—$ (wherein z3 is an integer of 0 to 6 such as an integer of 1 to 6, and z4 is an integer of 0 to 6 such as an integer of 1 to 6). Such a $C_{1-6}$ alkylene group may be linear or branched, and is preferably linear. These groups may be substituted with, for example, one or more substituents selected from a fluorine atom, a $C_{1-6}$ alkyl group, a $C_{2-6}$ alkenyl group, and a $C_{2-6}$ alkynyl group, and are preferably unsubstituted.

In a preferred embodiment, $Z^1$ is a $C_{1-6}$ alkylene group or $—(CH_2)_{z3}$-phenylene-$(CH_2)_{z4}—$, and preferably -phenylene-$(CH_2)_{z4}—$. When $Z^1$ is such a group, light resistance, in particular ultraviolet resistance, can be more increased.

In another preferred embodiment, $Z^1$ is a $C_{1-3}$ alkylene group. In one embodiment, $Z^1$ may be $—CH_2CH_2CH_2—$. In another embodiment, $Z^1$ may be $—CH_2CH_2—$.

$R^{21}$ is each independently at each occurrence $—Z^{1'}—SiR^{21'}_{p1'}R^{22'}_{q1'}R^{23'}_{r1'}$.

$Z^{1'}$ is each independently at each occurrence an oxygen atom or a divalent organic group. The right side of the structure denoted as $Z^{1'}$ below binds to $(SiR^{21'}_{p1'}R^{22'}_{q1'}R^{23'}_{r1'})$.

In a preferred embodiment, $Z^{1'}$ is a divalent organic group.

In a preferred embodiment, $Z^{1'}$ is not a group that forms a siloxane bond with the Si atom to which $Z^{1'}$ binds. Preferably, in the formula (S3), $(Si—Z^{1'}—Si)$ does not contain a siloxane bond.

$Z^{1'}$ is preferably a $C_{1-6}$ alkylene group, $—(CH_2)_{z1'}—O—(CH_2)_{z2'}—$ (wherein z1' is an integer of 0 to 6 such as an integer of 1 to 6, and z2' is an integer of 0 to 6 such as an integer of 1 to 6), or $—(CH_2)_{z3'}$-phenylene-$(CH_2)_{z4'}—$ (wherein z3' is an integer of 0 to 6 such as an integer of 1 to 6, z4' is an integer of 0 to 6 such as an integer of 1 to 6). Such a $C_{1-6}$ alkylene group may be linear or branched, and is preferably linear. These groups may be substituted with, for example, one or more substituents selected from a fluorine atom, a $C_{1-6}$ alkyl group, a $C_{2-6}$ alkenyl group, and a $C_{2-6}$ alkynyl group, and are preferably unsubstituted.

In a preferred embodiment, $Z^{1'}$ is a $C_{1-6}$ alkylene group or $—(CH_2)_{z3'}$-phenylene-$(CH_2)_{z4'}—$, and preferably -phenylene-$(CH_2)_{z4'}—$. When $Z^{1'}$ is such a group, light resistance, in particular ultraviolet resistance, can be further increased.

In another preferred embodiment, $Z^{1'}$ is a $C_{1-3}$ alkylene group. In one embodiment, $Z^{1'}$ can be $—CH_2CH_2CH_2—$. In another embodiment, $Z^{1'}$ can be $—CH_2CH_2—$.

$R^{21'}$ is each independently at each occurrence $—Z^{1''}—SiR^{22''}_{q1''}—R^{23''}_{r1''}$.

$Z^{1''}$ is each independently at each occurrence an oxygen atom or a divalent organic group. The right side of the structure denoted as $Z^{1''}$ below binds to $(SiR^{22''}_{q1''}R^{23''}_{r1''})$.

In a preferred embodiment, $Z^{1''}$ is a divalent organic group.

In a preferred embodiment, $Z^{1''}$ is not a group that forms a siloxane bond with the Si atom to which $Z^{1''}$ binds. Preferably, in the formula (S3), $(Si—Z^{1''}—Si)$ does not contain a siloxane bond.

$Z^{1''}$ is preferably a $C_{1-6}$ alkylene group, $—(CH_2)_{z1''}—O—(CH_2)_{z2''}—$ (wherein z1" is an integer of 0 to 6 such as an integer of 1 to 6, and z2" is an integer of 0 to 6 such as an integer of 1 to 6), or $—(CH_2)_{z3''}$-phenylene-$(CH_2)_{z4''}—$ (wherein z3" is an integer of 0 to 6 such as 1 to 6, and z4" is an integer of 0 to 6 such as an integer of 1 to 6). Such a $C_{1-6}$ alkylene group may be linear or branched, and is preferably linear. These groups may be substituted with, for example, one or more substituents selected from a fluorine atom, a $C_{1-6}$ alkyl group, a $C_{2-6}$ alkenyl group, and a $C_{2-6}$ alkynyl group, and are preferably unsubstituted.

In a preferred embodiment, $Z^{1''}$ is a $C_{1-6}$ alkylene group or $—(CH_2)_{z3''}$-phenylene-$(CH_2)_{z4''}—$, and preferably -phenylene-$(CH_2)_{z4''}—$. When $Z^{1''}$ is such a group, light resistance, in particular ultraviolet resistance, can be more increased.

In another preferred embodiment, $Z^{1''}$ is a $C_{1-3}$ alkylene group. In one embodiment, $Z^{1''}$ may be $—CH_2CH_2CH_2—$. In another embodiment, $Z^{1''}$ may be $—CH_2CH_2—$.

$R^{22''}$ is each independently at each occurrence a hydroxyl group or a hydrolyzable group.

Preferably, $R^{22''}$ is each independently at each occurrence a hydrolyzable group.

Preferably, $R^{22''}$ is each independently at each occurrence —$OR^j$, —$OCOR^j$, —O—N═$CR^j_2$, —$NR^j_2$, —$NHR^j$, or halogen (in these formulae, $R^j$ represents a substituted or unsubstituted $C_{1-4}$ alkyl group), and more preferably —$OR^j$ (i.e., an alkoxy group). Examples of $R^j$ include unsubstituted alkyl groups such as a methyl group, an ethyl group, a propyl group, an isopropyl group, an n-butyl group, and an isobutyl group; and substituted alkyl groups such as a chloromethyl group. Among such groups, an alkyl group, in particular an unsubstituted alkyl group, is preferable, and a methyl group or an ethyl group is more preferable. In one embodiment, $R^j$ is a methyl group, and in another embodiment, $R^j$ is an ethyl group.

$R^{23''}$ is each independently at each occurrence a hydrogen atom or a monovalent organic group. The monovalent organic group is a monovalent organic group excluding the hydrolyzable group.

In $R^{23''}$, the monovalent organic group is preferably a $C_{1-20}$ alkyl group, more preferably a $C_{1-6}$ alkyl group, still more preferably a methyl group.

q1" is each independently at each occurrence an integer of 0 to 3, and r1" is each independently at each occurrence an integer of 0 to 3. The sum of q1" and r1" is 3 in the $(SiR^{22''}_{q1''}R^{23''}_{r1''})$ unit.

q1" is each independently an integer of preferably 1 to 3, more preferably 2 to 3, and even more preferably 3 for each $(SiR^{22''}_{q1''}R^{23''}_{r1''})$ unit.

$R^{22'}$ is each independently at each occurrence a hydroxyl group or a hydrolyzable group.

Preferably, $R^{22'}$ is each independently at each occurrence a hydrolyzable group.

Preferably, $R^{22'}$ is each independently at each occurrence —$OR^j$, —$OCOR^j$, —O—N═$CR^j_2$, —$NR^j_2$, —$NHR^j$, or halogen (in these formulae, $R^j$ represents a substituted or unsubstituted $C_{1-4}$ alkyl group), and more preferably —$OR^j$ (i.e., an alkoxy group). Examples of $R^j$ include unsubstituted alkyl groups such as a methyl group, an ethyl group, a propyl group, an isopropyl group, an n-butyl group, and an isobutyl group; and substituted alkyl groups such as a chloromethyl group. Among such groups, an alkyl group, in particular an unsubstituted alkyl group, is preferable, and a methyl group or an ethyl group is more preferable. In one embodiment, $R^j$ is a methyl group, and in another embodiment, $R^j$ is an ethyl group.

$R^{23'}$ is each independently at each occurrence a hydrogen atom or a monovalent organic group. The monovalent organic group is a monovalent organic group excluding the hydrolyzable group.

In $R^{23'}$, the monovalent organic group is preferably a $C_{1-20}$ alkyl group, more preferably a $C_{1-6}$ alkyl group, still more preferably a methyl group.

p1' is each independently at each occurrence an integer 0 to 3, q1' is each independently at each occurrence an integer of 0 to 3, and r1' is each independently at each occurrence an integer of 0 to 3. The sum of p', q1', and r1' is 3 in the $(SiR^{21'}_{p1'}R^{22'}_{q1'}R^{23'}_{r1'})$ unit.

In one embodiment, p1' is 0.

In one embodiment, p1' may be each independently an integer of 1 to 3, an integer of 2 to 3, or 3 for each $(SiR^{21'}_{p1'}R^{22'}_{q1'}R^{23'}_{r1'})$ unit. In a preferred embodiment, p1' is 3.

In one embodiment, q1' is each independently an integer of 1 to 3, preferably an integer of 2 to 3, and more preferably 3 for each $(SiR^{21'}_{p1'}R^{22'}_{q1'}, R^{23'}_{r1'})$ unit.

In one embodiment, p1' is 0, and q1' is each independently an integer of 1 to 3, preferably an integer of 2 to 3, and more preferably 3 for each $(SiR^{21'}_{p1'}R^{22'}_{q1'}, R^{23'}_{r1'})$ unit.

$R^{22}$ is each independently at each occurrence a hydroxyl group or a hydrolyzable group.

Preferably, $R^{22}$ is each independently at each occurrence a hydrolyzable group.

Preferably, $R^{22}$ is each independently at each occurrence —$OR^j$, —$OCOR^j$, —O—N═$CR^j_2$, —$NR^j_2$, —$NHR^j$, or halogen (in these formulae, $R^j$ represents a substituted or unsubstituted $C_{1-4}$ alkyl group), and more preferably —$OR^j$ (i.e., an alkoxy group). Examples of $R^j$ include unsubstituted alkyl groups such as a methyl group, an ethyl group, a propyl group, an isopropyl group, an n-butyl group, and an isobutyl group; and substituted alkyl groups such as a chloromethyl group. Among such groups, an alkyl group, in particular an unsubstituted alkyl group, is preferable, and a methyl group or an ethyl group is more preferable. In one embodiment, $R^j$ is a methyl group, and in another embodiment, $R^j$ is an ethyl group.

$R^{23}$ is each independently at each occurrence a hydrogen atom or a monovalent organic group. The monovalent organic group is a monovalent organic group excluding the hydrolyzable group.

In $R^{23}$, the monovalent organic group is preferably a $C_{1-20}$ alkyl group, more preferably a $C_{1-6}$ alkyl group, and even more preferably a methyl group.

p1 is each independently at each occurrence an integer of 0 to 3, q1 is each independently at each occurrence an integer of 0 to 3, and r1 is each independently at each occurrence an integer of 0 to 3. The sum of p1, q1, and r1 is 3 in the $(SiR^{21}_{p1}R^{22}_{q1}R^{23}_{r1})$ unit.

In one embodiment, p1 is 0.

In one embodiment, p1 may be each independently an integer of 1 to 3, an integer of 2 to 3, or 3 for each $(SiR^{21}_{p1}R^{22}_{q1}R^{23}_{r1})$ unit. In a preferred embodiment, p1 is 3.

In one embodiment, q1 is each independently an integer of 1 to 3, preferably an integer of 2 to 3, and more preferably 3 for each $(SiR^{21}_{p1}R^{22}_{q1}R^{23}_{r1})$ unit.

In one embodiment, p1 is 0, and q1 is each independently an integer of 1 to 3, preferably an integer of 2 to 3, and even more preferably 3 for each $(SiR^{21}_{p1}R^{22}_{q1}R^{23}_{r1})$ unit.

In the formula, $R^{b1}$ is each independently at each occurrence a hydroxyl group or a hydrolyzable group.

Preferably, $R^{b1}$ is each independently at each occurrence a hydrolyzable group.

Preferably, $R^{b1}$ is each independently at each occurrence —$OR^j$, —$OCOR^j$, —O—N═$CR^j_2$, —$NR^j_2$, —$NHR^j$, or halogen (in these formulae, $R^j$ represents a substituted or unsubstituted $C_{1-4}$ alkyl group), and more preferably —$OR^j$ (i.e., an alkoxy group). Examples of $R^j$ include unsubstituted alkyl groups such as a methyl group, an ethyl group, a propyl group, an isopropyl group, an n-butyl group, and an isobutyl group; and substituted alkyl groups such as a chloromethyl group. Among such groups, an alkyl group, in particular an unsubstituted alkyl group, is preferable, and a methyl group or an ethyl group is more preferable. In one embodiment, $R^j$ is a methyl group, and in another embodiment, $R^j$ is an ethyl group.

In the formula, $R^{c1}$ is each independently at each occurrence a hydrogen atom or a monovalent organic group. The monovalent organic group is a monovalent organic group excluding the hydrolyzable group.

In $R^{c1}$, the monovalent organic group is preferably a $C_{1-20}$ alkyl group, more preferably a $C_{1-6}$ alkyl group, still more preferably a methyl group.

k1 is each independently at each occurrence an integer of 0 to 3, l1 is each independently at each occurrence an integer of 0 to 3, and m1 is each independently at each occurrence an integer of 0 to 3. The sum of k1, l1, and m1 is 3 in the $(SiR^{a1}_{k1}R^{b1}_{l1}R^{c1}_{m1})$ unit.

In one embodiment, k1 is each independently an integer of 1 to 3, preferably 2 or 3, and more preferably 3 for each $(SiR^{a1}_{k1}R^{b1}_{l1}R^{c1}_{m1})$ unit. In a preferred embodiment, k1 is 3.

In the formulae (1) and (2), when $R^{Si}$ is a group represented by the formula (S3), preferably, at least two Si atoms to which a hydroxyl group or a hydrolyzable group is bonded are present in the terminal moieties of the formulae (1) and (2).

In a preferred embodiment, the group represented by the formula (S3) has any one of $—Z^1—SiR^{22}_{q1}R^{23}_{r1}$ (wherein q1 is an integer of 1 to 3, preferably 2 or 3, and more preferably 3, and r1 is an integer of 0 to 2), $—Z^{1'}—SiR^{22'}_{q1'}R^{23'}_{r1'}$ (wherein q1' is an integer of 1 to 3, preferably 2 or 3, and more preferably 3, and r1' is an integer of 0 to 2), or $—Z^{1''}—SiR^{22''}_{q1''}—R^{23''}_{r1''}$ (wherein q1" is an integer of 1 to 3, preferably 2 or 3, and more preferably 3, and r1" is an integer of 0 to 2). $Z^1$, $Z^{1'}$, $Z^{1''}$, $R^{22}$, $R^{23}$, $R^{22'}$, $R^{23'}$, $R^{22''}$, and $R^{23''}$ have the same definition as described above.

In a preferred embodiment, when $R^{21'}$ is present in the formula (S3), q1" is an integer of 1 to 3, preferably 2 or 3, and more preferably 3 in at least one and preferably all $R^{21'}$ groups.

In a preferred embodiment, when $R^{21}$ is present in the formula (S3), p1' is 0, and q1' is an integer of 1 to 3, preferably 2 or 3, and more preferably 3 in at least one and preferably all $R^{21}$ groups.

In a preferred embodiment, when Rai is present in the formula (S3), p1 is 0, and q1 is an integer of 1 to 3, preferably 2 or 3, and more preferably 3 in at least one and preferably all $R^{a1}$ groups.

In a preferred embodiment, in the formula (S3), k1 is 2 or 3 and preferably 3, p1 is 0, q1 is 2 or 3 and preferably 3.

$R^{d1}$ is each independently at each occurrence $—Z^2—CR^{31}_{p2}R^{32}_{q2}R^{33}_{r2}$.

$Z^2$ is each independently at each occurrence a single bond, an oxygen atom, or a divalent organic group. The right side of the structure denoted as $Z^2$ below binds to $(CR^{31}_{p2}R^{32}_{q2}R^{33}_{r2})$.

In a preferred embodiment, $Z^2$ is a divalent organic group.

$Z^2$ is preferably a $C_{1-6}$ alkylene group, $—(CH_2)_{z5}—O—(CH_2)_{z6}—$ (wherein z5 is an integer of 0 to 6 such as an integer of 1 to 6, and z6 is an integer of 0 to 6 such as an integer of 1 to 6), or $—(CH_2)_{z7}$-phenylene-$(CH_2)_{z8}—$ (wherein z7 is an integer of 0 to 6 such as an integer of 1 to 6, and z8 is an integer of 0 to 6 such as an integer of 1 to 6). Such a $C_{1-6}$ alkylene group may be linear or branched, and is preferably linear. These groups may be substituted with, for example, one or more substituents selected from a fluorine atom, a $C_{1-6}$ alkyl group, a $C_{2-6}$ alkenyl group, and a $C_{2-6}$ alkynyl group, and are preferably unsubstituted.

In a preferred embodiment, $Z^2$ is a $C_{1-6}$ alkylene group or $—(CH_2)_{z7}$-phenylene-$(CH_2)_{z8}—$, and preferably -phenylene-$(CH_2)_{z8}—$. When $Z^2$ is such a group, light resistance, in particular ultraviolet resistance, can be more increased.

In another preferred embodiment, $Z^2$ is a $C_{1-3}$ alkylene group. In one embodiment, $Z^2$ may be $—CH_2CH_2CH_2—$. In another embodiment, $Z^2$ may be $—CH_2CH_2—$.

$R^{31}$ is each independently at each occurrence $—Z^{2'}—CR^{32'}_{q2'}R^{33'}_{r2'}$.

$Z^{2'}$ is each independently at each occurrence a single bond, an oxygen atom, or a divalent organic group. The structure denoted as $Z^{2'}$ below is bonded to $(CR^{32'}_{q2'}R^{33'}_{r2'})$ on the right side.

$Z^{2'}$ is preferably a $C_{1-6}$ alkylene group, $—(CH_2)_{z5'}—O—(CH_2)_{z6'}—$ (wherein z5' is an integer of 0 to 6 such as an integer of 1 to 6, and z6' is an integer of 0 to 6 such as an integer of 1 to 6), or $—(CH_2)_{z7'}$-phenylene-$(CH_2)_{z8'}—$ (wherein z7' is an integer of 0 to 6 such as an integer of 1 to 6, and z8' is an integer of 0 to 6 such as an integer of 1 to 6). Such a $C_{1-6}$ alkylene group may be linear or branched, and is preferably linear. These groups may be substituted with, for example, one or more substituents selected from a fluorine atom, a $C_{1-6}$ alkyl group, a $C_{2-6}$ alkenyl group, and a $C_{2-6}$ alkynyl group, and are preferably unsubstituted.

In a preferred embodiment, $Z^{2'}$ is a $C_{1-6}$ alkylene group or $—(CH_2)_{z7'}$-phenylene-$(CH_2)_{z8'}—$, and preferably -phenylene-$(CH_2)_{z8'}—$. When $Z^{2'}$ is such a group, light resistance, in particular ultraviolet resistance, can be more increased.

In another preferred embodiment, $Z^{2'}$ is a $C_{1-3}$ alkylene group. In one embodiment, $Z^{2'}$ can be $—CH_2CH_2CH_2—$. In another embodiment, $Z^{2'}$ can be $—CH_2CH_2—$.

$R^{32'}$ is each independently at each occurrence $—Z^3—SiR^{34}_{n2}R^{35}_{3-n2}$.

$Z^3$ is each independently at each occurrence a single bond, an oxygen atom, or a divalent organic group. The right side of the structure denoted as $Z^3$ below binds to $(SiR^{34}_{n2}R^{35}_{3-n2})$.

In one embodiment, $Z^3$ is an oxygen atom.

In one embodiment, $Z^3$ is a divalent organic group.

$Z^3$ is preferably a $C_{1-6}$ alkylene group, $—(CH_2)_{z5''}—O—(CH_2)_{z6''}—$ (wherein z5" is an integer of 0 to 6 such as an integer of 1 to 6, and z6" is an integer of 0 to 6 such as an integer of 1 to 6), or $—(CH_2)_{z7''}$-phenylene-$(CH_2)_{z8''}—$ (wherein z7" is an integer of 0 to 6 such as an integer of 1 to 6, and z8" is an integer of 0 to 6 such as an integer of 1 to 6). Such a $C_{1-6}$ alkylene group may be linear or branched, and is preferably linear. These groups may be substituted with, for example, one or more substituents selected from a fluorine atom, a $C_{1-6}$ alkyl group, a $C_{2-6}$ alkenyl group, and a $C_{2-6}$ alkynyl group, and are preferably unsubstituted.

In a preferred embodiment, $Z^3$ is a $C_{1-6}$ alkylene group or $—(CH_2)_{z7''}$-phenylene-$(CH_2)_{z8''}—$, and preferably -phenylene-$(CH_2)_{z8''}—$. When $Z^3$ is such a group, light resistance, in particular ultraviolet resistance, can be more increased.

In another preferred embodiment, $Z^3$ is a $C_{1-3}$ alkylene group. In one embodiment, $Z^3$ can be $—CH_2CH_2CH_2—$. In another embodiment, $Z^3$ may be $—CH_2CH_2—$.

$R^{34}$ is each independently at each occurrence a hydroxyl group or a hydrolyzable group.

Preferably, $R^{34}$ is each independently at each occurrence a hydrolyzable group.

Preferably, $R^{34}$ is each independently at each occurrence $—OR^j$, $—OCOR^j$, $—O—N{=}CR^j_2$, $—NR^j_2$, $—NHR^j$, or halogen (in these formulae, $R^j$ represents a substituted or unsubstituted $C_{1-4}$ alkyl group), and more preferably $—OR^j$ (i.e., an alkoxy group). Examples of $R^j$ include unsubstituted alkyl groups such as a methyl group, an ethyl group, a propyl group, an isopropyl group, an n-butyl group, and an isobutyl group; and substituted alkyl groups such as a chloromethyl group. Among such groups, an alkyl group, in particular an unsubstituted alkyl group, is preferable, and a methyl group or an ethyl group is more preferable. In one embodiment, $R^j$ is a methyl group, and in another embodiment, $R^j$ is an ethyl group.

$R^{35}$ is each independently at each occurrence a hydrogen atom or a monovalent organic group. The monovalent organic group is a monovalent organic group excluding the hydrolyzable group.

In $R^{35}$, the monovalent organic group is preferably a $C_{1-20}$ alkyl group, more preferably a $C_{1-6}$ alkyl group, still more preferably a methyl group.

In the formula, n2 is each independently an integer of 0 to 3 for each $(SiR^{34}_{n2}R^{35}_{3-n2})$ unit. However, when $R^{Si}$ is a group represented by the formula (S4), the terminal moieties of the formulae (1) and (2) have at least one $(SiR^{34}_{n2}R^{35}_{3-n2})$ unit wherein n2 is 1 to 3. That is, in such terminal moieties, not all n2 are 0 at the same time. In other words, in the terminal moieties of the formula (1) and the formula (2), at least one Si atom to which a hydroxyl group or a hydrolyzable group is bonded is present.

n2 is each independently an integer of preferably 1 to 3, more preferably 2 to 3, and even more preferably 3 for each $(SiR^{34}_{n2}R^{35}_{3-n2})$ unit.

$R^{33'}$ is each independently at each occurrence a hydrogen atom, a hydroxyl group, or a monovalent organic group. The monovalent organic group is a monovalent organic group excluding the hydrolyzable group.

The monovalent organic group of $R^{33'}$ is preferably a $C_{1-20}$ alkyl group or $-(C_sH_{2s})_{t1}-(O-C_sH_{2s})_{t2}$ (wherein s is an integer of 1 to 6 and preferably an integer of 2 to 4, t1 is 1 or 0 and preferably 0, t2 is an integer of 1 to 20, preferably an integer of 2 to 10, and more preferably an integer from 2 to 6), more preferably a $C_{1-20}$ alkyl group, even more preferably a $C_{1-6}$ alkyl group, and particularly preferably a methyl group.

In one embodiment, $R^{33'}$ is a hydroxyl group.

In another embodiment, the monovalent organic group of $R^{33'}$ is preferably a $C_{1-20}$ alkyl group, and more preferably a $C_{1-6}$ alkyl group.

q2' is each independently at each occurrence an integer of 0 to 3, and r2' is each independently at each occurrence an integer of 0 to 3. The sum of q2' and r2' is 3 in the $(CR^{32'}_{q2'}R^{33'}_{r2'})$ unit.

q2' is each independently an integer of preferably 1 to 3, more preferably 2 to 3, and even more preferably 3 for each $(CR^{32'}_{q2'}R^{33'}_{r2'})$ unit.

$R^{32}$ is each independently at each occurrence $-Z^3-SiR^{34}_{n2}R^{35}_{3-n2}$. $-Z^3-SiR^{34}_{n2}R^{35}_{3-n2}$ has the same definition as described for $R^{32'}$.

$R^{33}$ is each independently at each occurrence a hydrogen atom, a hydroxyl group, or a monovalent organic group. The monovalent organic group is a monovalent organic group excluding the hydrolyzable group.

The monovalent organic group of $R^{33}$ is preferably a $C_{1-20}$ alkyl group or $-(C_sH_{2s})_{t1}-(O-C_sH_{2s})_{t2}$ (wherein s is an integer of 1 to 6 and preferably an integer of 2 to 4, t1 is 1 or 0 and preferably 0, t2 is an integer of 1 to 20, preferably an integer of 2 to 10, and more preferably an integer from 2 to 6), more preferably a $C_{1-20}$ alkyl group, even more preferably a $C_{1-6}$ alkyl group, and particularly preferably a methyl group.

In one embodiment, $R^{33}$ is a hydroxyl group.

In another embodiment, the monovalent organic group of $R^{33}$ is preferably a $C_{1-20}$ alkyl group, and more preferably a $C_{1-6}$ alkyl group.

p2 is each independently at each occurrence an integer of 0 to 3, q2 is each independently at each occurrence an integer of 0 to 3, and r2 is each independently at each occurrence an integer of 0 to 3. The sum of p2, q2, and r2 is 3 in the $(CR^{31}_{p2}R^{32}_{q2}R^{33}_{r2})$ unit.

In one embodiment, p2 is 0.

In one embodiment, p2 may be each independently an integer of 1 to 3, an integer of 2 to 3, or 3 for each $(CR^{31}_{p2}R^{32}_{q2}R^{33}_{r2})$ unit. In a preferred embodiment, p2 is 3.

In one embodiment, q2 is each independently an integer of 1 to 3, preferably an integer of 2 to 3, and more preferably 3 for each $(CR^{31}_{p2}R^{32}_{q2}R^{33}_{r2})$ unit.

In one embodiment, p2 is 0, and q2 is each independently an integer of 1 to 3, preferably an integer of 2 to 3, and even more preferably 3 for each $(CR^{31}_{p2}R^{32}_{q2}R^{33}_{r2})$ unit.

$R^{e1}$ is each independently at each occurrence $-Z^3-SiR^{34}_{n2}R^{35}_{3-n2}$. $-Z^3-SiR^{34}_{n2}R^{35}_{3-n2}$ has the same definition as described for $R^{32'}$.

$Rf^1$ is each independently at each occurrence a hydrogen atom, a hydroxyl group, or a monovalent organic group. The monovalent organic group is a monovalent organic group excluding the hydrolyzable group.

The monovalent organic group of $Rf^1$ is preferably a $C_{1-20}$ alkyl group or $-(C_sH_{2s})_{t1}-(O-C_sH_{2s})_{t2}$ (wherein s is an integer of 1 to 6 and preferably an integer of 2 to 4, t1 is 1 or 0 and preferably 0, t2 is an integer of 1 to 20, preferably an integer of 2 to 10, and more preferably an integer from 2 to 6), more preferably a $C_{1-20}$ alkyl group, even more preferably a $C_{1-6}$ alkyl group, and particularly preferably a methyl group.

In one embodiment, $Rf^1$ is a hydroxyl group.

In another embodiment, the monovalent organic group of $Rf^1$ is preferably a $C_{1-20}$ alkyl group, and more preferably a $C_{1-6}$ alkyl group.

k2 is each independently at each occurrence an integer of 0 to 3, l2 is each independently at each occurrence an integer of 0 to 3, and m2 is each independently at each occurrence an integer of 0 to 3. The sum of k2, l2, and m2 is 3 in the $(CR^{d1}_{k2}R^{e1}_{l2}R^{f1}_{m2})$ unit.

In the formulae (1) and (2), when $R^{Si}$ is a group represented by the formula (S4), preferably, at least two Si atoms to which a hydroxyl group or a hydrolyzable group is bonded are present in the terminal moieties of the formulae (1) and (2).

In one embodiment, when $R^{Si}$ is a group represented by the formula (S4), two or more, for example, 2 to 27, preferably 2 to 9, more preferably 2 to 6, even more preferably 2 to 3, and particularly preferably 3 $(SiR^{34}_{n2}R^{35}_{3-n2})$ units in which n2 is 1 to 3, preferably 2 or 3, and more preferably 3 are present in each terminal moiety of the formula (1) and the formula (2).

In a preferred embodiment, when $R^{32'}$ is present in the formula (S4), n2 is an integer of 1 to 3, preferably 2 or 3, and more preferably 3 in at least one and preferably all $R^{32'}$ groups.

In a preferred embodiment, when $R^{32}$ is present in the formula (S4), n2 is an integer of 1 to 3, preferably 2 or 3, and more preferably 3 in at least one and preferably all $R^{32}$ groups.

In a preferred embodiment, when $R^{e1}$ is present in the formula (S4), n2 is an integer of 1 to 3, preferably 2 or 3, and more preferably 3 in at least one and preferably all $R^{a1}$ groups.

In a preferred embodiment, k2 is 0, 12 is 2 or 3 and preferably 3, and n2 is 2 or 3 and preferably 3 in the formula (S4).

$R^{g1}$ and $R^{h1}$ are each independently at each occurrence $-Z^4-SiR^{11}_{n1}R^{12}_{3-n1}$, $-Z^4-SiR^{a1}_{k1}R^{b1}_{l1}R^{c1}_{m1}$, or $-Z^4-CR^{d1}_{k2}R^{e1}_{l2}Rf^1_{m2}$. Here, $R^{11}$, $R^{12}$, $R^{a1}$, $R^{b2}$, $R^{c1}$, $R^{d1}$, $R^{e1}$, $Rf^1$, n1, k1, l1, m1, k2, l2, and m2 have the same definition as described above.

In a preferred embodiment, $R^{g1}$ and $R^{h1}$ are each independently $—Z^4—SiR^{11}{}_{n1}R^{12}{}_{3-n1}$.

$Z^4$ is each independently at each occurrence a single bond, an oxygen atom, or a divalent organic group. The right side of the structure denoted as $Z^4$ below binds to $(SiR^{11}{}_{n1}R^{12}{}_{3-n1})$.

In one embodiment, $Z^4$ is an oxygen atom.

In one embodiment, $Z^4$ is a divalent organic group.

$Z^4$ is preferably a $C_{1-6}$ alkylene group, $—(CH_2)_{z5''}—O—(CH_2)_{z6''}—$ (wherein z5" is an integer of 0 to 6 such as an integer of 1 to 6, and z6" is an integer of 0 to 6 such as an integer of 1 to 6), or $—(CH_2)_{z7''}$-phenylene-$(CH_2)_{z8''}—$ (wherein z7" is an integer of 0 to 6 such as an integer of 1 to 6, and z8" is an integer of 0 to 6 such as an integer of 1 to 6). Such a $C_{1-6}$ alkylene group may be linear or branched, and is preferably linear. These groups may be substituted with, for example, one or more substituents selected from a fluorine atom, a $C_{1-6}$ alkyl group, a $C_{2-6}$ alkenyl group, and a $C_{2-6}$ alkynyl group, and are preferably unsubstituted.

In a preferred embodiment, $Z^4$ is a $C_{1-6}$ alkylene group or $—(CH_2)_{z7''}$-phenylene-$(CH_2)_{z8''}—$, and preferably -phenylene-$(CH_2)_{z8''}—$. When $Z^3$ is such a group, light resistance, in particular ultraviolet resistance, can be more increased.

In another preferred embodiment, $Z^4$ is a $C_{1-3}$ alkylene group. In one embodiment, $Z^4$ can be $—CH_2CH_2CH_2—$. In another embodiment, $Z^4$ may be $—CH_2CH_2—$.

In one embodiment, $R^{Si}$ is a group represented by the formula (S2), (S3), (S4), or (S5). These compounds are capable of forming a water-repellent coating having high surface lubricity.

In one embodiment, $R^{Si}$ is a group represented by the formula (S1), (S3), (S4), or (S5). These compounds have a plurality of hydrolyzable groups at one terminal, and are therefore capable of forming a water-repellent coating that firmly adheres to a substrate and that has high durability.

In one embodiment, $R^{Si}$ is a group represented by the formula (S1), (S3), or (S4). These compounds have a plurality of hydrolyzable groups at one terminal, and are therefore capable of forming a water-repellent coating that firmly adheres to a substrate and that has high durability.

In one embodiment, $R^{Si}$ is a group represented by the formula (S3) or (S4). These compounds can have a plurality of hydrolyzable groups branched from one Si atom or C atom at one terminal, and are therefore capable of forming a water-repellent coating that has higher durability.

In one embodiment, $R^{Si}$ is a group represented by the formula (S1).

In one embodiment, $R^{Si}$ is a group represented by the formula (S2).

In one embodiment, $R^{Si}$ is a group represented by the formula (S3).

In one embodiment, $R^{Si}$ is a group represented by the formula (S4).

In one embodiment, $R^{Si}$ is a group represented by the formula (S5).

In the formula (2), $R^{SF}$ is each independently at each occurrence $R^{Si}$ or $Rf^1—R^F—O_q—$, provided that at least one $R^{SF}$ is $R^{Si}$, and preferably, at least one $R^{SF}$ is $R^{Si}$ at each of both terminals of the formula (2).

In a preferred embodiment, $R^{SF}$ is each independently at each occurrence $R^{Si}$.

In the formulae (1) and (2), $X^A$ is interpreted as a linker connecting fluoropolyether moieties ($R^{F1}$ and $R^{F2}$), which mainly provide water-repellency to a moiety ($R^{Si}$) providing a binding ability to a substrate. Accordingly, $X^A$ may be a single bond or any group as long as the compound represented by the formula (I) or (2) can stably exist.

In the formula (1), α is an integer of 1 to 9, and β is an integer of 1 to 9. These α and β may vary depending on the valence of $X^A$. The sum of α and β is the same as the valence of $X^A$. For example, when $X^A$ is a decavalent organic group, the sum of α and β is 10; for example, a case where α is 9 and β is 1, and α is 5 and β is 5, or α is 1 and β is 9, can be considered. When $X^A$ is a divalent organic group, α and β each are 1.

In the formula (2), γ is an integer of 1 to 9. γ may vary according to the valence of $X^A$. That is, γ is a value obtained by subtracting 1 from the valence of $X^A$.

$X^A$ is each independently a single bond or a di- to decavalent organic group;

The di- to decavalent organic group in $X^A$ is preferably a di- to octavalent organic group. In one embodiment, the di- to decavalent organic group is preferably a di- to tetravalent organic group, and more preferably a divalent organic group. In another embodiment, the di- to decavalent organic group is preferably a tri- to octavalent organic group, and more preferably a tri- to hexavalent organic group.

In one embodiment, $X^A$ is a single bond or a divalent organic group, α is 1, and β is 1.

In one embodiment, $X^A$ is a single bond or a divalent organic group, γ is 1.

In one embodiment, $X^A$ is a tri- to hexavalent organic group, α is 1, and β is 2 to 5.

In one embodiment, $X^A$ is a tri- to hexavalent organic group, and γ is 2 to 5.

In one embodiment, $X^A$ is a trivalent organic group, α is 1, and β is 2.

In one embodiment, $X^A$ is a trivalent organic group, and γ is 2.

When $X^A$ is a single bond or a divalent organic group, the formulae (1) and (2) are represented by the following formulae (1') and (2').

$$R^{F1}—X^A—R^{Si} \quad (1')$$

$$R^{SF}—X^A—R^{F2}—X^A—R^{SF} \quad (2')$$

In one embodiment, $X^A$ is a single bond.

In another embodiment, $X^A$ is a divalent organic group.

In one embodiment, examples of $X^A$ include a single bond or a divalent organic group represented by the following formula:

$$—(R^{51})_{p5}—(X^{51})_{q5}—$$

wherein $R^{51}$ represents a single bond, $—(CH_2)_{s5}—$ or o-, m- or a p-phenylene group, and is preferably $—(CH_2)_{s5}—$;

s5 is an integer of 1 to 20, preferably an integer of 1 to 6, more preferably an integer of 1 to 3, and still more preferably 1 or 2;

$X^{51}$ represents $—(X^{52})_{l5}—$ $X^{52}$ each independently at each occurrence represents a group selected from the group consisting of —O—, —S—, o-, m- or a p-phenylene group, —C(O)O—, $—Si(R^{53})_2—$, $—(Si(R^{53})_2O)_{m5}—Si(R^{53})_2—$, $—CONR^{54}—$, $—O—CONR^{54}—$, $—NR^{54}—$ and $—(CH_2)_{n5}—$;

$R^{53}$ each independently at each occurrence represents a phenyl group, a $C_{1-6}$ alkyl group, or a $C_{1-6}$ alkoxy group, is preferably a phenyl group or a $C_{1-6}$ alkyl group, and is more preferably a methyl group;

$R^{54}$ each independently at each occurrence represents a hydrogen atom, a phenyl group, or a $C_{1-6}$ alkyl group (preferably a methyl group);

m5 is each independently at each occurrence an integer of 1 to 100 and preferably an integer of 1 to 20;

n5 is each independently at each occurrence an integer of 1 to 20, preferably an integer of 1 to 6, and more preferably an integer of 1 to 3;

l5 is an integer of 1 to 10, preferably an integer of 1 to 5, and more preferably an integer of 1 to 3;

p5 is 0 or 1; and q5 is 0 or 1, where at least one of p5 and q5 is 1 and the occurrence order of the respective repeating units enclosed in parentheses provided with p5 or q5 is not limited. Here, $X^A$ (typically a hydrogen atom of $X^A$) may be substituted with one or more substituents selected from a fluorine atom, a $C_{1-3}$ alkyl group and a $C_{1-3}$ fluoroalkyl group. In a preferred embodiment, $X^A$ is not substituted with any of these groups.

In a preferred embodiment, $X^A$ is each independently $—(R^{51})_{p5}—(X^{51})_{q5}R^{52}—$. $R^{52}$ represents a single bond, $—(CH_2)_{t5}—$ or o-, m- or a p-phenylene group, and is preferably $—(CH_2)_{t5}—$. t5 is an integer of 1 to 20, preferably an integer of 2 to 6, and more preferably an integer of 2 to 3. Here, $R^{52}$ (typically a hydrogen atom of $R^{52}$) may be substituted with one or more substituents selected from a fluorine atom, a $C_{1-3}$ alkyl group and a $C_{1-3}$ fluoroalkyl group. In a preferred embodiment, $R^{56}$ is not substituted with these groups.

Preferably, $X^A$ may each independently be a single bond, a $C_{1-20}$ alkylene group, $—R^{51}—X^{53}—R^{52}—$, or $X^{54}—R^{5}—$ wherein $R^{51}$ and $R^{52}$ have the same definition as above;

$X^{53}$ represents $—O—$, $—S—$, $—C(O)O—$, $—CONR^{54}—$, $—O—CONR^{54}—$, $Si(R^{53})_2—$, $(Si(R^{53})_2O)_{m5}—Si(R^{53})_2—$, $—O—(CH_2)_{u5}—(Si(R^{53})_2O)_{m5}—Si(R^{53})_2—$, $—O—(CH_2)_{u5}—Si(R^{53})_2—O—Si(R^{53})_2—CH_2CH_2—Si(R^{53})_2—O—Si(R^{53})_2—$, $—O—(CH_2)_{u5}—Si(OCH_3)_2OSi(OCH_3)_2—$, $—CONR^{54}—(CH_2)_{u5}—(Si(R^{53})_2O)_{m5}—Si(R^{53})_2—$, $—CONR^{54}—(CH_2)_{u5}—N(R^{54})—$, or $—CONR^{54}$-(o-, m- or p-phenylene)-$Si(R^{53})_2—$, wherein $R^{53}$, $R^{54}$, and m5 have the same definition as above, and u5 is an integer of 1 to 20, preferably an integer of 2 to 6, and more preferably an integer of 2 to 3; and $X^{54}$ represents $—S—$, $—C(O)O—$, $—CONR^{54}—$, $—O—CONR^{54}—$, $—CONR^{54}—(CH_2)_{u5}—(Si(R^{54})_2O)_{m5}—Si(R^{54})_2—$, $—CONR^{54}—(CH_2)_{u5}—N(R^{54})—$, or $—CONR^{54}—$ (o-, m- or p-phenylene)-$Si(R^{54})_2—$, wherein each symbol has the same definition as above.

More preferably, $X^A$ is each independently a single bond, a $C_{1-20}$ alkylene group, $—(CH_2)_{s5}—X^{53}—$, $—(CH_2)_{s5}—X^{53}—(CH_2)_t—$, $—X^{54}—$, or $—X^{54}—(CH_2)_{t5}—$, wherein $X^{53}$, $X^{54}$, s5, and t5 have the same definition as above.

More preferably, $X^A$ may each independently be a single bond, a $C_{1-20}$ alkylene group, $—(CH_2)_{s5}—X^{53}—(CH_2)_{t5}—$, or $—X^{54}—(CH_2)_{t5}—$, wherein each symbol has the same definition as above.

In a preferred embodiment, $X^A$ may each independently be a single bond, a $C_{1-20}$ alkylene group, $—(CH_2)_{s5}—X^{53}—$, or $—(CH_2)_{s5}—X^{53}—(CH_2)_{t5}—$, wherein $X^{53}$ is $—O—$, $—CONR^{54}—$, or $—O—CONR^{54}—$;

$R^{54}$ each independently at each occurrence represents a hydrogen atom, a phenyl group, or a $C_{1-6}$ alkyl group;

s5 is an integer of 1 to 20; and t5 is an integer of 1 to 20.

In a preferred embodiment, $X^A$ may each independently be $—(CH_2)_{s5}—O—(CH_2)_{t5}—$ or $—CONR^{54}—(CH_2)_{t5}—$, wherein $R^{54}$ each independently at each occurrence represents a hydrogen atom, a phenyl group, or a $C_{1-6}$ alkyl group;

s5 is an integer of 1 to 20; and t5 is an integer of 1 to 20.

In one embodiment, $X^A$ is each independently a single bond, a $C_{1-20}$ alkylene group, $—(CH_2)_{s5}—O—(CH_2)_{s5}—$, $—(CH_2)_{s5}—(Si(R^{53})_2O)_{m5}—Si(R^{53})_2—(CH_2)_{t5}—$, $—(CH_2)_{s5}—O—(CH_2)_{u5}—(Si(R^{53})_2O)_{m5}—Si(R^{53})_2—(CH_2)_{t5}—$, or $—(CH_2)_{s5}O(CH_2)_{t5}—Si(R^{53})_2—(CH_2)_{u5}—Si(R^{53})_2—(C_vH_{2v})—$ wherein $R^{53}$, m5, s5, t5 and u5 have the same definition as above; v5 is an integer of 1 to 20, preferably an integer of 2 to 6, more preferably an integer of 2 to 3.

In the formula, $—(C_vH_{2v})—$ may be linear or branched and may be, for example, $—CH_2CH_2—$, $—CH_2CH_2CH_2—$, $—CH(CH_3)—$, or $—CH(CH_3)CH_2—$.

$X^A$ may be each independently substituted with one or more substituents selected from a fluorine atom, a $C_{1-3}$ alkyl group and a $C_{1-3}$ fluoroalkyl group (preferably a $C_{1-3}$ perfluoroalkyl group). In one embodiment, $X^A$ is unsubstituted.

$X^A$ is bonded to $R^{F1}$ or $R^{F2}$ on the left side, and bonded to $R^{Si}$ on the right side.

In one embodiment, $X^A$ may each independently be a group other than an $—O—C_{1-6}$ alkylene group.

In another embodiment, examples of the $X^A$ group include the following groups:

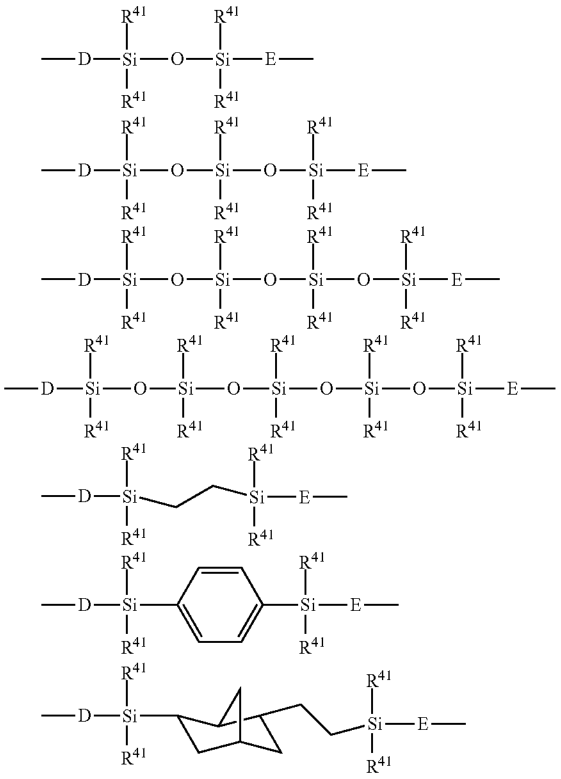

wherein $R^{4'}$ is each independently a hydrogen atom, a phenyl group, an alkyl group having 1 to 6 carbon atoms or a $C_{1-6}$ alkoxy group, and preferably a methyl group;

D is a group selected from $—CH_2O(CH_2)_2—$, $—CH_2O(CH_2)_3—$, $—CF_2O(CH_2)_3—$, $—(CH_2)_2$, $—(CH_2)_3—$, $—(CH_2)_4$, $—CONH—(CH_2)_3—$, $—CON(CH_3)—(CH_2)_3—$, and $—CON(Ph)-(CH_2)_3—$ (wherein Ph means phenyl), and

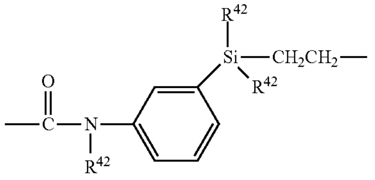

wherein $R^{42}$ each independently represents a hydrogen atom, a $C_{1-6}$ alkyl group, or a $C_{1-6}$ alkoxy group, preferably a methyl group or a methoxy group, and more preferably a methyl group;

E is $—(CH_2)_n—$ (n is an integer of 2 to 6); and

D binds to $R^{F1}$ or $R^{F2}$ of the molecular backbone and E binds to $R^{Si}$.

Specific examples of $X^A$ include a single bond, $—CH_2OCH_2—$, $—CH_2O(CH_2)_2—$, $—CH_2O(CH_2)_3—$, $—CH_2O(CH_2)_4—$, $—CH_2O(CH_2)_5—$, $—CH_2O(CH_2)_6—$, $—CH_2O(CH_2)_3Si(CH_3)_2OSi(CH_3)_2(CH_2)_2—$, $—CH_2O(CH_2)_3Si(CH_3)_2OSi(CH_3)_2OSi(CH_3)_2(CH_2)_2—$, $—CH_2O(CH_2)_3Si(CH_3)_2O(Si(CH_3)_2O)_2Si(CH_3)_2(CH_2)_2—$, $—CH_2O(CH_2)_3Si(CH_3)_2O(Si(CH_3)_2O)_3Si(CH_3)_2(CH_2)_2—$, $—CH_2O(CH_2)_3Si(CH_3)_2O(Si(CH_3)_2O)_{10}Si(CH_3)_2(CH_2)_2—$, $—CH_2O(CH_2)_3Si(CH_3)_2O(Si(CH_3)_2O)_{20}Si(CH_3)_2(CH_2)_2—$, $—CH_2OCF_2CHFOCF_2—$, $—CH_2OCF_2CHFOCF_2CF_2—$, $—CH_2OCF_2CHFOCF_2CF_2CF_2—$, $—CH_2OCH_2CF_2CF_2OCF_2—$, $—CH_2OCH_2CF_2CF_2OCF_2CF_2—$, $—CH_2OCH_2CF_2CF_2OCF_2CF_2CF_2—$, $—CH_2OCH_2CF_2CF_2OCF(CF_3)CF_2OCF_2—$, $—CH_2OCH_2CF_2CF_2OCF(CF_3)CF_2OCF_2CF_2—$, $—CH_2OCH_2CF_2CF_2OCF(CF_3)CF_2OCF_2CF_2CF_2—$, $—CH_2OCH_2CHFCF_2OCF_2—$, $—CH_2OCH_2CHFCF_2OCF_2CF_2—$, $—CH_2OCH_2CHFCF_2OCF_2CF_2CF_2—$, $—CH_2OCH_2CHFCF_2OCF(CF_3)CF_2OCF_2—$, $—CH_2OCH_2CHFCF_2OCF(CF_3)CF_2OCF_2CF_2—$, $—CH_2OCH_2CHFCF_2OCF(CF_3)CF_2OCF_2CF_2CF_2—$, $—CH_2OCF_2CHFOCF_2CF_2CF_2—C(O)NH—CH_2—$, $—CH_2OCH_2(CH_2)_7CH_2Si(OCH_3)_2OSi(OCH_3)_2(CH_2)_2Si(OCH_3)_2OSi(OCH_3)_2(CH_2)_2—$, $—CH_2OCH_2CH_2CH_2Si(OCH_3)_2OSi(OCH_3)_2(CH_2)_3—$, $—CH_2OCH_2CH_2CH_2Si(OCH_2CH_3)_2OSi(OCH_2CH_3)_2(CH_2)_3—$, $—CH_2OCH_2CH_2CH_2Si(OCH_3)_2OSi(OCH_3)_2(CH_2)_2—$, $—CH_2OCH_2CH_2CH_2Si(OCH_2CH_3)_2OSi(OCH_2CH_3)_2(CH_2)_2—$, $—(CH_2)_2—Si(CH_3)_2—(CH_2)_2—$, $—CH_2—$, $—(CH_2)_2$, $—(CH_2)_3$, $—(CH_2)_4$, $—(CH_2)_5—$, $—(CH_2)_6—$, $—CO—$, $—CONH—$, $—CONH—CH_2—$, $—CONH—(CH_2)_2—$, $—CONH—(CH_2)_3—$, $—CONH—(CH_2)_4—$, $—CONH—(CH_2)_5—$, $—CONH—(CH_2)_6—$, $—CON(CH_3)—CH_2—$, $—CON(CH_3)—(CH_2)_2—$, $—CON(CH_3)—(CH_2)_3—$, $—CON(CH_3)—(CH_2)_4—$, $—CON(CH_3)—(CH_2)_5—$, $—CON(CH_3)—(CH_2)_6—$, $—CON(Ph)-CH_2—$ (wherein Ph means phenyl), $—CON(Ph)-(CH_2)_2—$ (wherein Ph means phenyl), $—CON(Ph)-(CH_2)_3—$ (wherein Ph means phenyl), $—CON(Ph)-(CH_2)_4—$ (wherein Ph means phenyl), $—CON(Ph)-(CH_2)_5—$ (wherein Ph means phenyl), $—CON(Ph)-(CH_2)_6—$ (wherein Ph means phenyl),
$—CONH—(CH_2)_2NH(CH_2)_3—$,
$—CONH—(CH_2)_6NH(CH_2)_3—$,
$—CH_2O—CONH—(CH_2)_3—$,
$—CH_2O—CONH—(CH_2)_6—$,
$—S—(CH)_3—$,
$—(CH_2)_2S(CH_2)_3—$,
$—CONH—(CH_2)_3Si(CH_3)_2OSi(CH_3)_2(CH_2)_2—$,
$—CONH—(CH_2)_3Si(CH_3)_2OSi(CH_3)_2OSi(CH_3)_2(CH_2)_2—$,
$—CONH—(CH_2)_3Si(CH_3)_2O(Si(CH_3)_2O)_2Si(CH_3)_2(CH_2)_2—$,
$—CONH—(CH_2)_3Si(CH_3)_2O(Si(CH_3)_2O)_3Si(CH_3)_2(CH_2)_2—$,
$—CONH—(CH_2)_3Si(CH_3)_2O(Si(CH_3)_2O)_{10}Si(CH_3)_2(CH_2)_2—$,
$—CONH—(CH_2)_3Si(CH_3)_2O(Si(CH_3)_2O)_{20}Si(CH_3)_2(CH_2)_2—$,
$—C(O)O—(CH_2)_3—$,
$—C(O)O—(CH_2)_6—$,
$—CH_2—O—(CH_2)_3—Si(CH_3)_2—(CH_2)_2—Si(CH_3)_2—(CH_2)_2—$,
$—CH_2—O—(CH_2)_3—Si(CH_3)_2—(CH_2)_2—Si(CH_3)_2—CH(CH_3)—$,
$—CH_2—O—(CH_2)_3—Si(CH_3)_2—(CH_2)_2—Si(CH_3)_2—(CH_2)_3—$,
$—CH_2—O—(CH_2)_3—Si(CH_3)_2—(CH_2)_2—Si(CH_3)_2—CH(CH_3)—CH_2—$,
$—OCH_2—$,
$—O(CH_2)_3—$,
$—OCFHCF_2—$,

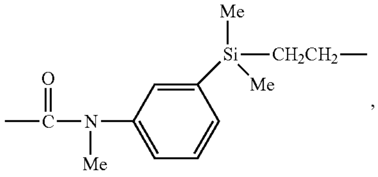
,

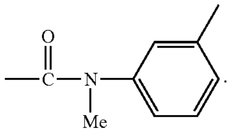
.

In still another embodiment, $X^A$ is each independently a group represented by the formula: $—(R^{16})_{x1}—(CFR^{17})_{y1}—(CH_2)_{z1}—$. In the formula, x1, y1 and z1 are each independently an integer of 0 to 10, and the sum of x1, y1 and z1 is 1 or more, the occurrence order of the respective repeating units enclosed in parentheses is not limited in the formula.

In the formula, $R^{16}$ is each independently at each occurrence an oxygen atom, phenylene, carbazolylene, $—NR^{18}—$ (in the formula, $R^{18}$ represents a hydrogen atom or an organic group), or a divalent organic group. Preferably, $R^{18}$ is an oxygen atom or a divalent polar group.

Examples of the "divalent polar group" include, but are not limited to, $—C(O)—$, $—C(=NR^{19})—$ and $—C(O)NR^{19}—$ (wherein $R^{19}$ represents a hydrogen atom or a lower alkyl group). Such a "lower alkyl group" is, for example, an alkyl group having 1 to 6 carbon atoms, such as methyl, ethyl, or n-propyl, each of which is optionally substituted with one or more fluorine atoms.

In the formulae, $R^{17}$ is each independently at each occurrence a hydrogen atom, a fluorine atom, or a lower fluoroalkyl group, and is preferably a fluorine atom. The "lower fluoroalkyl group" is, for example, a fluoroalkyl group having 1 to 6 carbon atoms and preferably 1 to 3 carbon atoms, preferably a perfluoroalkyl group having 1 to 3 carbon atoms, more preferably a trifluoromethyl group or pentafluoroethyl group, and still more preferably a trifluoromethyl group.

In still another embodiment, examples of $X^A$ include the following group:

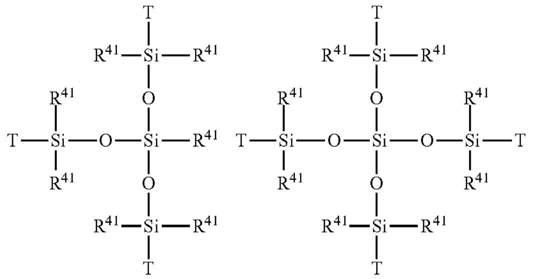

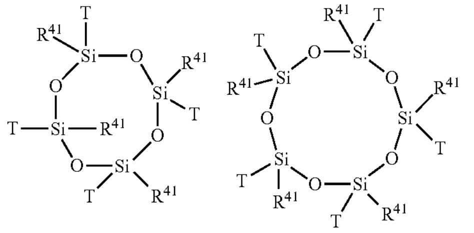

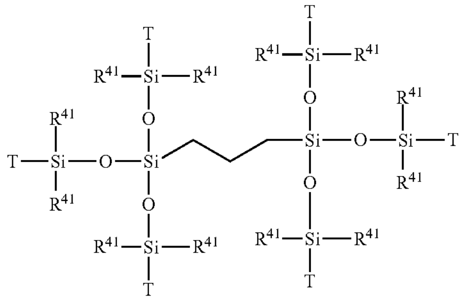

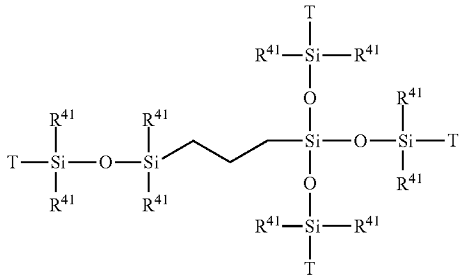

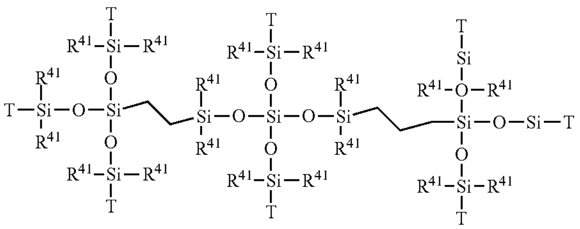

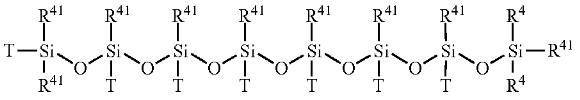

wherein $R^{41}$ is each independently a hydrogen atom, a phenyl group, an alkyl group having 1 to 6 carbon atoms, or a $C_{1-6}$ alkoxy group, and is preferably a methyl group;

some of the groups of T in each $X^A$ group are the following groups bonded to $R^{F1}$ or $R^{F2}$ of the molecular backbone:

$-CH_2O(CH_2)_2-$, $-CH_2O(CH_2)_3-$, $-CF_2O(CH_2)_3-$, $-(CH_2)_2$, $-(CH_2)_3$, $-(CH_2)_4$, $-CONH-(CH_2)_3-$, $-CON(CH_3)-(CH_2)_3-$, $-CON(Ph)-(CH_2)_3-$ (wherein Ph means phenyl), or

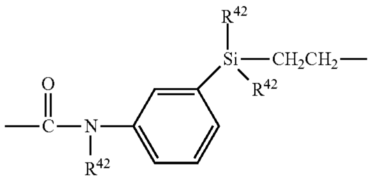

wherein $R^{42}$ each independently represents a hydrogen atom, a $C_{1-6}$ alkyl group, or a $C_{1-6}$ alkoxy group, preferably a methyl group or a methoxy group, and more preferably a methyl group; and some other groups of T are bonded to $R^{Si}$ of the molecular backbone, and the remaining groups of T, if present, are each independently a methyl group, a phenyl group, a $C_{1-6}$ alkoxy group, or a radical scavenging group or a UV absorbing group.

The radical scavenging group is not limited as long as it can scavenge a radical generated by light irradiation, and examples thereof include residues of benzophenones, benzotriazoles, benzoates, phenyl salicylates, crotonic acids, malonates, organoacrylates, hindered amines, hindered phenols, and triazines.

The UV absorbing group is not limited as long as it can absorb ultraviolet rays, and examples thereof include residues of benzotriazoles, hydroxybenzophenones, esters of substituted and unsubstituted benzoic acid or salicylic acid compounds, acrylates or alkoxy cinnamates, oxamides, oxanilides, benzoxazinones, and benzoxazoles.

In a preferred embodiment, examples of the preferred radical scavenging group or UV absorbing group include:

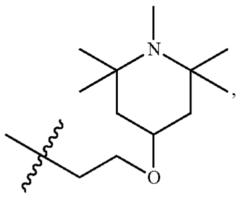

,

-continued

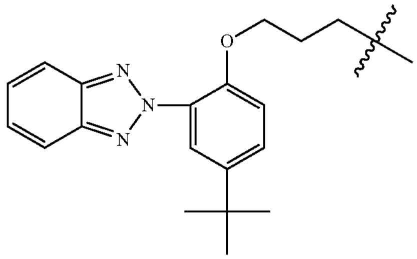

or

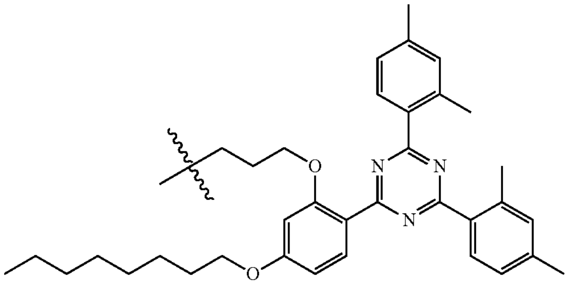

.

In this embodiment, $X^A$ may each independently be a tri- to decavalent organic group.

In still another embodiment, examples of $X^A$ include the following group:

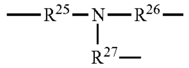

wherein $R^{25}$, $R^{26}$, and $R^{27}$ are each independently a di- to hexavalent organic group; and $R^{25}$ binds to at least one $R^{F1}$, and $R^{26}$ and $R^{27}$ each bind to at least one $R^{Si}$.

In one embodiment, $R^{25}$ is a single bond, a $C_{1-20}$ alkylene group, a $C_{3-20}$ cycloalkylene group, a $C_{5-20}$ arylene group, $-R^{57}-X^{58}-R^{59}-$, $-X^{58}-R^{59}-$, or $-R^{57}-X^{58}-$. $R^{57}$ and $R^{59}$ are each independently a single bond, a $C_{1-20}$ alkylene group, a $C_{3-20}$ cycloalkylene group, or a $C_{5-20}$ arylene group. $X^{58}$ is $-O-$, $-S-$, $-CO-$, $-O-CO-$, or $-COO-$.

In one embodiment, $R^{26}$ and $R^{27}$ are each independently a hydrocarbon, or a group having at least one atom selected from N, O and S at the end or in the main chain of a hydrocarbon, and preferred examples thereof include $C_{1-6}$ alkyl groups, $-R^{36}-R^{37}-R^{36}-$ and $-R^{36}-CHR^{38}{}_2-$. Here, $R^{36}$ is each independently a single bond or an alkyl group having 1 to 6 carbon atoms, preferably an alkyl group having 1 to 6 carbon atoms. $R^{37}$ is N, O or S, preferably N or O. $R^{38}$ is $-R^{45}-R^{46}-R^{45}-$, $-R^{46}-R^{45}-$ or $-R^{45}-R^{46}-$, where $R^{45}$ is each independently an alkyl group having 1 to 6 carbon atoms. $R^{46}$ is N, O or S, preferably O.

In this embodiment, $X^A$ may each independently be a tri- to decavalent organic group.

In still another embodiment, examples of $X^A$ include a group having an isocyanuric ring.

In this embodiment, $X^A$ may each independently be a di- or trivalent organic group.

In this embodiment, the fluoropolyether group-containing compound is a compound represented by the following formula (α1) or (α2):

(α1)

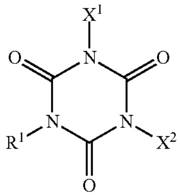

(α2)

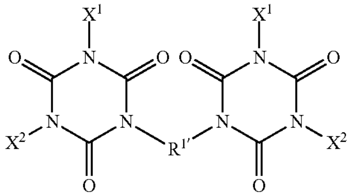

wherein $R^1$ is a monovalent organic group containing $Rf^1$—$R^F$—$O_q$—;

$R^{1'}$ is a divalent organic group containing —$Rf^2_p$—$R^F$—$O_q$—;

$Rf^1$ is each independently at each occurrence a $C_{1-16}$ alkyl group optionally substituted with one or more fluorine atoms;

$Rf^2$ is a $C_{1-6}$ alkylene group optionally substituted with one or more fluorine atoms;

$R^F$ is each independently at each occurrence a divalent fluoropolyether group;

p is 0 or 1;

q is each independently at each occurrence 0 or 1;

$X^1$ is each independently a monovalent group containing $R^{Si}$;

$R^{Si}$ is each independently at each occurrence a monovalent group containing a Si atom to which a hydroxyl group, a hydrolyzable group, a hydrogen atom, or a monovalent organic group is bonded; and $X^2$ each independently represents a monovalent group.

In the formulae, $Rf^1$, $Rf^2$, $R^F$, p, q, and $R^{Si}$ include the same definition and the same embodiments as described for the formulae (1) and (2).

$R^1$ is preferably a monovalent organic group represented by the formula:

$$Rf^1—R^F—O_q—L——$$

wherein $Rf^1$, $R^F$, and q have the same definition as described for the formulae (1) and (2); and L is a single bond or a divalent linking group.

$R^{1'}$ is preferably a divalent organic group represented by the formula:

$$——L'—Rf^2_p—R^F—O_q—L——$$

wherein $Rf^2$, $R^F$, p, and q have the same definition as described for the formulae (1) and (2);

L is a single bond or a divalent linking group;

L' is a single bond or a divalent linking group; and

L is bonded to the isocyanuric ring on the right side of the formula (α2), and L' is bonded to the isocyanuric ring on the left side.

L is further preferably a group represented by the formula: $—(CX^{121}X^{122})_o\text{-}(L^1)_p\text{-}(CX^{123}X^{124})_q—$ wherein $X^{121}$ to $X^{124}$ are independently H, F, OH, or $—OSi(OR^{125})_3$ (wherein three $R^{125}$ are independently an alkyl group having 1 to 4 carbon atoms);

$L^1$ is —C(═O)NH—, —NHC(═O)—, —O—, —C(═O)O—, —OC(═O)—, —OC(═O)O—, or —NHC(═O)NH— (the left side of each bond is bonded to $CX^{121}X^{122}$);

o is an integer of 0 to 10;

p is 0 or 1; and q is an integer of 1 to 10.

L' is further preferably a group represented by $(CX^{126}X^{127})_r—(CX^{121}X^{122})_o\text{-}(L^1)_p\text{-}(CX^{123}X^{124})_q—$ wherein $X^{121}$ to $X^{124}$, $L^1$, o, p, and q have the same definition as defined for L;

$X^{126}$ and $X^{127}$ are independently H, F, or $C_1$, and preferably F;

r is an integer of 1 to 6; and $(CX^{126}X^{127})_r$— is bonded to $(OR^2)_a$, and $(CX^{123}X^{124})_q$ is bonded to the isocyanuric ring).

$L^1$ is preferably —O— or —C(═O)O—.

L is particularly preferably a group represented by the formula: $—(CF_2)_{m11}—(CH_2)_{m12}—O—(CH_2)_{m13}—$ (wherein m11 is an integer of 1 to 3, m12 is an integer of 1 to 3, and m13 is an integer of 1 to 3), a group represented by the formula: $—(CF_2)_{m14}—(CH_2)_{m15}—O—CH_2CH(OH)—(CH_2)_{m1}—$ (wherein m14 is an integer of 1 to 3, m15 is an integer of 1 to 3, and m16 is an integer of 1 to 3), a group represented by the formula: $—(CF_2)_{m17}—(CH_2)_{m18}—$ (wherein m17 is an integer of 1 to 3, and m18 is an integer of 1 to 3), or a group represented by the formula: $—(CF_2)_{m19}—(CH_2)_{m20}—O—CH_2CH(OSi(OCH_3)_3)—(CH_2)_{m21}—$ (wherein m19 is an integer of 1 to 3, m20 is an integer of 1 to 3, and m21 is an integer of 1 to 3).

L is not limited, and specific examples include $—C_2H_4—$, $—C_3H_6—$, $—C_4H_8—O—CH_2—$, $—CO—O—CH_2—CH(OH)—CH_2—$, $—(CF_2)_n—$ (n is an integer of 0 to 4), $—CH_2—$, $—C_4H_8—$, $—(CF_2)_n—(CH_2)_m—$ (n and m are independently an integer of 0 to 4), $—CF_2CF_2CH_2OCH_2CH(OH)CH_2—$, and $—CF_2CF_2CH_2OCH_2CH(OSi(OCH_3)_3)CH_2—$.

$X^1$ is each independently a monovalent group containing $R^{Si}$.

In a preferred embodiment, $X^1$ is a monovalent group represented by the formula:

$-L^2\text{-}R^{Si}$ wherein $L^2$ is a single bond or a divalent linking group; and $R^{Si}$ has the same definition as described for the formulae (1) and (2).

$L^2$ is a single bond or a divalent linking group directly bonded to the ring of the formula (α1). $L^2$ is preferably a single bond, an alkylene group, or a divalent group containing at least one bond selected from the group consisting of an ether bond and an ester bond, and more preferably a single bond, an alkylene group having 1 to 10 carbon atoms, or a divalent hydrocarbon group having 1 to 10 carbon atoms and containing at least one bond selected from the group consisting of an ether bond and an ester bond.

Specific examples of $L^2$ include $—C_2H_4—$, $—C_3H_6—$, $—C_4H_8—O—CH_2—$, $—CO—O—CH_2—CH(OH)—CH_2—$, $—CH_2—$, and $—C_4H_8—$.

In one embodiment, $X^2$ may each independently be a monovalent organic group containing $Rf^1—R^FO_q—$. Preferable groups of the organic group are the same as those of $R^1$.

In another embodiment, $X^2$ may each independently be a monovalent group containing $R^{Si}$.

In another embodiment, $X^2$ may independently be at least one group selected from the group consisting of a silicone residue, a silsesquioxane residue, and a silazane group.

Examples of the silicone residue include the following groups.

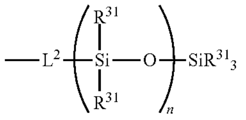

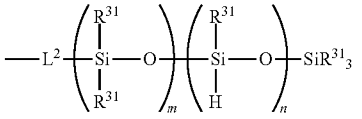

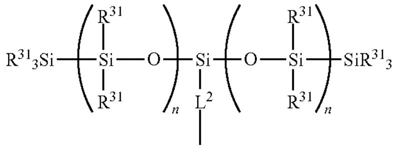

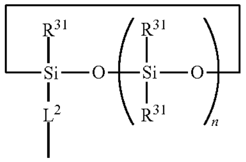

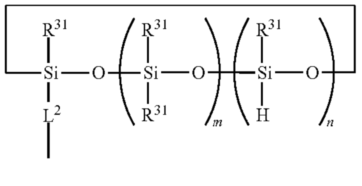

In each formula, $L^2$ is a single bond or a divalent linking group, n is an integer of 1 to 20, m is an integer of 0 to 10, $R^{31}$ is each independently a monovalent group, and among $R^{31}$ of each group, at least one is a reactive group.

A plurality of $R^{31}$ contained in each group is independently a monovalent group, and may be the above reactive group or may be a group different from the above reactive group, provided that at least one of the plurality of $R^{31}$ contained in each group is the above reactive group.

The reactive group is preferably H, a halogen atom, or at least one selected from the group consisting of $—OR^{32}$ ($R^{32}$ is an alkyl group having 1 to 4 carbon atoms or an aryl group having 6 to 20 carbon atoms), $-L^3-SiR^5_3$ ($L^3$ is a single bond or an alkylene group having 1 to 10 carbon atoms, and $R^5$ is a halogen atom), $-L^3-Si(OR^6)_3$ ($L^3$ is as described above, and $R^6$ is independently an alkyl group having 1 to 4 carbon atoms), $-L^3-Si(NR^6_2)_3$ ($L^3$ and $R^6$ are as described above), $-L^3-Si(OCOR^6)_3$ ($L^3$ and $R^6$ are as described above), and a group containing any of these groups.

The group different from the reactive group is preferably at least one selected from the group consisting of an alkyl group, a halogenated alkyl group, an alkyl ester group, a halogenated alkyl ester group, an alkyl ether group, a halogenated alkyl ether group, an alkyl amide group, a halogenated alkyl amide group, an uril group, a halogenated uril group, a urea group, a halogenated urea group, $—CONR^kCOR^l$ ($R^k$ and $R^l$ are independently H, an alkyl group, or a halogenated alkyl group), a group containing a sugar chain, an alkylene polyether group, an arene group, a halogenated arene group, a group containing a heterocycle, an aryl group, and a halogenated aryl group.

$L^2$ is a single bond or a divalent linking group directly bonded to the ring of formula ($\alpha$1) or formula ($\alpha$2). Suitable examples of $L^2$ are as described above.

Examples of the silicone residue also include the following groups.

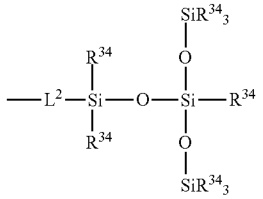

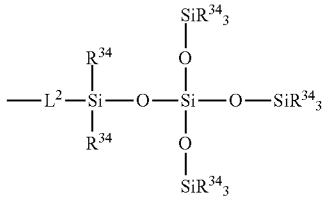

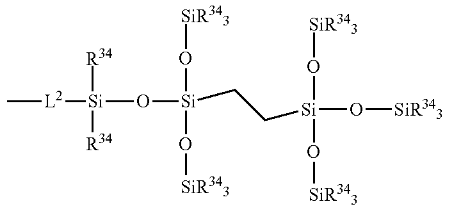

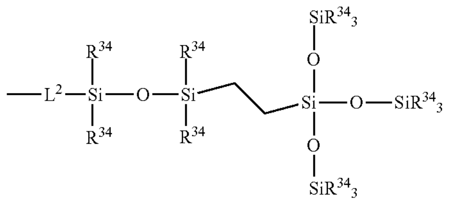

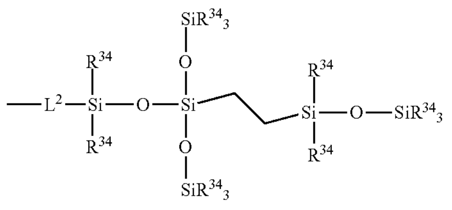

-continued

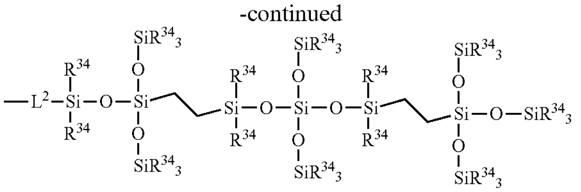

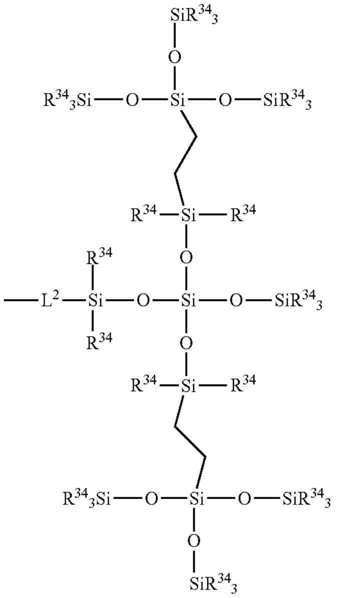

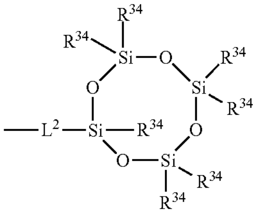

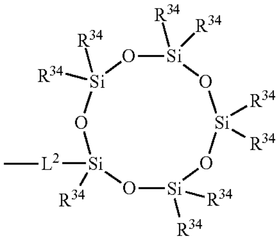

In each formula, $L^2$ is a single bond or a divalent linking group, $R^{34}$ is each independently a monovalent group, and among $R^{34}$ of each group, at least one is a reactive group.

A plurality of $R^{34}$ contained in each group is independently a monovalent group, and may be the above reactive group or may be a group different from the above reactive group, provided that at least one of the plurality of $R^{34}$ contained in each group is the above reactive group.

The reactive group is preferably at least one selected from the group consisting of —H, —$OR^{35}$ ($R^{35}$ is an alkyl group having 1 to 4 carbon atoms), a halogen atom, —OH, —O—$CR^{35}$=$CH_2$ ($R^{35}$ is as above), —$OCOR^{35}$ ($R^{35}$ is as above), —$OCOOR^j$ ($R^j$ is an alkyl group or a halogenated alkyl group), —$NR^{352}$ ($R^{35}$ is as above), and a group containing any of these groups.

The group different from the reactive group is preferably at least one selected from the group consisting of an alkyl group, a halogenated alkyl group, an alkyl ester group, a halogenated alkyl ester group, an alkyl ether group, a halogenated alkyl ether group, an alkyl amide group, a halogenated alkyl amide group, an uril group, a halogenated uril group, a urea group, a halogenated urea group, —$CONR^kCOR^l$ ($R^k$ and $R^l$ are independently H, an alkyl group, or a halogenated alkyl group), a group containing a sugar chain, an alkylene polyether group, an arene group, a halogenated arene group, a group containing a heterocycle, an aryl group, and a halogenated aryl group.

$L^2$ is a single bond or a divalent linking group directly bonded to the ring of formula (α1) or formula (α2). Suitable examples of $L^2$ are as described above.

Examples of the silsesquioxane residue include the following groups.

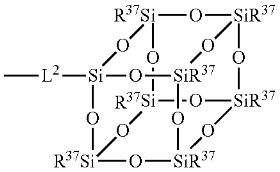

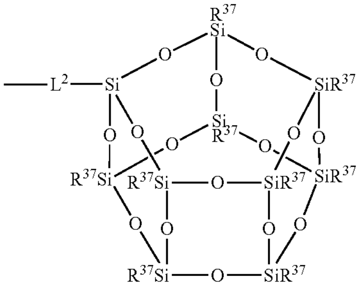

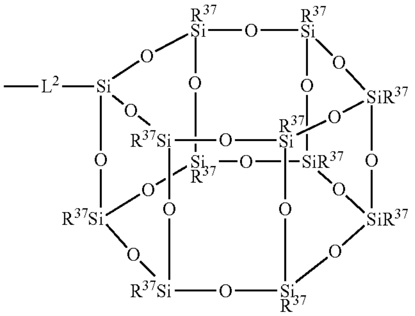

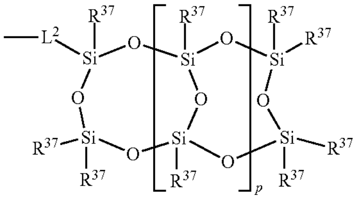

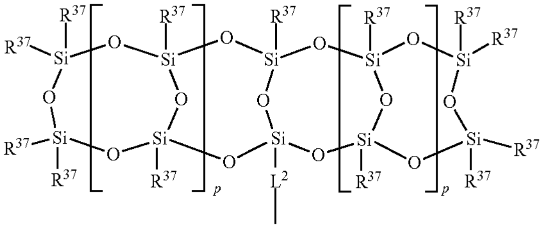

In each formula, $L^2$ is a single bond or a divalent linking group; $R^{37}$ is each independently a monovalent group; among $R^{37}$ of each group, at least one is a reactive group; and p is independently an integer of 0 to 5000.

A plurality of $R^{37}$ contained in each group is independently a monovalent group, and may be the above reactive group or may be a group different from the above reactive group, provided that at least one of the plurality of $R^{37}$ contained in each group is the above reactive group.

The reactive group is preferably at least one selected from the group consisting of —H, —$OR^{35}$ ($R^{35}$ is an alkyl group having 1 to 4 carbon atoms), a halogen atom, —OH, —O—$CR^{35}$=$CH_2$ ($R^{35}$ is as above), —$OCOR^{35}$ ($R^{35}$ is as above), —$OCOOR^j$ ($R^j$ is an alkyl group or a halogenated alkyl group), —$NR^{35}_2$ ($R^{35}$ is as above), and a group containing any of these groups.

The group different from the reactive group is preferably at least one selected from the group consisting of an alkyl group, a halogenated alkyl group, an alkyl ester group, a halogenated alkyl ester group, an alkyl ether group, a halogenated alkyl ether group, an alkyl amide group, a halogenated alkyl amide group, an uril group, a halogenated uril group, a urea group, a halogenated urea group, —$CONR^kCOR^l$ ($R^k$ and $R^l$ are independently H, an alkyl group, or a halogenated alkyl group), a group containing a sugar chain, an alkylene polyether group, an arene group, a halogenated arene group, a group containing a heterocycle, an aryl group, and a halogenated aryl group.

$L^2$ is a single bond or a divalent linking group directly bonded to the ring of formula (α1) or formula (α2). Suitable examples of $L^2$ are as described above.

$X^2$ may be a group different from the monovalent organic group containing $Rf^1$—$R^F$—$O_q$—, the monovalent group containing $R^{Si}$, the silicone residue, the silsesquioxane residue, and the silazane group described above.

That is to say, $X^2$ may independently be at least one selected from the group consisting of H, an alkyl group, a halogenated alkyl group, an alkyl ester group, a halogenated alkyl ester group, an alkyl ether group, a halogenated alkyl ether group, an alkyl amide group, a halogenated alkyl amide group, an uril group, a halogenated uril group, a urea group, a halogenated urea group, —$OCOOR^j$ ($R^j$ is an alkyl group or a halogenated alkyl group), —$CONR^kCOR^l$ ($R^k$ and $R^l$ are independently H, an alkyl group, or a halogenated alkyl group), a group containing a sugar chain, an alkylene polyether group, an arene group, a halogenated arene group, a group containing a heterocycle, an aryl group, a halogenated aryl group, a silicone residue (excluding those having a reactive group), and a silsesquioxane residue (excluding those having a reactive group).

Examples of the silicone residue (excluding those having a reactive group) include the following groups. The reactive group is what is exemplified as a reactive group that can constitute $R^{37}$.

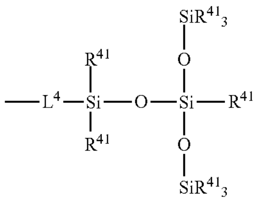

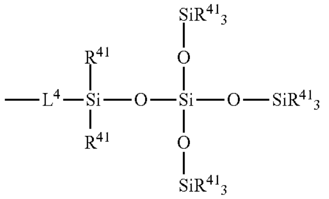

-continued

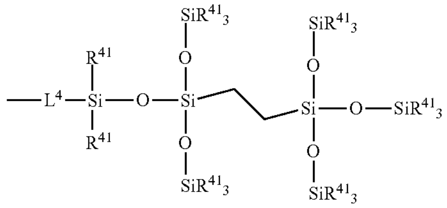

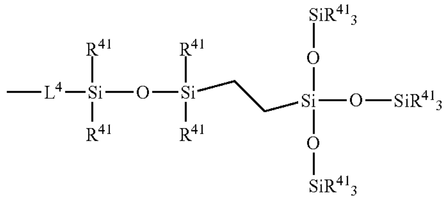

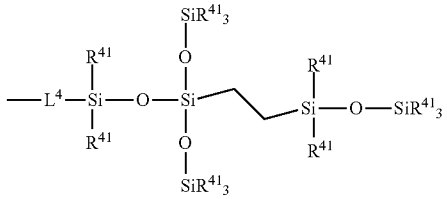

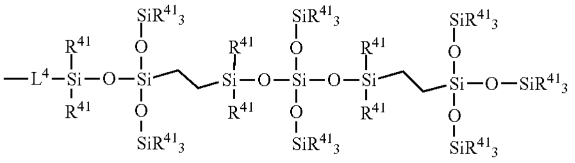

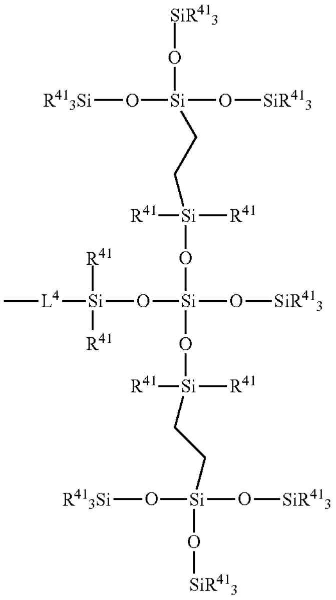

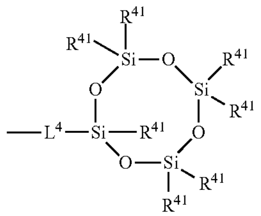

-continued

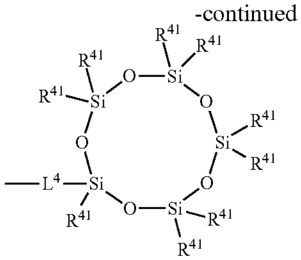

In each formula, $L^4$ is a single bond or a divalent linking group, and $R^{41}$ is each independently a group different from a monovalent reactive group.

The group different from the reactive group is preferably at least one selected from the group consisting of an alkyl group, a halogenated alkyl group, an alkyl ester group, a halogenated alkyl ester group, an alkyl ether group, a halogenated alkyl ether group, an alkyl amide group, a halogenated alkyl amide group, an uril group, a halogenated uril group, a urea group, a halogenated urea group, —$CONR^kCOR^l$ ($R^k$ and $R^l$ are independently H, an alkyl group, or a halogenated alkyl group), a group containing a sugar chain, an alkylene polyether group, an arene group, a halogenated arene group, a group containing a heterocycle, an aryl group, and a halogenated aryl group.

$L^4$ is a single bond or a divalent linking group directly bonded to the ring of formula (α1) or formula (α2). $L^4$ is preferably a single bond, an alkylene group, or a divalent group containing at least one bond selected from the group consisting of an ether bond and an ester bond, and more preferably a single bond, an alkylene group having 1 to 10 carbon atoms, or a divalent hydrocarbon group having 1 to 10 carbon atoms and containing at least one bond selected from the group consisting of an ether bond and an ester bond.

Specific examples of $L^4$ include —$C_2H_4$—, —$C_3H_6$—, —$C_4H_8$—O—$CH_2$—, and —CO—O—$CH_2$—CH(OH)—$CH_2$—.

Examples of the silsesquioxane residue (excluding those having a reactive group) include the following groups. The reactive group is what is exemplified as a reactive group that can constitute $R^{37}$.

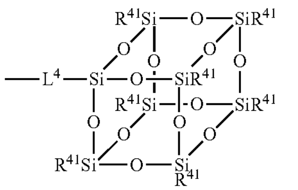

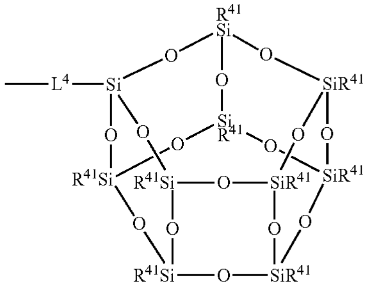

-continued

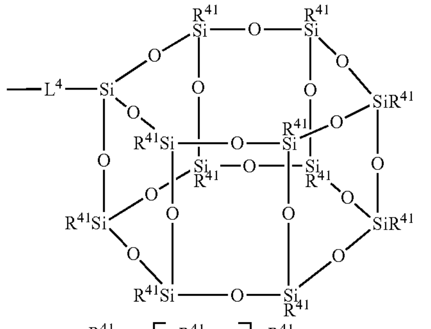

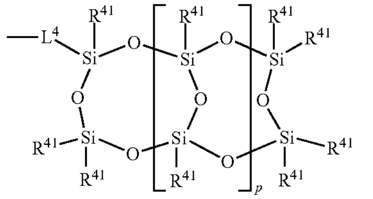

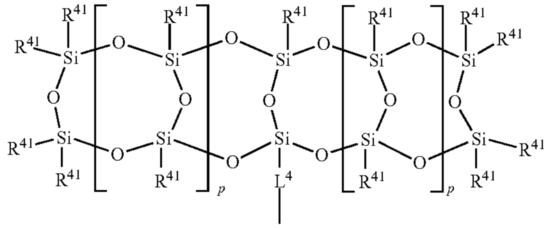

In each formula, $L^4$ is a single bond or a divalent linking group, $R^{41}$ is each independently a group different from the monovalent reactive group, and p is independently an integer of 0 to 5000.

The group different from the reactive group is preferably at least one selected from the group consisting of an alkyl group, a halogenated alkyl group, an alkyl ester group, a halogenated alkyl ester group, an alkyl ether group, a halogenated alkyl ether group, an alkyl amide group, a halogenated alkyl amide group, an uril group, a halogenated uril group, a urea group, a halogenated urea group, —$CONR^kCOR^l$ ($R^k$ and $R^l$ are independently H, an alkyl group, or a halogenated alkyl group), a group containing a sugar chain, an alkylene polyether group, an arene group, a halogenated arene group, a group containing a heterocycle, an aryl group, and a halogenated aryl group.

$L^4$ is a single bond or a divalent linking group directly bonded to the ring of formula (α1) or formula (α2). Suitable examples of $L^4$ are as described above.

Examples of the silazane group include the following groups.

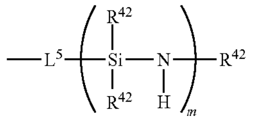

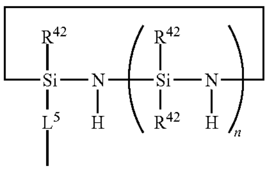

In each formula, $L^5$ is a single bond or a divalent linking group, m is an integer of 2 to 100, n is an integer of 100 or less, $R^{42}$ is each independently H, an alkyl group having 1 to 10 carbon atoms, an alkenyl group, a cycloalkyl group having 5 to 12 carbon atoms, an aryl group having 6 to 10 carbon atoms, an alkylsilyl group, an alkylcyano group, or an alkoxy group having 1 to 4 carbon atoms.

$L^5$ is a single bond or a divalent linking group directly bonded to the ring of formula ($\alpha$1) or formula ($\alpha$2). $L^5$ is preferably a single bond, an alkylene group, or a divalent group containing at least one bond selected from the group consisting of an ether bond and an ester bond, and more preferably a single bond, an alkylene group having 1 to 10 carbon atoms, or a divalent hydrocarbon group having 1 to 10 carbon atoms and containing at least one bond selected from the group consisting of an ether bond and an ester bond.

Specific examples of $L^5$ include $-C_2H_4-$, $-C_3H_6-$, $-C_4H_8-O-CH_2-$, and $-CO-O-CH_2-CH(OH)-CH_2-$.

Specific examples of the silazane group include the following groups.

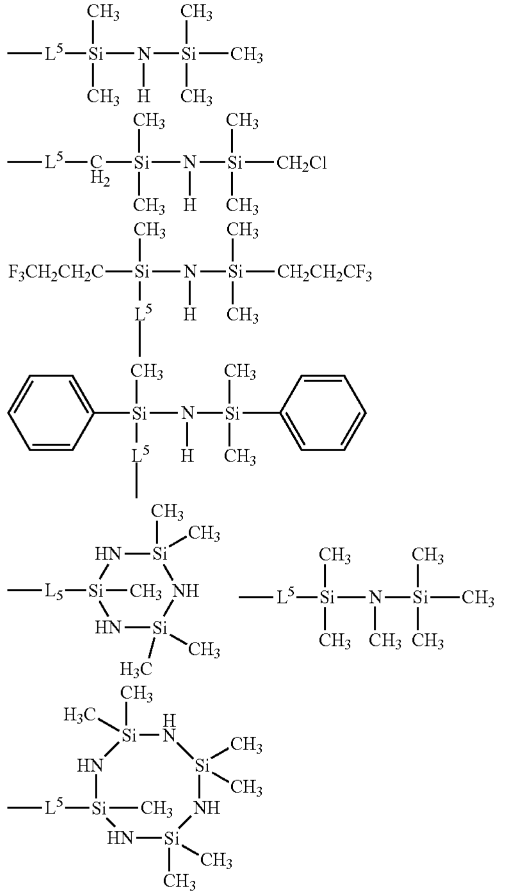

In the above compound, the average molecular weight of $R^1$ is not limited, and is 500 to 30,000, preferably 1,500 to 30,000, and more preferably 2,000 to 10,000.

The compound may have an average molecular weight of, although the average molecular weight is not limited, $5\times10^2$ to $1\times10^5$. In particular, the compound preferably has an average molecular weight of 2,000 to 30,000, and more preferably 2,500 to 12,000, from the viewpoint of UV resistance and friction durability. In the present disclosure, the "average molecular weight" refers to a number average molecular weight, and the "average molecular weight" is a value obtained by $^{19}$F-NMR measurement.

The fluoropolyether group-containing compound represented by the formula (1) or the formula (2) is not limited, but may have an average molecular weight of $5\times10^2$ to $1\times10^5$. In this range, the average molecular weight is preferably 2,000 to 32,000 and more preferably 2,500 to 12,000 from the viewpoint of durability. The "average molecular weight" refers to a number average molecular weight, and the "average molecular weight" is a value obtained by $^{19}$F-NMR measurement.

In one embodiment, the fluoropolyether group-containing compound is a compound represented by the formula (1).

In another embodiment, the fluoropolyether group-containing compound is a compound represented by the formula (2).

In another embodiment, the fluoropolyether group-containing compound includes both the compound represented by the formula (1) and the compound represented by the formula (2). The fluoropolyether group-containing compound may be used as a mixture of the compound represented by the formula (1) and the compound represented by the formula (2).

In the above mixture, the content of the compound represented by the formula (2) is preferably 0.1 to 35 mol % based on the total amount of the compound represented by the formula (1) and the compound represented by the formula (2). The lower limit of the content of the compound represented by the formula (2) may be preferably 0.1 mol %, more preferably 0.2 mol %, even more preferably 0.5 mol %, yet more preferably 1 mol %, particularly preferably 2 mol %, and especially 5 mol %, based on the total of the compound represented by the formula (1) and the compound represented by the formula (2). The upper limit of the content of the compound represented by the formula (2) may be preferably 35 mol %, more preferably 30 mol %, even more preferably 20 mol %, and yet more preferably 15 mol % or 10 mol %, based on the total amount of the compound represented by the formula (1) and the compound represented by the formula (2). The compound represented by the formula (2) is preferably 0.1 to 30 mol %, more preferably 0.1 to 20 mol %, still more preferably 0.2 to 10 mol %, further preferably 0.5 to 10 mol %, particularly preferably 1 mol to 10 mol %, and for example, 2 to 10 mol % or 5 to 10 mol %, based on the total of the compound represented by the formula (1) and the compound represented by the formula (2). When the content of the compound represented by the formula (2) is within the above-mentioned range, durability can be further improved.

The compound represented by the formula (1) or (2) can be produced by a method described in, for example, WO 97/07155 A, JP 2008-534696 W, JP 2014-218639 A, JP 2017-082194 A, WO 2018/056410 A, or the like.

(5-8) Method for Forming Water-Repellent Coating

The water-repellent coating can be formed by forming a layer of the surface-treating agent containing the fluoropolyether group-containing compound on the surface of the aluminum substrate and optionally post-treating the layer, thereby forming a layer from the surface-treating agent.

The above surface-treating agent contains at least one fluoropolyether group-containing silane compound represented by the formula (1) or (2).

The content of the compound represented by the formula (1) or (2) is preferably 0.1 to 50.0 mass %, more preferably 1.0 to 30.0 mass %, even more preferably 5.0 to 25.0 mass %, and particularly preferably 10.0 to 20.0 mass % based on the entirety of the surface-treating agent. When the content of the fluoropolyether group-containing compound falls within the above range, higher water- and oil-repellency can be obtained.

The surface-treating agent may contain a solvent, an (unreactive) fluoropolyether compound that can be understood as a fluorine-containing oil, preferably a perfluoro (poly)ether compound (hereinafter, collectively referred to as a "fluorine-containing oil"), an (unreactive) silicone compound that can be understood as a silicone oil (hereinafter, referred to as a "silicone oil"), an alcohol, a catalyst, a surfactant, a polymerization inhibitor, a sensitizer, and the like.

Examples of the solvent include aliphatic hydrocarbons such as hexane, cyclohexane, heptane, octane, nonane, decane, undecane, dodecane, and mineral spirits; aromatic hydrocarbons such as benzene, toluene, xylene, naphthalene, and solvent naphtha; esters such as methyl acetate, ethyl acetate, propyl acetate, n-butyl acetate, isopropyl acetate, isobutyl acetate, cellosolve acetate, propylene glycol methyl ether acetate, carbitol acetate, diethyl oxalate, ethyl pyruvate, ethyl 2-hydroxybutyrate, ethyl acetoacetate, amyl acetate, methyl lactate, ethyl lactate, methyl 3-methoxypropionate, ethyl 3-methoxypropionate, methyl 2-hydroxyisobutyrate, and ethyl 2-hydroxyisobutyrate; ketones such as acetone, methyl ethyl ketone, methyl isobutyl ketone, 2-hexanone, cyclohexanone, methyl amino ketone, and 2-heptanone; glycol ethers such as ethyl cellosolve, methyl cellosolve, methyl cellosolve acetate, ethyl cellosolve acetate, propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether, and ethylene glycol monoalkyl ether; alcohols such as methanol, ethanol, iso-propanol, n-butanol, isobutanol, tert-butanol, sec-butanol, 3-pentanol, octyl alcohol, 3-methyl-3-methoxybutanol, and tert-amyl alcohol; glycols such as ethylene glycol and propylene glycol; cyclic ethers such as tetrahydrofuran, tetrahydropyran, and dioxane; amides such as N,N-dimethylformamide and N,N-dimethylacetamide; ether alcohols such as methyl cellosolve, cellosolve, isopropyl cellosolve, butyl cellosolve, and diethylene glycol monomethyl ether; diethylene glycol monoethyl ether acetate; and fluorine-containing solvents such as 1,1,2-trichloro-1,2,2-trifluoroethane, 1,2-dichloro-1,1,2,2-tetrafluoroethane, dimethyl sulfoxide, 1,1-dichloro-1,2,2,3,3-pentafluoropropane (HCFC 225), Zeorora H, HFE 7100, HFE 7200, HFE 7300, $CF_3CH_2OH$, $CF_3CF_2CH_2OH$, and $(CF_3)_2CHOH$. Alternatively, the solvent may be a mixed solvent of two or more of such solvents.

Examples of the fluorine-containing oil include, but are not limited to, compounds (perfluoro(poly)ether compounds) represented by the following general formula (3):

$$R^{f5}—(OC_4F_8)_{a'}—(OC_3F_6)_{b'}—(OC_2F_4)_{c'}—(OCF_2)_{d'}—R^{f6} \quad (3)$$

wherein $R^{f5}$ represents a $C_{1-16}$ alkyl group optionally substituted with one or more fluorine atoms (preferably, a $C_{1-16}$ perfluoroalkyl group), $R^{f6}$ represents a $C_{1-16}$ alkyl group optionally substituted with one or more fluorine atoms (preferably, a $C_{1-16}$ perfluoroalkyl group), a fluorine atom, or a hydrogen atom, and $R^{f5}$ and $R^{f6}$ more preferably are each independently a $C_{1-3}$ perfluoroalkyl group.

a', b', c', and d' represent the respective four numbers of repeating units in perfluoro(poly)ether constituting the main backbone of the polymer and are mutually independently an integer of 0 or more and 300 or less, and the sum of a', b', c', and d' is at least 1, preferably 1 to 300, more preferably 20 to 300. The occurrence order of the respective repeating units enclosed in parentheses provided with a subscript a', b', c', or d' is not limited in the formula. Among such repeating units, $—(OC_4F_8)—$ may be any of $—(OCF_2CF_2CF_2CF_2)—$, $—(OCF(CF_3)CF_2CF_2)—$, $—(OCF_2CF(CF_3)CF_2)—$, $—(OCF_2CF_2CF(CF_3))—$, $—(OC(CF_3)_2CF_2)—$, $—(OCF_2C(CF_3)_2)—$, $—(OCF(CF_3)CF(CF_3))—$, $—(OCF(C_2F_5)CF_2)—$, and $(OCF_2CF(C_2F_5))—$, but it is preferably $—(OCF_2CF_2CF_2CF_2)—$. $—(OC_3F_6)—$ may be any of $—(OCF_2CF_2CF_2)—$, $—(OCF(CF_3)CF_2)—$, and $(OCF_2CF(CF_3))—$, and is preferably $—(OCF_2CF_2CF_2)—$. $—(OC_2F_4)—$ may be any of $—(OCF_2CF_2)—$ and $(OCF(CF_3))—$, and is preferably $—(OCF_2CF_2)—$.

The fluorine-containing oil may have an average molecular weight of 500 to 10,000. The molecular weight of the fluorine-containing oil may be measured with GPC.

The fluorine-containing oil may be contained in an amount of, for example, 0 to 50 mass %, preferably 0 to 30 mass %, and more preferably 0 to 5 mass % based on the surface-treating agent of the present disclosure. In one embodiment, the surface-treating agent of the present disclosure is substantially free of the fluorine-containing oil. Being substantially free of the fluorine-containing oil means that the fluorine-containing oil is not contained at all, or an extremely small amount of the fluorine-containing oil may be contained.

For example, a linear or cyclic silicone oil having 2,000 or less siloxane bonds can be used as the silicone oil. The linear silicone oil may be a so-called straight silicone oil or modified silicone oil. Examples of the straight silicone oil include dimethyl silicone oil, methyl phenyl silicone oil, and methyl hydrogen silicone oil. Examples of the modified silicone oil include those obtained by modifying straight silicone oil with alkyl, aralkyl, polyether, higher fatty acid ester, fluoroalkyl, amino, epoxy, carboxyl, alcohol, or the like. An example of the cyclic silicone oil includes cyclic dimethylsiloxane oil.

In the surface-treating agent of the present disclosure, the silicone oil may be contained in an amount of, for example, 0 to 300 parts by mass, and preferably 50 to 200 parts by mass, per 100 parts by mass in total of the fluoropolyether group-containing silane compound of the present disclosure (in the case of two or more kinds, the total thereof, and the same applies below).

Examples of the alcohol include alcohols having 1 to 6 carbon atoms optionally substituted with one or more fluorine atoms, such as methanol, ethanol, iso-propanol, tert-butanol, $CF_3CH_2OH$, $CF_3CF_2CH_2OH$, and $(CF_3)_2CHOH$. Such alcohol added to the surface-treating agent increases the stability of the surface-treating agent and improves the miscibility between the perfluoropolyether group-containing silane compound and the solvent.

The alcohol is preferably 2,2,3,3,3-pentafluoro-1-propanol or 2,2,2-trifluoroethanol.

Examples of the catalyst include acids (such as acetic acid and trifluoroacetic acid), bases (such as ammonia, triethylamine, and diethylamine), and transition metals (such as Ti, Ni, and Sn).

The catalyst promotes hydrolysis and dehydrative condensation of the fluoropolyether group-containing silane compound of the present disclosure, and promotes formation of a layer formed of the surface-treating agent of the present disclosure.

Examples of further components include, in addition to those described above, tetraethoxysilane, methyltrimethoxysilane, 3-aminopropyltrimethoxysilane, 3-glycidoxypropyltrimethoxysilane, and methyltriacetoxysilane.

The surface-treating agent can be formed into a pellet by impregnating a porous material, for example, a porous ceramic material or a metal fiber for example that obtained by solidifying a steel wool, therewith. Such pellets can be used in, for example, vacuum deposition.

The surface-treating agent may contain, in addition to the components described above, trace amounts of Pt, Rh, Ru, 1,3-divinyltetramethyldisiloxane, triphenylphosphine, NaCl, KCl, silane condensates, and the like as impurities.

The layer of the surface-treating agent can be formed by applying the surface-treating agent to the surface of the substrate so as to coat the surface. The coating method is not limited. For example, a wet coating method and a dry coating method can be used.

Examples of the wet coating method include dip coating, spin coating, flow coating, spray coating, roll coating, gravure coating, and similar methods.

Examples of the dry coating method include deposition (usually, vacuum deposition), sputtering, CVD, and similar methods. Specific examples of the deposition method (usually, a vacuum deposition method) include resistive heating, high-frequency heating using electron beam, microwave or the like, ion beam, and similar methods. Specific examples of the CVD method include plasma-CVD, optical CVD, thermal CVD, and similar methods.

Furthermore, coating by an atmospheric pressure plasma method can be performed.

A layer of the surface-treating agent is preferably formed such that the fluoropolyether group-containing compound coexists in the layer with a catalyst for hydrolysis and dehydrative condensation. Conveniently, in the case of a wet coating method, the surface-treating agent is diluted with a solvent, and then, immediately before application to the substrate surface, a catalyst may be added to the surface-treating agent. In the case of a dry coating method, the surface-treating agent to which a catalyst has been added is directly used to a deposition (usually vacuum deposition) treatment, or a pellet-like material may be used to a deposition (usually vacuum deposition) treatment, wherein the pellets is obtained by impregnating a porous body of metal such as iron or copper with the surface-treating agent to which the catalyst has been added.

Any suitable acid or base can be used as a catalyst. For example, acetic acid, formic acid, and trifluoroacetic acid can be used as the acid catalyst. The base catalyst may be, for example, ammonia or organic amine.

(7) Effect

In the outdoor heat exchanger 23 of the present disclosure, an anodized film and a water-repellent coating are provided on the surface of the aluminum substrate in the fin 43. In the heat exchanger 23, even when condensed water is generated, enlarged droplets can spontaneously jump (scatter) from the fin 43 by the release of excess surface energy without depending on gravity by the mechanism mentioned below. Therefore, the outdoor heat exchanger 23 provided with the fin 43 can more effectively suppress frost formation by scattering condensed water in the frost formation environment. Further, when a plurality of protruding portions 61 satisfying the relationships of Expression 1 to Expression 3 is present in the surface structure of the fin 43, frost formation can be more effectively suppressed.

Thus, even when the outdoor heat exchanger 23 is used in the frost formation environment, frost formation can be suppressed by scattering condensed water, and the heating operation time until the start of defrosting operation can be prolonged. In addition, this can suppress the deterioration of comfort such that defrosting operation is frequently carried out and the temperature of the air-conditioned space is reduced.

The outdoor heat exchanger 23 of the present embodiment receives the airflow flowing from the outdoor fan 25 in the horizontal direction, (although it does not receive the airflow flowing in the vertical direction to promote the dropping of droplets), and by employing the specific structure, only the supply of the airflow in the horizontal direction enables the droplets to be sufficiently removed from the surface of the fin 43. In particular, since employing the above surface structure enables droplets to spontaneously jump even at a portion where specific airflow is not generated or a portion where the airflow is weak, the attachment of frost can be effectively suppressed.

Figure 13:
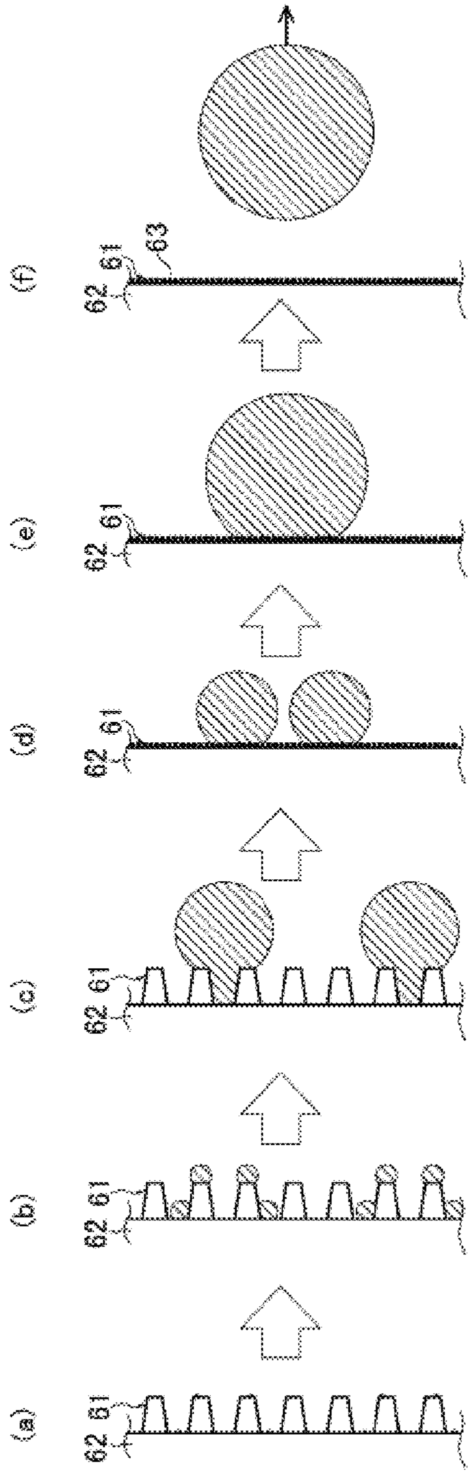
FIG. 13 is a diagram illustrating the mechanism of the phenomenon of jumping of droplets.

The mechanism that enables droplets to spontaneously jump by the release of excess surface energy without depending on gravity when droplets are enlarged on the surface of the fin 43 is not limited, but for example, can be considered as shown in FIG. 13.

First, as shown in (a), on the surface of the fin 43 of the outdoor heat exchanger 23 that functions as the evaporator of the refrigerant, fine droplets (having a diameter of about several nm) serving as cores are generated. Next, as shown in (b), the generated cores grow and the particle diameter of the condensed droplets increases. Thereafter, as shown in (c), droplets further grow and are brought into a state of attaching to adjacent protruding portions 61 while filling the recess portion between the protruding portions 61 of the fin 43. Further, as shown in (d), droplets grow so as to extend over a plurality of adjacent protruding portions 61, and as shown in (e), adjacent droplets are coalesced. In the coalescence of the droplets, the surface free energy changes and exceeds the restraining force of the droplets to the surface of the fin 43, and as shown in (f), droplets spontaneously jump.

The kinetic energy Ek for allowing a droplet to spontaneously jump can be, when a dynamic relationship is modelized in which m is taken as the mass of the droplet and U is taken as the moving speed of the jumping droplet, represented as follows.

$$E_k = 0.5\,mU^2 = \Delta E_s - E_w - \Delta E_h - \Delta E_{vis}$$

Here, $\Delta E_n$ represents the amount of change of the surface free energy when droplets coalesce, $E_w$ represents the restricting energy of droplets received by the solid surface, $\Delta E_h$ represents the amount of change of the position energy (substantially 0 since the fin 43 of the present embodiment extends in parallel to the surface orthogonal to the horizontal direction), and $\Delta E_{vis}$ represents the viscous resistance when a fluid flows.

When droplets are small in the above relational expression, the surface free energy generated in the coalescence is small, thereby not leading to spontaneous jumping. In this stage, the size of droplets is small, so that even when the ambient temperature is 0° C. or less, the droplets are likely to be maintained in a supercooled state without being frozen. Then, when the surface free energy generated in the coalescence of the droplets exceeds the restraining force to the surface, spontaneous jumping is considered to occur. Thus, when the droplets are difficult to maintain the supercooled state due to the increased size of the droplets and fall into a situation where the droplets are likely to start to freeze, in this case, the droplets jump by the surface free energy generated in the coalescence of the droplets and hardly remain on the surface, so that the frost formation is considered to be suppressed.

In particular, due to that the plurality of protruding portions 61 is formed so as to satisfy the relationships of Expression 1 to Expression 3, the restraining force to the droplets on the surface of the fin 43 can be suppressed by the following reasons, and the droplets can easily scatter from the fin 43.

In other words, when the plurality of protruding portions 61 is formed so as to satisfy the relationship of Expression (1-1), the distance between adjacent protruding portions 61 is not too narrow. Thus, the generation of capillary force between adjacent protruding portions 61 is suppressed.

When the plurality of protruding portions 61 is formed so as to satisfy the relationship of Expression (1-2), the distance between adjacent protruding portions 61 is not too wide. Thus, the generation of attachment force between the condensed water and the substrate 62 caused by entering of the condensed water into adjacent protruding portions 61 is suppressed.

When the plurality of protruding portions 61 is formed so as to satisfy the relationship of Expression (1-3), the distance between the top of the protruding portion 61 and the substrate 62 is ensured, so that the contact of the condensed water attached to the top of the protruding portion 61 with the substrate 62 can be suppressed. Thus, the generation of attachment force between the condensed water and the substrate 62 caused by entering of the condensed water into adjacent protruding portions 61 is suppressed.

Then, when the plurality of protruding portions 61 is formed so as to satisfy Expression (1-4), an increase in the particle diameter of droplets entering between adjacent protruding portions 61 is suppressed.

Thus, due to that the plurality of protruding portions 61 is formed so as to satisfy the relationship of Expression 1, the generation of capillary force and attachment force that are restraining forces to the droplets on the surface of the fin 43 and the increase in the particle diameter of the droplets are suppressed. Thus, in the fin 43 formed so that the plurality of protruding portions 61 satisfies the relationship of Expression 1, the droplets generated on the surface can easily scatter.

In addition, when the plurality of protruding portions 61 is formed so as to satisfy the relationship of Expression (2-1), the condensed water entering between adjacent protruding portions 61 is made smaller. Thus, in the fin 43 formed so that the plurality of protruding portions 61 satisfies the relationship of Expression 2, the increase in the particle diameter of the droplets is further suppressed, and the droplets generated on the surface can more easily scatter.

Further, when the plurality of protruding portions 61 is formed so as to satisfy the relationship of Expression (3-1), the distance between the top of the protruding portion 61 and the substrate 62 is more ensured, so that the contact of the condensed water attached to the top of the protruding portion 61 with the substrate 62 can be more reliably suppressed. Thus, in the fin 43 formed so that the plurality of protruding portions 61 satisfies the relationship of Expression 3, the generation of restraining force to the droplets on the surface of the fin 43 is further suppressed, and the condensed water can more easily scatter.

(8) Modification

The above embodiment can be suitably modified as shown in the modification below.

(8-1) Modification A

In the above embodiment, the case where the specific structure is provided on the surface of the fin 43 of the outdoor heat exchanger 23 is described as an example.

However, other portions to which condensed water may be attached may be provided with the specific structure. For example, the above specific structure may be provided on the surface of the heat transfer pipe 41 and the surface of the U-shaped pipe 42 constituting the outdoor heat exchanger 23. In this case, the attachment of condensed water to the portions can be suppressed, and the attachment of frost due to the freezing of condensed water can be suppressed.

The present disclosure provides the following embodiments.

[1] A heat exchanger comprising an aluminum substrate, and a water-repellent coating provided on a surface of the aluminum substrate, wherein
the aluminum substrate has an anodized film on the surface, and
the water-repellent coating is a film formed of a fluoropolyether group-containing compound.

[2] The heat exchanger according to [1], wherein the fluoropolyether group-containing compound is a compound represented by the following formula (1) or (2):

$$R^{F1}{}_{\alpha}—X^{A}—R^{Si}{}_{\beta} \quad (1)$$

$$R^{SF}{}_{\gamma}—X^{A}—R^{F2}—X^{A}—R^{SF}{}_{\gamma} \quad (2)$$

wherein
$R^{F1}$ is each independently at each occurrence $Rf^1—R^F—O_q—$;
$R^{F2}$ is $—Rf^2{}_p—R^F—O_q—$;
$Rf^1$ is each independently at each occurrence a $C_{1-16}$ alkyl group optionally substituted with one or more fluorine atoms;
$Rf^2$ is a $C_{1-6}$ alkylene group optionally substituted with one or more fluorine atoms;
$R^F$ is each independently at each occurrence a divalent fluoropolyether group;
p is 0 or 1;
q is each independently at each occurrence 0 or 1;
$R^{Si}$ is each independently at each occurrence a monovalent group containing a Si atom to which a hydroxyl group, a hydrolyzable group, a hydrogen atom, or a monovalent organic group is bonded;
at least one $R^{Si}$ is a monovalent group containing a Si atom to which a hydroxyl group or a hydrolyzable group is bonded;
$R^{SF}$ is each independently at each occurrence $R^{Si}$ or $Rf^1—R^F—O_q$
at least one $R^{SF}$ is $R^{Si}$;
$X^A$ is each independently a single bond or a di- to decavalent organic group;
$\alpha$ is an integer of 1 to 9;
$\beta$ is an integer of 1 to 9; and
$\gamma$ is each independently an integer of 1 to 9.

[3] The heat exchanger according to [1] or [2], wherein the fluoropolyether group-containing compound is a compound represented by the following formula (α1) or formula (α2):

(α1)

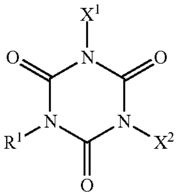

(α2)

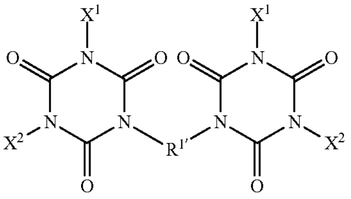

wherein $R^1$ is a monovalent organic group containing $Rf^1—R^F—O_q—$;

$R^{1'}$ is a divalent organic group containing $—Rf^2_p—R^F—O_q—$;

$Rf^1$ is each independently at each occurrence a $C_{1-16}$ alkyl group optionally substituted with one or more fluorine atoms;

$Rf^2$ is a $C_{1-6}$ alkylene group optionally substituted with one or more fluorine atoms;

$R^F$ is each independently at each occurrence a divalent fluoropolyether group;

p is 0 or 1;

q is each independently at each occurrence 0 or 1;

$X^1$ is each independently a monovalent group containing $R^{Si}$;

$R^{Si}$ is each independently at each occurrence a monovalent group containing a Si atom to which a hydroxyl group, a hydrolyzable group, a hydrogen atom, or a monovalent organic group is bonded; and $X^2$ each independently represents a monovalent group.

[4] The heat exchanger according to [2] or [3], wherein $R^F$ is each independently at each occurrence a group represented by the formula:

$$—(OC_6F_{12})_a—(OC_5F_{10})_b—(OC_4F_8)_c—(OC_3R^{Fa}_6)_d—(OC_2F_4)_e—(OCF_2)_f—$$

wherein $R^{Fa}$ is each independently at each occurrence a hydrogen atom, a fluorine atom, or a chlorine atom; and a, b, c, d, e, and f are each independently an integer of 0 to 200, the sum of a, b, c, d, e, and f is 1 or more, and the occurrence order of the respective repeating units enclosed in parentheses provided with a, b, c, d, e, or f is not limited in the formula, provided that when all $R^{Fa}$ are hydrogen atoms or chlorine atoms, at least one of a, b, c, e, and f is 1 or more.

[5] The heat exchanger according to any one of [2] to [4], wherein $R^F$ is each independently at each occurrence a group represented by the following formula (f1), (f2), (f3), (f4), or (f5):

$$—(OC_3F_6)_d— \quad (f1)$$

wherein d is an integer of 1 to 200;

$$—(OC_4F_8)_c—(OC_3F_6)_d—(OC_2F_4)_e—(OCF_2)_f— \quad (f2)$$

wherein c and d are each independently an integer of 0 to 30;

e and f are each independently an integer of 1 to 200;

the sum of c, d, e, and f is an integer of 10 to 200; and the occurrence order of the respective repeating units enclosed in parentheses provided with a subscript c, d, e, or f is not limited in the formula;

$$—(R^6—R^7)_g— \quad (f3)$$

wherein $R^6$ is $OCF_2$ or $OC_2F_4$;

$R^7$ is a group selected from $OC_2F_4$, $OC_3F_6$, $OC_4F_8$, $OC_5F_{10}$, and $OC_6F_{12}$, or is a combination of two or three groups selected from these groups; and g is an integer of 2 to 100;

$$—(OC_6F_{12})_a—(OC_5F_{10})_b—(OC_4F_8)_c—(OC_3F_6)_d—(OC_2F_4)_e—(OCF_2)_f— \quad (f4)$$

wherein e is an integer of 1 or more and 200 or less, a, b, c, d, and f are each independently an integer of 0 or more and 200 or less, the sum of a, b, c, d, e, and f is at least 1, and the occurrence order of each repeating unit enclosed in parentheses provided with a, b, c, d, e, or f is not limited in the formula; and $$—(OC_6F_{12})_a—(OC_5F_{10})_b—(OC_4F_8)_c—(OC_3F_6)_d—(OC_2F_4)_e—(OCF_2)_f— \quad (f5)$$

wherein f is an integer of 1 or more and 200 or less, a, b, c, d, and e are each independently an integer of 0 or more and 200 or less, the sum of a, b, c, d, e, and f is at least 1, and the occurrence order of each repeating unit enclosed in parentheses provided with a, b, c, d, e, or f is not limited in the formula.

[6] The heat exchanger according to any one of [2] to [5], wherein $R^{Si}$ is a group represented by the following formula (S1), (S2), (S3), or (S4):

(S1)

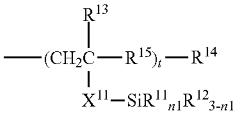

$$—SiR^{11}_{n1}R^{12}_{3-n1} \quad (S2)$$

$$—SiR^{a1}_{k1}R^{b1}_{l1}R^{c1}_{m1} \quad (S3)$$

-continued (S4)

$$-CR^{d1}_{k2}R^{e1}_{l2}R^{f1}_{m2}$$

wherein $R^{11}$ is each independently at each occurrence a hydroxyl group or a hydrolyzable group;

$R^{12}$ is each independently at each occurrence a hydrogen atom or a monovalent organic group;

n1 is each independently an integer of 0 to 3 for each ($SiR^{11}_{n1}R^{12}_{3-n1}$) unit;

$X^{11}$ is each independently at each occurrence a single bond or a divalent organic group;

$R^{13}$ is each independently at each occurrence a hydrogen atom or a monovalent organic group;

t is each independently at each occurrence an integer of 2 or more;

$R^{14}$ is each independently at each occurrence a hydrogen atom, a halogen atom, or $—X^{11}—SiR^{11}_{n1}R^{12}_{3-n1}$;

$R^{15}$ is each independently at each occurrence a single bond, an oxygen atom, an alkylene group having 1 to 6 carbon atoms, or an alkyleneoxy group having 1 to 6 carbon atoms;

$R^{a1}$ is each independently at each occurrence $—Z^1—SiR^{21}_{p1}R^{22}_{q1}R^{23}_{r1}$;

$Z^1$ is each independently at each occurrence an oxygen atom or a divalent organic group;

$R^{21}$ is each independently at each occurrence $—Z^{1'}—SiR^{21'}_{p1'}R^{22'}_{q1'}R^{23'}_{r1'}$;

$R^{22}$ is each independently at each occurrence a hydroxyl group or a hydrolyzable group;

$R^{23}$ is each independently at each occurrence a hydrogen atom or a monovalent organic group;

p1 is each independently at each occurrence an integer of 0 to 3;

q1 is each independently at each occurrence an integer of 0 to 3;

r1 is each independently at each occurrence an integer of 0 to 3; and $Z^{1'}$ is each independently at each occurrence an oxygen atom or a divalent organic group;

$R^{21'}$ is each independently at each occurrence $—Z^{1''}—SiR^{22''}_{q1''}R^{23}_{r1''}$;

$R^{22'}$ is each independently at each occurrence a hydroxyl group or a hydrolyzable group;

$R^{23'}$ is each independently at each occurrence a hydrogen atom or a monovalent organic group;

p1' is each independently at each occurrence an integer of 0 to 3;

q1' is each independently at each occurrence an integer of 0 to 3;

r1' is each independently at each occurrence an integer of 0 to 3;

$Z^{1''}$ is each independently at each occurrence an oxygen atom or a divalent organic group;

$R^{22''}$ is each independently at each occurrence a hydroxyl group or a hydrolyzable group;

$R^{23''}$ is each independently at each occurrence a hydrogen atom or a monovalent organic group;

q1" is each independently at each occurrence an integer of 0 to 3;

r1" is each independently at each occurrence an integer of 0 to 3;

$R^{b1}$ is each independently at each occurrence a hydroxyl group or a hydrolyzable group;

$R^{c1}$ is each independently at each occurrence a hydrogen atom or a monovalent organic group;

k1 is each independently at each occurrence an integer of 0 to 3;

l1 is each independently at each occurrence an integer of 0 to 3;

m1 is each independently at each occurrence an integer of 0 to 3;

$R^{d1}$ is each independently at each occurrence $—Z^2—CR^{31}_{p2}R^{32}_{q2}R^{33}_{r2}$;

$Z^2$ is each independently at each occurrence a single bond, an oxygen atom, or a divalent organic group;

$R^{31}$ is each independently at each occurrence $—Z^{2'}—CR^{32'}_{q2'}R^{33'}_{r2'}$;

$R^{32}$ is each independently at each occurrence $—Z^3—SiR^{34}_{n2}R^{35}_{3-n2}$;

$R^{33}$ is each independently at each occurrence a hydrogen atom, a hydroxyl group, or a monovalent organic group;

p2 is each independently at each occurrence an integer of 0 to 3;

q2 is each independently at each occurrence an integer of 0 to 3;

r2 is each independently at each occurrence an integer of 0 to 3;

$Z^{2'}$ is each independently at each occurrence a single bond, an oxygen atom, or a divalent organic group;

$R^{32'}$ is each independently at each occurrence $—Z^3—SiR^{34}_{n2}R^{35}_{3-n2}$;

$R^{33'}$ is each independently at each occurrence a hydrogen atom, a hydroxyl group, or a monovalent organic group;

q2' is each independently at each occurrence an integer of 0 to 3;

r2' is each independently at each occurrence an integer of 0 to 3;

$Z^3$ is each independently at each occurrence a single bond, an oxygen atom, or a divalent organic group;

$R^{34}$ is each independently at each occurrence a hydroxyl group or a hydrolyzable group;

$R^{35}$ is each independently at each occurrence a hydrogen atom or a monovalent organic group;

n2 is each independently at each occurrence an integer of 0 to 3;

$R^{e1}$ is each independently at each occurrence $—Z^3—SiR^{34}_{n2}R^{35}_{3-n2}$;

$Rf^1$ is each independently at each occurrence a hydrogen atom, a hydroxyl group, or a monovalent organic group;

k2 is each independently at each occurrence an integer of 0 to 3;

l2 is each independently at each occurrence an integer of 0 to 3; and m2 is each independently at each occurrence an integer of 0 to 3.

[7] The heat exchanger according to any one of [1] to [6], wherein the anodized film is formed by anodization of the surface of the aluminum substrate using an anodizing liquid containing one or two or more compounds selected from the group consisting of phosphoric acid, pyrophosphoric acid, oxalic acid, malonic acid, and etidronic acid.

[8] The heat exchanger according to [7], wherein a concentration of the anodizing liquid is 0.01 to 1.0 mol/L.

[9] The heat exchanger according to [7] or [8], wherein a voltage applied in the anodization is 40 to 300 V.

[10] The heat exchanger according to any one of [7] to [9], wherein a treatment time of the anodization is 10 to 120 min.

[11] The heat exchanger according to any one of [7] to [10], wherein the anodized film is subjected to an etching treatment after the anodization.

[12] The heat exchanger according to [11], wherein the etching treatment is carried out by using an etching liquid containing one or two or more compounds selected from the group consisting of phosphoric acid, pyrophosphoric acid, oxalic acid, malonic acid, and etidronic acid.

[13] The heat exchanger according to [11] or [12], wherein a concentration of the etching liquid is 10 to 60% by mass.

[14] The heat exchanger according to any one of [11] to [13], wherein a temperature of the etching liquid is 20 to 60° C.

[15] The heat exchanger according to any one of [11] to [14], wherein a treatment time of the etching treatment is 5 to 30 min.

[16] The heat exchanger according to any one of [1] to [15], wherein the surface of the aluminum substrate having the anodized film has a surface structure containing a plurality of protruding portions, and where L is taken as an average pitch of the plurality of protruding portions, D is taken as an average diameter of the plurality of protruding portions, H is taken as an average height of the plurality of protruding portions, and θ is taken as a contact angle of water on a smooth plane of the water-repellent coating, all of relationships:

$$D/L < 0.36,$$

$$D/L > 0.4 \times (L/H),$$

$$H > 700 \text{ nm},$$

$$0 > 1.28 \times D \times 10-2 + 2.77 \times (L-D) \times 10-3 - 1.1 \times D2 \times 10-$$

-continued $$5 - 5.3 \times (L-D)2 \times 10-7 - 9.8 \times D \times (L-D) \times 10-6 - 2.0, \text{ and}$$

$$90° < \theta < 120°$$

are satisfied.

[17] The heat exchanger according to any one of [1] to [16], wherein the aluminum substrate is made of aluminum having a purity of 99.99% or more.

[18] The heat exchanger according to any one of [1] to [17], wherein the aluminum substrate constitutes a plurality of fins arranged in parallel with a space.

[19] The heat exchanger according to [18], wherein a distance between adjacent fins is 0.5 to 3.0 mm.

EXAMPLES

Hereinafter, the heat exchanger of the present disclosure will be described with reference to examples, but the present disclosure is not limited to these examples.

Example 1

An aluminum substrate (30 mm×30 mm) was subjected to an anodization treatment under the following conditions to form an anodized film. Then, the anodized film was subjected to an etching treatment under the following conditions to form protruding portions. Thereafter, the aluminum substrate was subjected to an immersion treatment by using a surface-treating agent in which the following fluoropolyether group-containing compound (the compound (A)) was dissolved in hydrofluoroether (manufactured by 3M Company, Novec HFE7200) so that the concentration was 0.1 wt %, thereby forming a water-repellent coating on the aluminum substrate. The aluminum substrate not subjected to UV irradiation was used as an evaluation plate 1, and the aluminum substrate subjected to UV irradiation under the following conditions was used as an evaluation plate 2.

Anodization Treatment Conditions

Chemical solution: etidronic acid (0.1 mol %)

Temperature: 20° C.

Voltage applied: direct current 240 V

Treatment time: 30 min

Etching Conditions

Chemical solution: phosphoric acid (50% by mass)

Temperature: 50° C.

Treatment time: 17 min

Fluoropolyether group-containing compound

Compound (A)

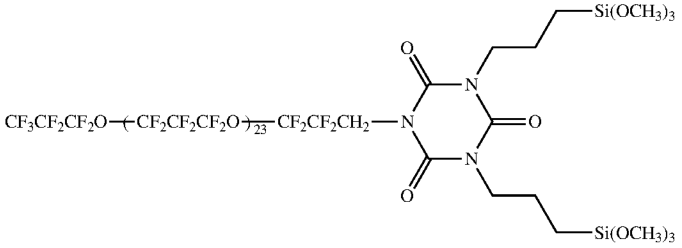

UV Irradiation Conditions

Light source: UV-B-313EL

Irradiance: 0.63 $W/m^2$

Irradiation distance: 5 cm

Irradiation time: 480 hours

Example 2

The same operation as in Example 1 was carried out except that the following compound (B) was used as the fluoropolyether group-containing compound to prepare an evaluation plate 3 (without UV irradiation) and an evaluation plate 4 (with UV irradiation).

Fluoropolyether Group-Containing Compound

Compound (B)

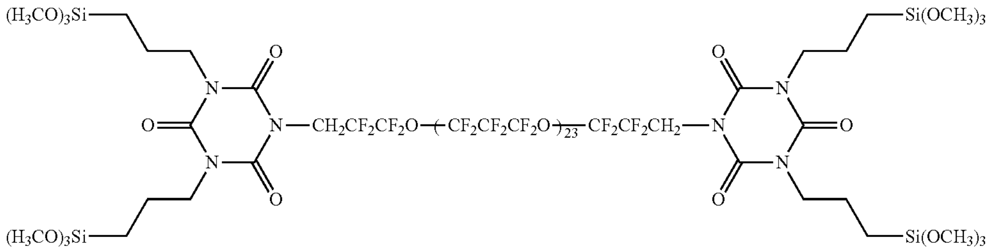

Example 3

The same operation as in Example 1 was carried out except that the following compound (C) was used as the fluoropolyether group-containing compound to prepare an evaluation plate 5 (without UV irradiation) and an evaluation plate 6 (with UV irradiation).

Compound (C)

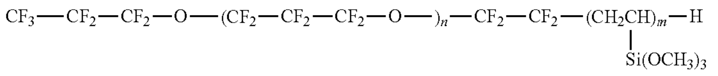

wherein n is 20 and m is 3.

Comparative Example 1

An aluminum substrate obtained by subjecting a non-treated aluminum substrate, which is not subjected to anodization and on which no water-repellent coating is formed, to UV irradiation under the same conditions as in Example 1 was used as an evaluation plate 7.

Comparative Example 2

An aluminum substrate obtained by being subjected to the same operation as in Example 1 except that a water-repellent coating was not formed, being subjected to only anodization, and being subjected to UV irradiation under the same conditions as in Example 1 was used as an evaluation plate 8.

Comparative Example 3

An aluminum substrate obtained by being subjected to the same operation as in Example 3 except for not being subjected to anodization, forming a water-repellent coating on the aluminum substrate, and being subjected to UV irradiation under the same conditions as in Example 1 was used as an evaluation plate 9.

(Evaluation Method)

For each of the evaluation plates 1 to 12, the "frost height" when the air flowing in the direction parallel to the surface was applied to one surface while cooling another surface was measured. The frost height is a change of the height in the plate thickness direction of the evaluation plate of the frost attached to another surface up to 2 hours from the start of the evaluation. The results are shown in Table 1.

The evaluation plates were cooled under the following conditions.

Heat flux: 380 W/m2

Dry-bulb temperature: 2° C.

Wet-bulb temperature: 1° C.

Wind velocity: 2.5 m/sec

Temperature of cooled surface of evaluation plate: −8.0° C.

The evaluation plate was cooled by using a Peltier element, and the heat flux was measured by a heat flux sensor provided between the evaluation plate and the Peltier element.

The frost height was measured by using a laser displacement meter.

TABLE 1

| | | Evaluation | Time (min) | | | |
|---|---|---|---|---|---|---|
| | | plate | 30 | 60 | 90 | 120 |
| Frost height (mm) | Example 1 | 1 | 0 | 0 | 0 | 0 |
| | | 2 | 0 | 0.07 | 0.22 | 0.40 |
| | Example 2 | 3 | 0 | 0 | 0 | 0 |
| | | 4 | 0 | 0.08 | 0.27 | 0.50 |
| | Example 3 | 5 | 0 | 0 | 0 | 0 |
| | | 6 | 0.07 | 0.27 | 0.57 | 0.86 |
| | Comparative Example 1 | 7 | 0.35 | 0.73 | 1.13 | 1.49 |
| | Comparative Example 2 | 8 | 0.17 | 0.48 | 0.76 | 1.26 |
| | Comparative Example 3 | 9 | 0.15 | 0.50 | 0.84 | 1.30 |

(Result)

As shown in Table 1, in the evaluation plates according to Examples 1 to 3, the frost height after 120 min is less than 1.0 mm even after UV irradiation, and it was demonstrated that the frost formation can be sufficiently suppressed.

INDUSTRIAL APPLICABILITY

Since the heat exchanger of the present invention hardly causes the reduction of the heat exchange function due to frost formation, it can be used for various equipment such as air-conditioning devices, cold storage machines, refrigerating machines, and electric vehicles.

REFERENCE SIGNS LIST

- 2: Outdoor unit
- 10: Refrigerant circuit
- 20: Outdoor unit control section
- 21: Compressor
- 23: Outdoor heat exchanger
- 24: Outdoor expansion valve
- 25: Outdoor fan
- 41: Heat transfer pipe
- 42: U-shaped pipe
- 43: Fin
- 50: Indoor unit
- 51: Indoor expansion valve
- 52: Indoor heat exchanger
- 53: Indoor fan
- 57: Indoor unit control section
- 61: Protruding portion
- 62: Substrate
- 70: Controller (control section)
- 100: Refrigerant cycle device

What is claimed is:

1. A heat exchanger comprising an aluminum substrate, and a water-repellent coating provided on a surface of the aluminum substrate, wherein the aluminum substrate has an anodized film on the surface, the water-repellent coating is a film formed of a fluoropolyether group-containing compound, wherein the surface of the aluminum substrate having the anodized film has a surface structure containing a plurality of protruding portions, and L is taken as an average pitch of the plurality of protruding portions, D is taken as an average diameter of the plurality of protruding portions, H is taken as an average height of the plurality of protruding portions, and θ is taken as a contact angle of water on a smooth plane of the water-repellent coating, all of relationships:

$$D/L < 0.36,$$

$$D/L > 0.4 \times (L/H),$$

$$H > 700 \text{ nm},$$

$$0 > 1.28 \times D \times 10^{-2} + 2.77 \times (L-D) \times 10^{-3} - 1.1 \times D^2 \times 10^{-5} - 5.3 \times (L-D)^2 \times 10^{-7} - 9.8 \times D \times (L-D) \times 10^{-6} - 2.0, \text{ and}$$

$$90° < \theta < 120°$$

are satisfied.

2. The heat exchanger according to claim 1, wherein the fluoropolyether group-containing compound is a compound represented by the following formula (1) or (2):

$$R^{F1}_{\alpha}—X^A—R^{Si}_{\beta} \quad (1)$$

$$R^{SF}_{\gamma}—X^A—R^{F2}—X^A—R^{SF}_{\gamma} \quad (2)$$

wherein $R^{F1}$ is each independently at each occurrence $Rf^1—R^F—O_q—$;

$R^{F2}$ is $—Rf^2_p—R^F—O_q—$;

$Rf^1$ is each independently at each occurrence a $C_{1-16}$ alkyl group optionally substituted with one or more fluorine atoms;

$Rf^2$ is a $C_{1-6}$ alkylene group optionally substituted with one or more fluorine atoms;

$R^F$ is each independently at each occurrence a divalent fluoropolyether group;

p is 0 or 1;

q is each independently at each occurrence 0 or 1;

$R^{Si}$ is each independently at each occurrence a monovalent group containing a Si atom to which a hydroxyl group, a hydrolyzable group, a hydrogen atom, or a monovalent organic group is bonded;

at least one $R^{Si}$ is a monovalent group containing a Si atom to which a hydroxyl group or a hydrolyzable group is bonded;

$R^{SF}$ is each independently at each occurrence $R^{Si}$ or $Rf^1—R^F—O_q—$;

at least one $R^{SF}$ is $R^{Si}$, $X^A$ is each independently a single bond or a di- to decavalent organic group;

α is an integer of 1 to 9;

β is an integer of 1 to 9; and

γ is each independently an integer of 1 to 9.

3. The heat exchanger according to claim 1, wherein the fluoropolyether group-containing compound is a compound represented by the following formula (α1) or formula (α2):

(α1)

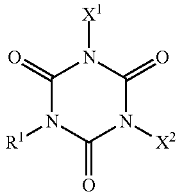

(α2)

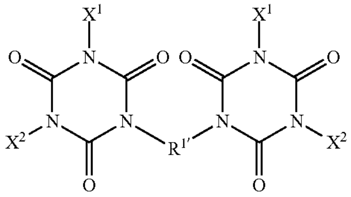

wherein $R^1$ is a monovalent organic group containing $Rf^1$—$R^F$—$O_q$—;

$R^{1'}$ is a divalent organic group containing —$Rf^2_p$—$R^F$—$O_q$—;

$Rf^1$ is each independently at each occurrence a $C_{1-16}$ alkyl group optionally substituted with one or more fluorine atoms;

$Rf^2$ is a $C_{1-6}$ alkylene group optionally substituted with one or more fluorine atoms;

$R^F$ is each independently at each occurrence a divalent fluoropolyether group;

p is 0 or 1;

q is each independently at each occurrence 0 or 1;

$X^1$ is each independently a monovalent group containing $R^{Si}$, $R^{Si}$ is each independently at each occurrence a monovalent group containing a Si atom to which a hydroxyl group, a hydrolyzable group, a hydrogen atom, or a monovalent organic group is bonded; and $X^2$ each independently represents a monovalent group.

4. The heat exchanger according to claim 1, wherein $R^F$ is each independently at each occurrence a group represented by the formula:

$$-(OC_6F_{12})_a-(OC_5F_{10})_b-(OC_4F_8)_c-(OC_3R^{Fa}_6)_d-(OC_2F_4)_e-(OCF_2)_f-$$

wherein $R^{Fa}$ is each independently at each occurrence a hydrogen atom, a fluorine atom, or a chlorine atom; and a, b, c, d, e, and f are each independently an integer of 0 to 200, the sum of a, b, c, d, e, and f is 1 or more, and the occurrence order of the respective repeating units enclosed in parentheses provided with a, b, c, d, e, or f is not limited in the formula, provided that when all $R^{Fa}$ are hydrogen atoms or chlorine atoms, at least one of a, b, c, e, and f is 1 or more.

5. The heat exchanger according to claim 1, wherein $R^F$ is each independently at each occurrence a group represented by the following formula (f1), (f2), (f3), (f4), (f5), or (f6):

(f1)

$$-(OC_3F_6)_d-(OC_2F_4)_e-$$

wherein d is an integer of 1 to 200; and e is 0 or 1;

(f2)

$$-(OC_4F_8)_c-(OC_3F_6)_d-(OC_2F_4)_e-(OCF_2)_f-$$

wherein c and d are each independently an integer of 0 to 30;

e and f are each independently an integer of 1 to 200;

the sum of c, d, e, and f is an integer of 10 to 200; and the occurrence order of the respective repeating units enclosed in parentheses provided with a subscript c, d, e, or f is not limited in the formula;

(f3)

$$-(R^6-R^7)_g-$$

wherein $R^6$ is $OCF_2$ or $OC_2F_4$;

$R^7$ is a group selected from $OC_2F_4$, $OC_3F_6$, $OC_4F_8$, $OC_5F_{10}$, and $OC_6F_{12}$, or is a combination of two or three groups selected from these groups; and g is an integer of 2 to 100;

(f4)

$$-(OC_6F_{12})_a-(OC_5F_{10})_b-(OC_4F_8)_c-(OC_3F_6)_d-(OC_2F_4)_e-(OCF_2)_f-$$

wherein e is an integer of 1 or more and 200 or less, a, b, c, d, and f are each independently an integer of 0 or more and 200 or less, the sum of a, b, c, d, e, and f is at least 1, and the occurrence order of each repeating unit enclosed in parentheses provided with a, b, c, d, e, or f is not limited in the formula;

(f5)

$$-(OC_6F_{12})_a-(OC_5F_{10})_b-(OC_4F_8)_c-(OC_3F_6)_d-(OC_2F_4)_e-(OCF_2)_f-$$

wherein f is an integer of 1 or more and 200 or less, a, b, c, d, and e are each independently an integer of 0 or more and 200 or less, the sum of a, b, c, d, e, and f is at least 1, and the occurrence order of each repeating unit enclosed in parentheses provided with a, b, c, d, e, or f is not limited in the formula; and (f6)

$$-(R^6-R^7)_g-R^r-(R^{7'}-R^{6'})_{g'}-$$

wherein $R^6$ is $OCF_2$ or $OC_2F_4$;

$R^7$ is a group selected from $OC_2F_4$, $OC_3F_6$, $OC_4F_8$, $OC_5F_{10}$, and $OC_6F_{12}$, or a combination of two or three groups independently selected from these groups;

$R^{6'}$ is $OCF_2$ or $OC_2F_4$;

$R^{7'}$ is a group selected from $OC_2F_4$, $OC_3F_6$, $OC_4F_8$, $OC_5F_{10}$, and $OC_6F_{12}$, or a combination of two or three groups independently selected from these groups;

g is an integer of 2 to 100;

g' is an integer of 2 to 100; and $R^r$ is

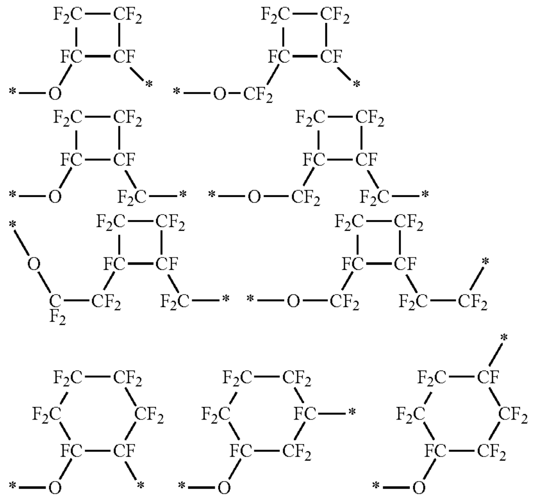

wherein * represents a binding position.

6. The heat exchanger according to claim 1, wherein $R^{Si}$ is a group represented by the following formula (S1), (S2), (S3), or (S4):

(S1)

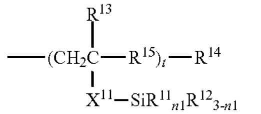

$$—SiR^{11}_{n1}R^{12}_{3-n1} \quad (S2)$$

$$—SiR^{a1}_{k1}R^{b1}_{l1}R^{c1}_{m1} \quad (S3)$$

$$—CR^{d1}_{k2}R^{e1}_{l2}R^{f1}_{m2} \quad (S4)$$

wherein $R^{11}$ is each independently at each occurrence a hydroxyl group or a hydrolyzable group;

$R^{12}$ is each independently at each occurrence a hydrogen atom or a monovalent organic group;

n1 is each independently an integer of 0 to 3 for each $(SiR^{11}_{n1}R^{12}_{3-n1})$ unit;

$X^{11}$ is each independently at each occurrence a single bond or a divalent organic group;

$R^{13}$ is each independently at each occurrence a hydrogen atom or a monovalent organic group;

t is each independently at each occurrence an integer of 2 or more;

$R^{14}$ is each independently at each occurrence a hydrogen atom, a halogen atom, or $—X^{11}—SiR^{11}_{n1}R^{12}_{3-n1}$;

$R^{15}$ is each independently at each occurrence a single bond, an oxygen atom, an alkylene group having 1 to 6 carbon atoms, or an alkyleneoxy group having 1 to 6 carbon atoms;

$R^{a1}$ is each independently at each occurrence $—Z^1—SiR^{21}_{p1}R^{22}_{q1}R^{23}_{r1}$;

$Z^1$ is each independently at each occurrence an oxygen atom or a divalent organic group;

$R^{21}$ is each independently at each occurrence $—Z^{1'}—SiR^{21'}_{p1'}R^{22'}_{q1'}R^{23'}_{r1'}$;

$R^{22}$ is each independently at each occurrence a hydroxyl group or a hydrolyzable group;

$R^{23}$ is each independently at each occurrence a hydrogen atom or a monovalent organic group;

p1 is each independently at each occurrence an integer of 0 to 3;

q1 is each independently at each occurrence an integer of 0 to 3;

r1 is each independently at each occurrence an integer of 0 to 3;

$Z^{1'}$ is each independently at each occurrence an oxygen atom or a divalent organic group;

$R^{21'}$ is each independently at each occurrence $—Z^{1''}—SiR^{22''}_{q1''}R^{23''}_{r1''}$;

$R^{22'}$ is each independently at each occurrence a hydroxyl group or a hydrolyzable group;

$R^{23'}$ is each independently at each occurrence a hydrogen atom or a monovalent organic group;

p1' is each independently at each occurrence an integer of 0 to 3;

q1' is each independently at each occurrence an integer of 0 to 3;

r1' is each independently at each occurrence an integer of 0 to 3;

$Z^{1''}$ is each independently at each occurrence an oxygen atom or a divalent organic group;

$R^{22''}$ is each independently at each occurrence a hydroxyl group or a hydrolyzable group;

$R^{23''}$ is each independently at each occurrence a hydrogen atom or a monovalent organic group;

q1" is each independently at each occurrence an integer of 0 to 3;

r1" is each independently at each occurrence an integer of 0 to 3;

$R^{b1}$ is each independently at each occurrence a hydroxyl group or a hydrolyzable group;

$R^{c1}$ is each independently at each occurrence a hydrogen atom or a monovalent organic group;

k1 is each independently at each occurrence an integer of 0 to 3;

l1 is each independently at each occurrence an integer of 0 to 3;

m1 is each independently at each occurrence an integer of 0 to 3;

$R^{d1}$ is each independently at each occurrence $—Z^2—CR^{31}_{p2}R^{32}_{q2}R^{33}_{r2}$;

$Z^2$ is each independently at each occurrence a single bond, an oxygen atom, or a divalent organic group;

$R^{31}$ is each independently at each occurrence $—Z^{2'}—CR^{32'}_{q2'}R^{33'}_{r2'}$;

$R^{32}$ is each independently at each occurrence $—Z^3—SiR^{34}_{n2}R^{35}_{3-n2}$;

$R^{33}$ is each independently at each occurrence a hydrogen atom, a hydroxyl group, or a monovalent organic group;

p2 is each independently at each occurrence an integer of 0 to 3;

q2 is each independently at each occurrence an integer of 0 to 3;

r2 is each independently at each occurrence an integer of 0 to 3;

$Z^{2'}$ is each independently at each occurrence a single bond, an oxygen atom, or a divalent organic group;

$R^{32'}$ is each independently at each occurrence $—Z^3—SiR^{34}_{n2}R^{35}_{3-n2}$, $R^{33'}$ is each independently at each occurrence a hydrogen atom, a hydroxyl group, or a monovalent organic group;

q2' is each independently at each occurrence an integer of 0 to 3;

r2' is each independently at each occurrence an integer of 0 to 3;

$Z^3$ is each independently at each occurrence a single bond, an oxygen atom, or a divalent organic group;

$R^{34}$ is each independently at each occurrence a hydroxyl group or a hydrolyzable group;

$R^{35}$ is each independently at each occurrence a hydrogen atom or a monovalent organic group;

n2 is each independently at each occurrence an integer of 0 to 3;

$R^{e1}$ is each independently at each occurrence —$Z^3$—$SiR^{34}_{n2}R^{35}_{3-n2}$;

$R^{f1}$ is each independently at each occurrence a hydrogen atom, a hydroxyl group, or a monovalent organic group;

k2 is each independently at each occurrence an integer of 0 to 3;

l2 is each independently at each occurrence an integer of 0 to 3; and m2 is each independently at each occurrence an integer of 0 to 3.

7. The heat exchanger according to claim 1, wherein the anodized film is formed by anodization of the surface of the aluminum substrate using an anodizing liquid containing one or two or more compounds selected from the group consisting of phosphoric acid, pyrophosphoric acid, oxalic acid, malonic acid, and etidronic acid.

8. The heat exchanger according to claim 7, wherein a concentration of the anodizing liquid is 0.01 to 1.0 mol/L.

9. The heat exchanger according to claim 7, wherein a voltage applied in the anodization is 40 to 300 V.

10. The heat exchanger according to claim 7, wherein a treatment time of the anodization is 10 to 120 min.

11. The heat exchanger according to claim 7, wherein the anodized film is subjected to an etching treatment after the anodization.

12. The heat exchanger according to claim 11, wherein the etching treatment is carried out by using an etching liquid containing one or two or more compounds selected from the group consisting of phosphoric acid, pyrophosphoric acid, oxalic acid, malonic acid, and etidronic acid.

13. The heat exchanger according to claim 12, wherein a total concentration of the one or two or more compounds in the etching liquid is 10 to 60% by mass.

14. The heat exchanger according to claim 11, wherein a temperature of the etching liquid is 20 to 60° C.

15. The heat exchanger according to claim 11, wherein a treatment time of the etching treatment is 5 to 30 min.

16. The heat exchanger according to claim 1, wherein the aluminum substrate is made of aluminum having a purity of 99.99% or more.

17. The heat exchanger according to claim 1, wherein the aluminum substrate constitutes a plurality of fins arranged in parallel with a space.

18. The heat exchanger according to claim 17, wherein a distance between adjacent fins is 0.5 to 3.0 mm.

* * * * *